United States Patent [19]
Barry

[11] 3,956,994
[45] May 18, 1976

[54] CONTAINER OVERHEAD TRANSFER AND STORAGE SYSTEM

[76] Inventor: Leonard D. Barry, 19300 Pennington Drive, Detroit, Mich. 48221

[22] Filed: July 5, 1972

[21] Appl. No.: 269,239

[52] U.S. Cl. .................................. 104/88; 104/18; 104/20
[51] Int. Cl.² ............................................ B61J 3/00
[58] Field of Search .................. 104/18, 20, 88, 69, 104/53, 23 FS, 130, 131, 89; 105/340

[56] References Cited
UNITED STATES PATENTS

| | | | |
|---|---|---|---|
| 1,294,701 | 2/1919 | Pickard | 104/69 |
| 2,690,141 | 9/1954 | King | 105/340 |
| 3,483,829 | 12/1969 | Barry | 104/88 |
| 3,631,806 | 1/1972 | Barthalon | 104/23 FS |

Primary Examiner—Robert B. Reeves
Assistant Examiner—D. W. Keen

[57] ABSTRACT

This invention improves and extends the utility of the system disclosed in my U.S. Pat. Nos. 3,483,829 and 3,484,022 wherein containers are transferred to and from trains passing along under an overhead carrier and manually and/or automatically routed and stored; wherein my present improvement comprises: a reorganized and redesigned station with improved automatic container handling, storage and transfer for freight containers or trailers of a length and twice the length such as 20 and 40 ft. containers using storage spots, gantries, freight cars and carriers each for taking containers or trailers of either length; a low and/or high level double dip transfer run over the railway to dip the carriers level to transfer freight and passenger containers level between cars in a train passing under the dip and container carriers on the dip, the dip having a separate track down and up for front and rear trucks or wheels on carrier and automatic vertical switches for opening or bypassing this double dip and for switching carrier trucks to their respective tracks at top and bottom of the dip, safety dip bypass control, station with carrier track extending over a gantry for transfer of the long and short containers and trailers between stationary storage spots over which the gantry runs and the carriers above; the overhead transfer of both freight trailers and/or containers and passenger containers on the same transfer dip to and from the same train while passing the transfer dip; conveyors for moving passenger containers forward on car in train and to rear on carrier at station to simplify placement of containers, shielded open side passenger containers for quicker movement of people on car and at station; a subway type station for rapid transit public and private containers for passengers, freight, mail, express, etc. having carriers run parallel over conveyor to lift containers from carrier to move thereon from front to rear or therefrom for storage and reloading on carriers to insert in empty spots on cars in train traveling between stations; long transfer dip bottom between subway stations to reduce tunneling; two rows of passenger containers side by side per car both with or without center aisle for individual sized containers (six passenger) or/ and larger public or private passenger or freight containers, and buildings for these containers serving as hotel rooms, house containers, traveling offices, shops, concessions, storage, etc.

27 Claims, 124 Drawing Figures

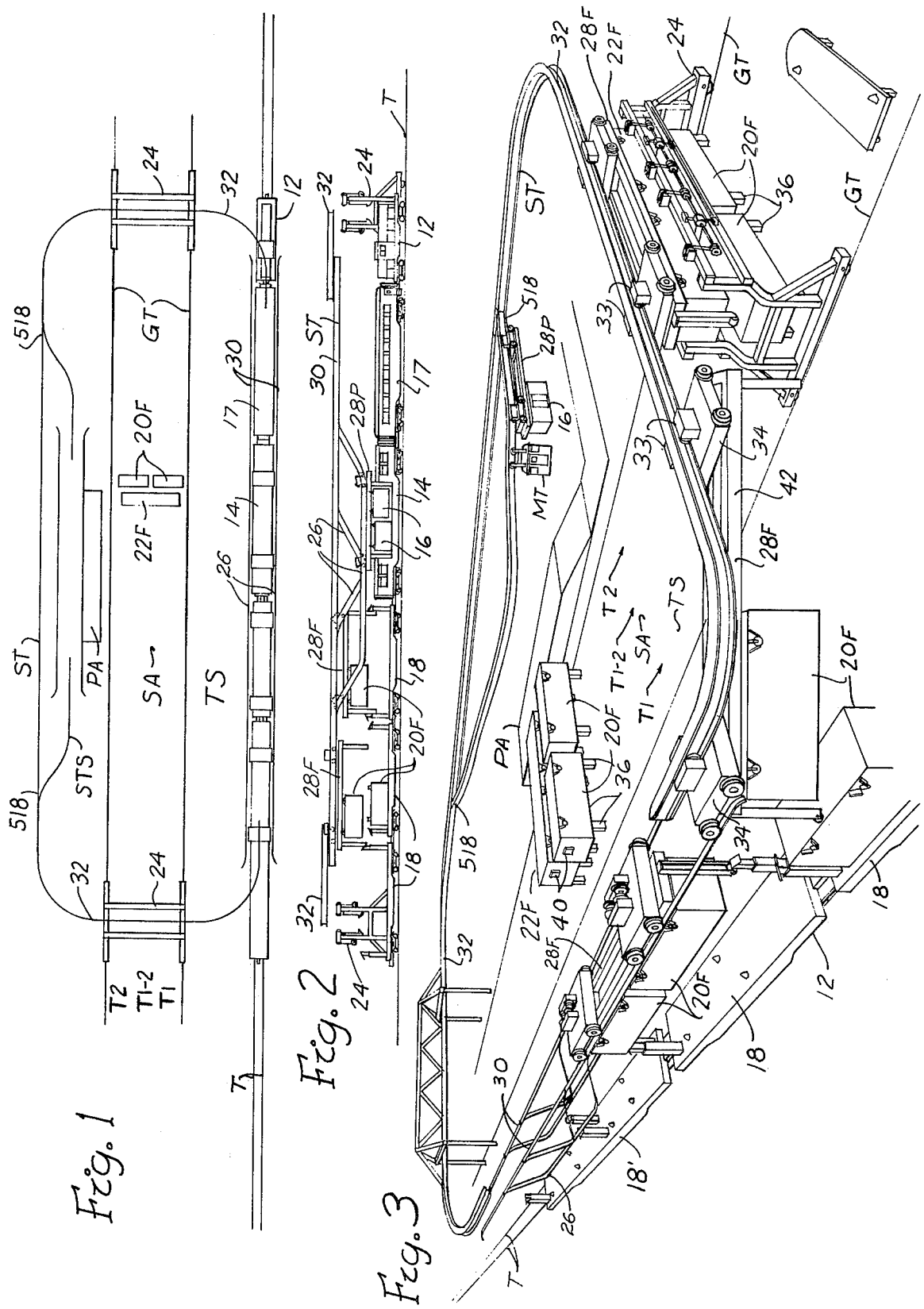

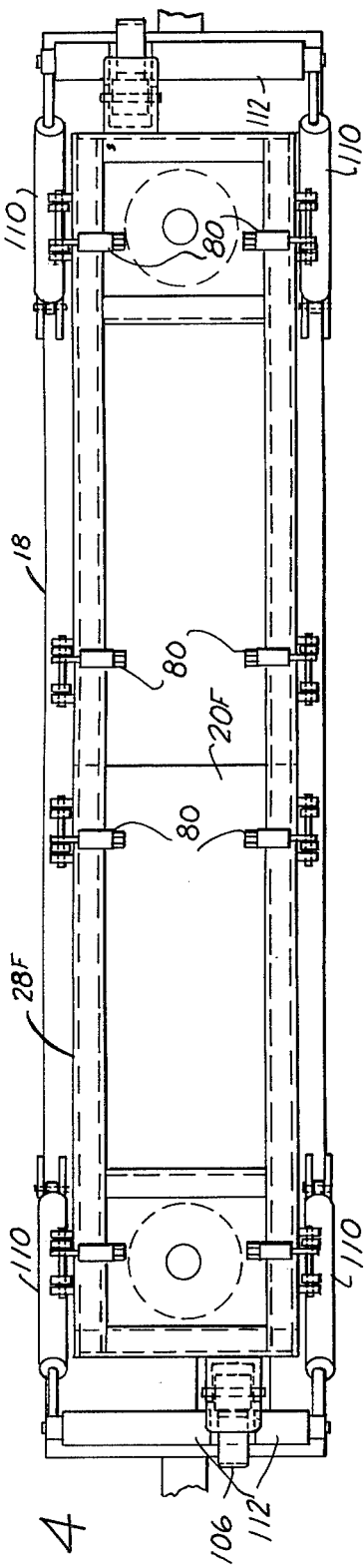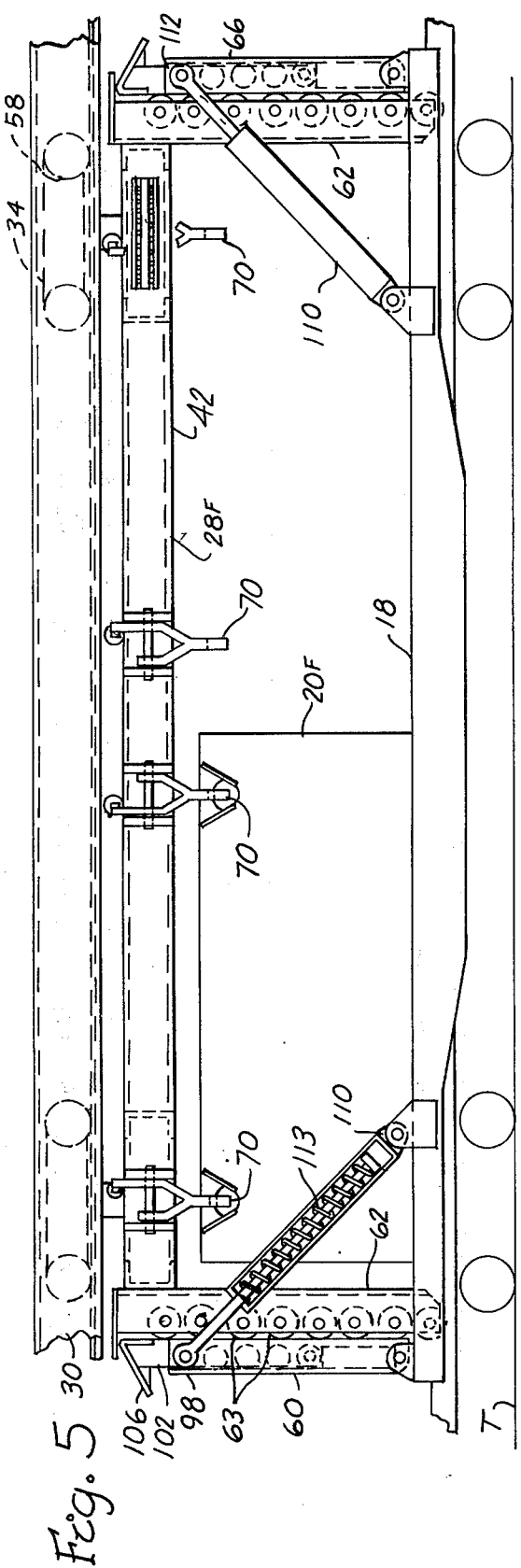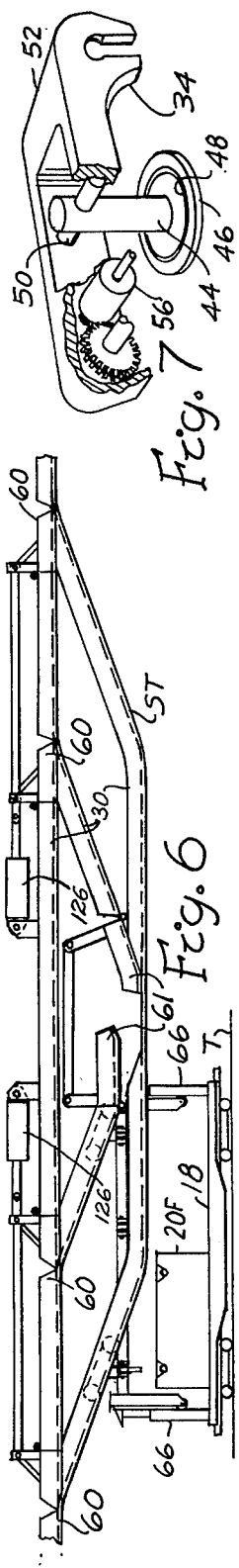

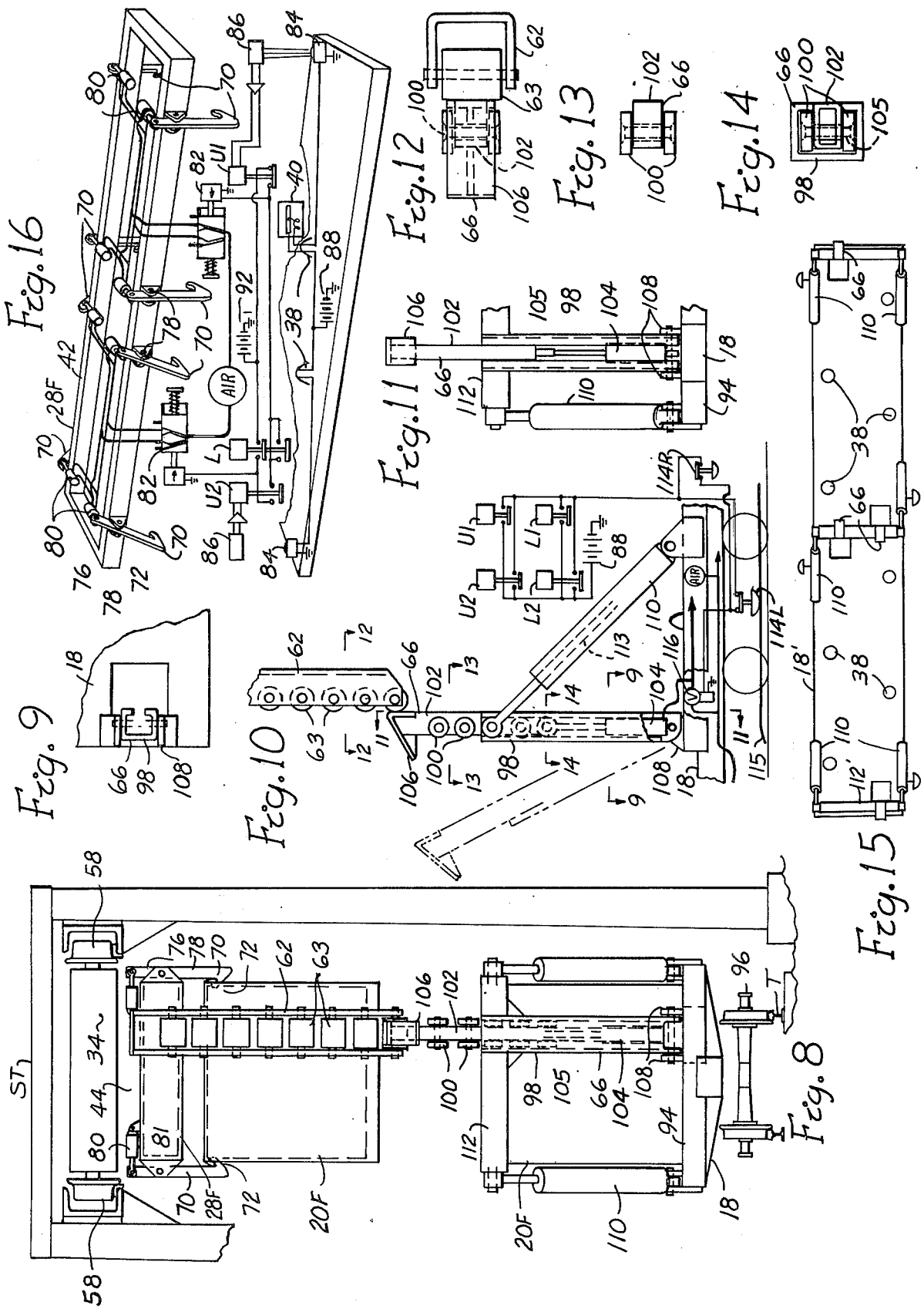

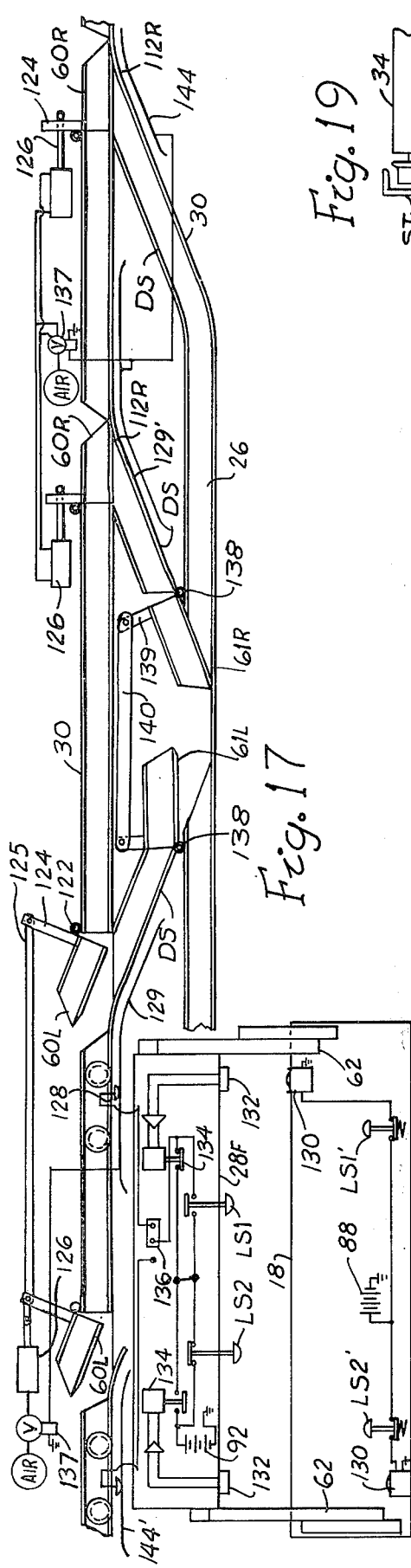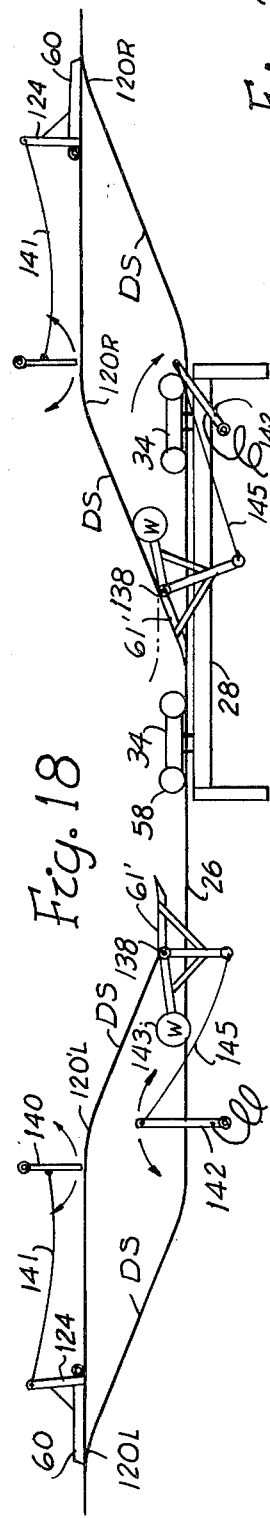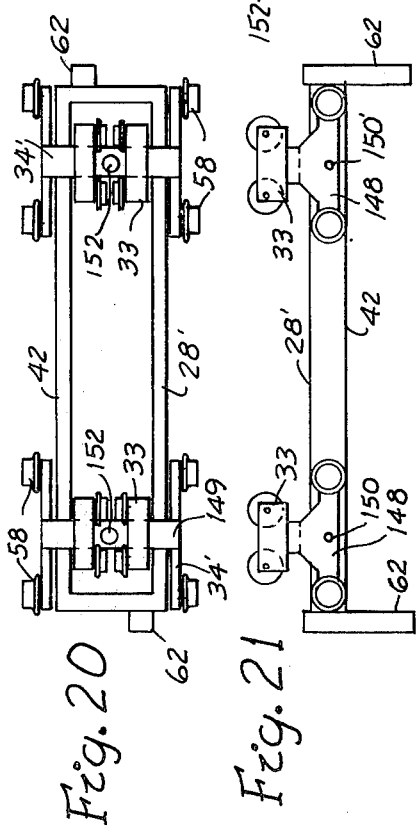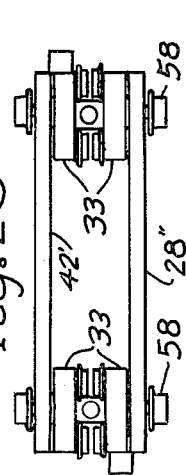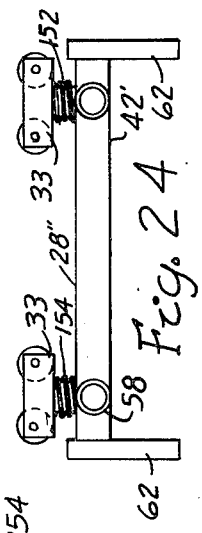

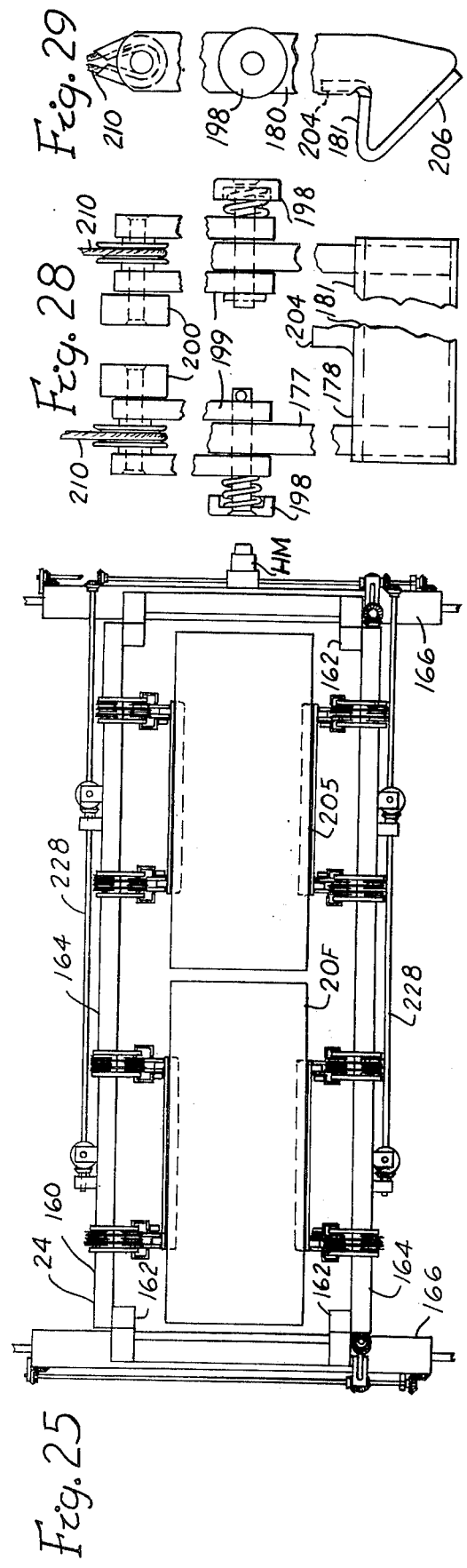

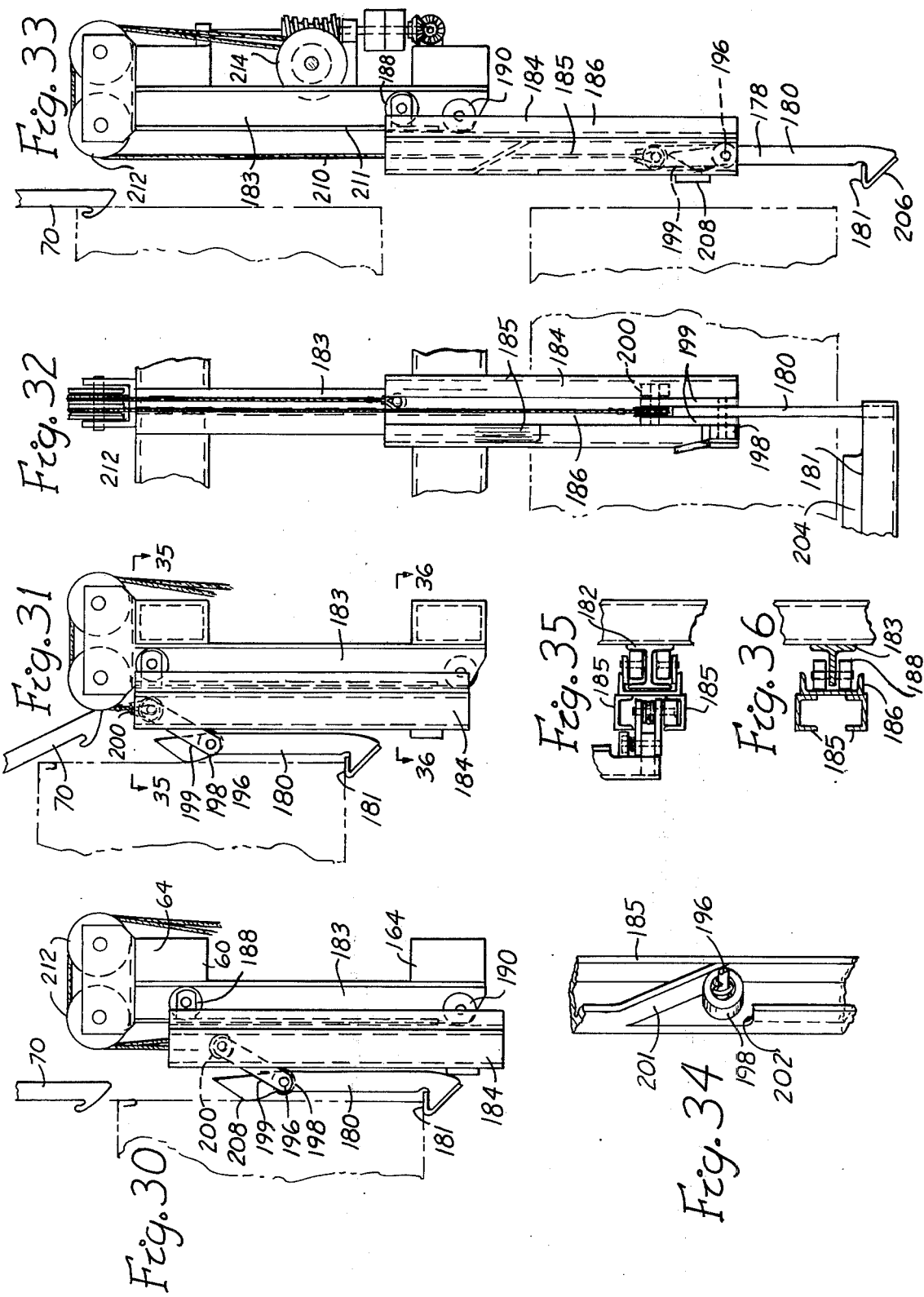

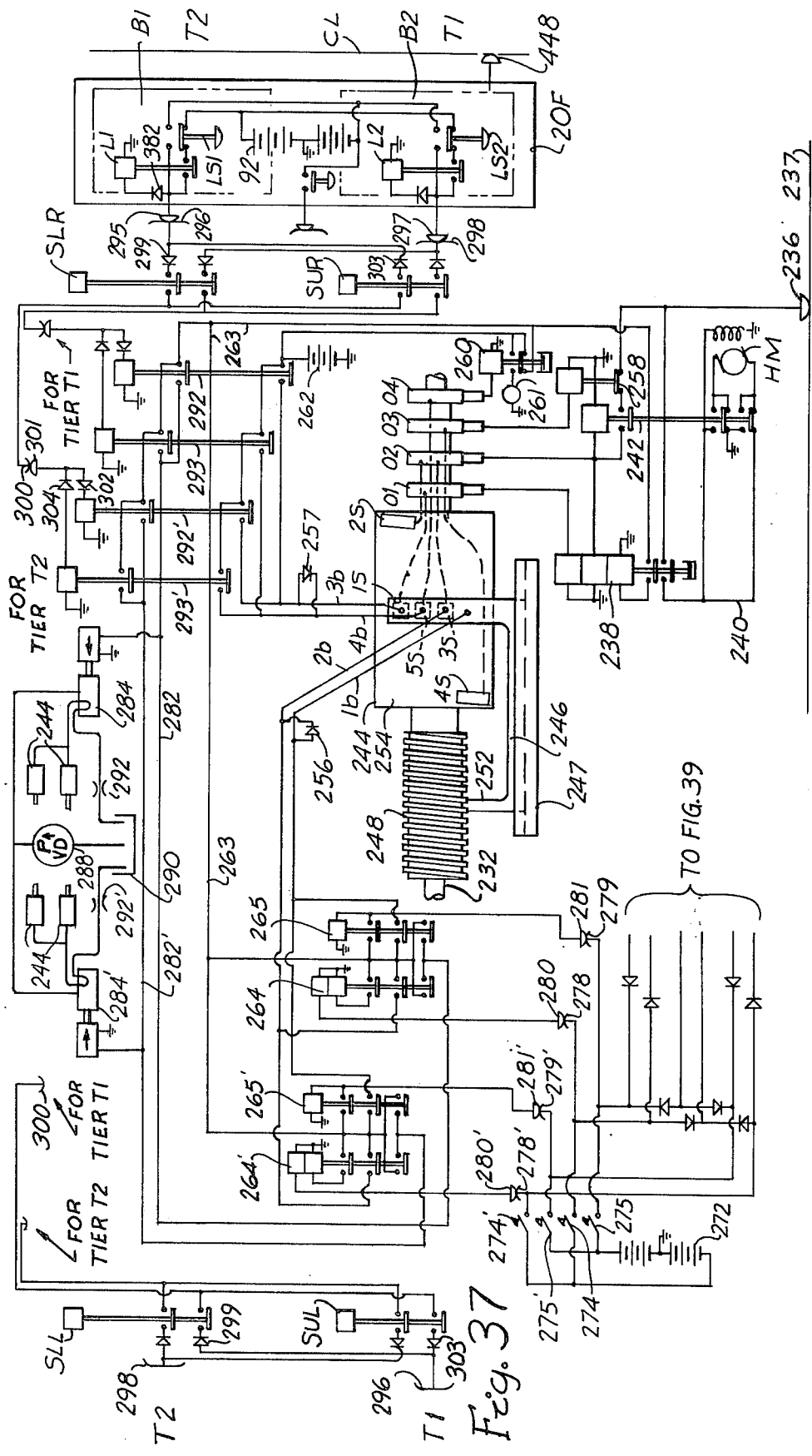

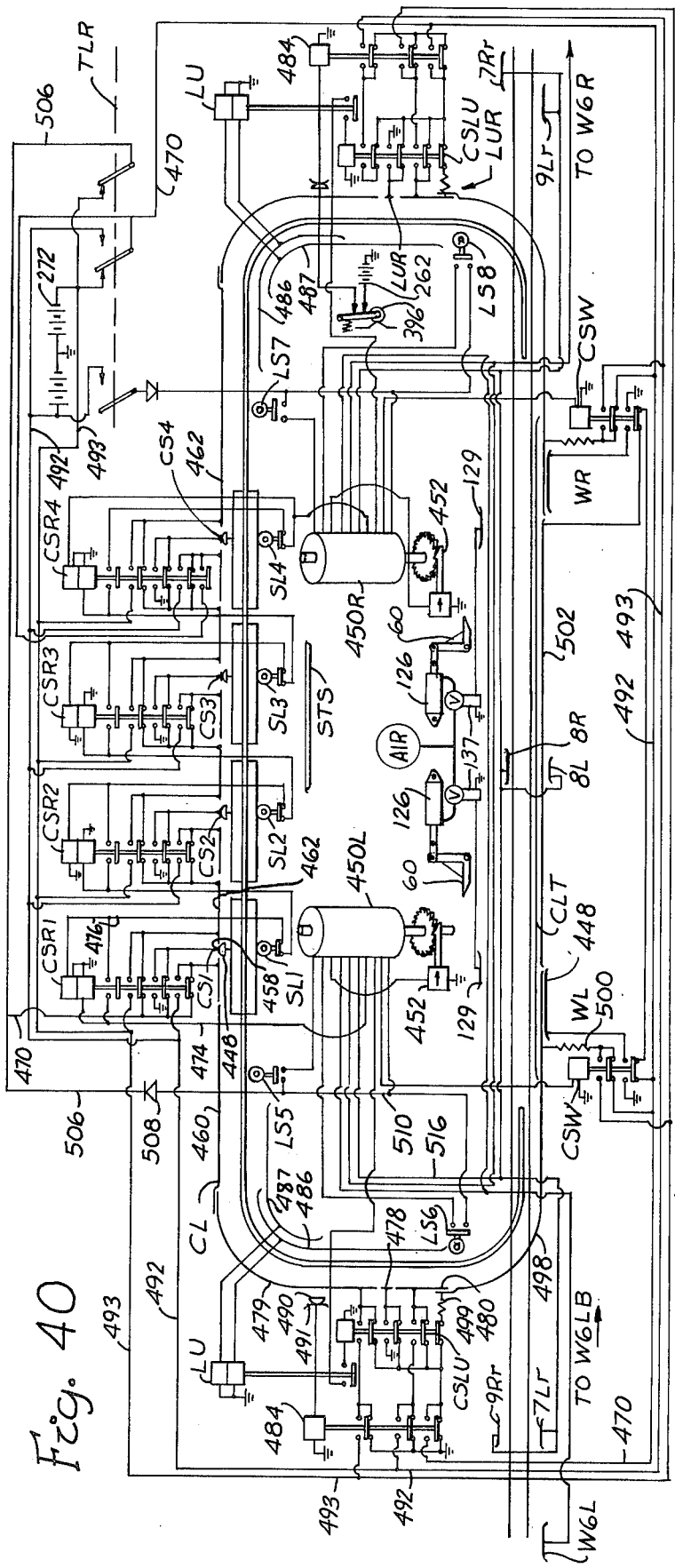

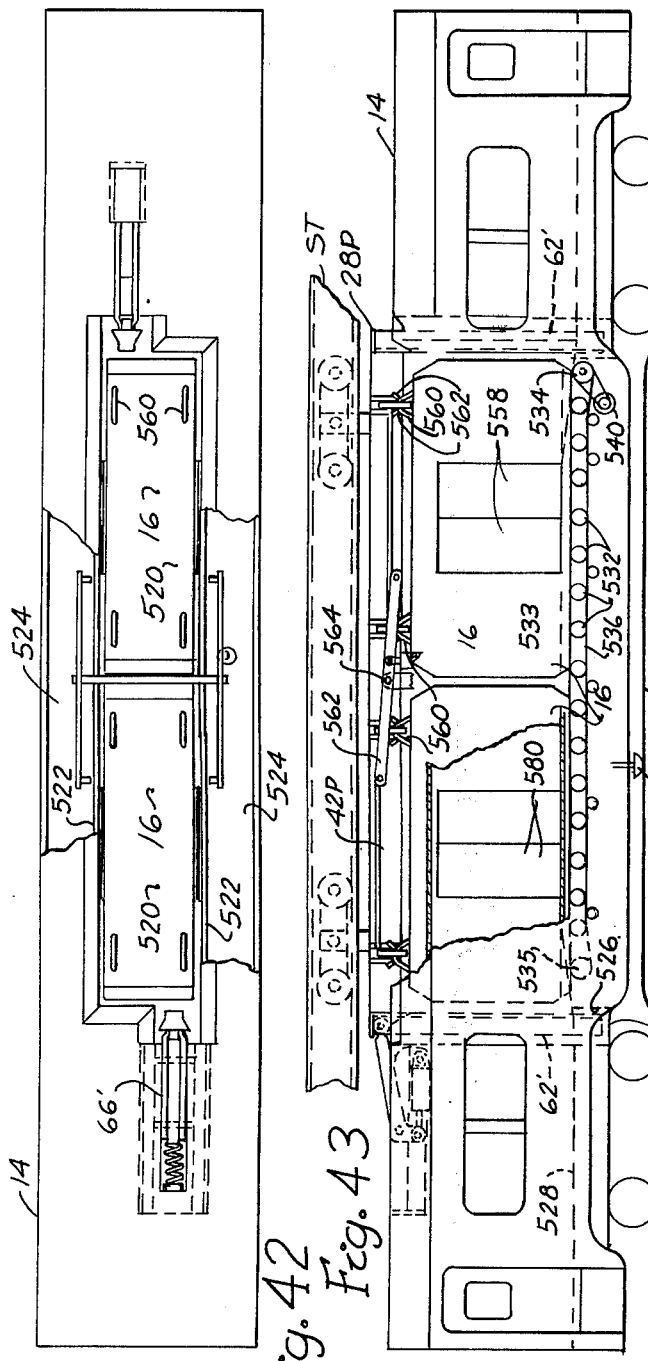

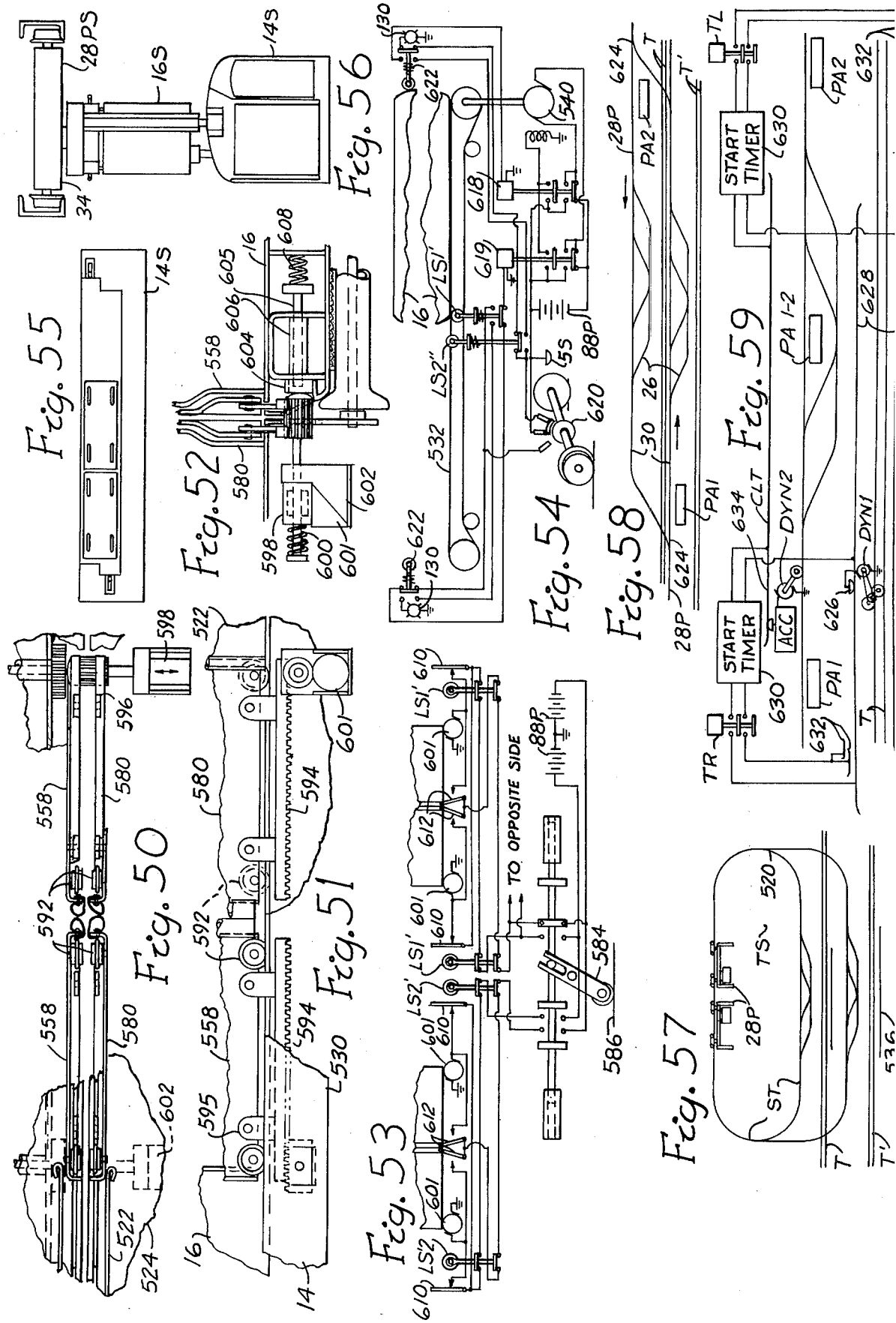

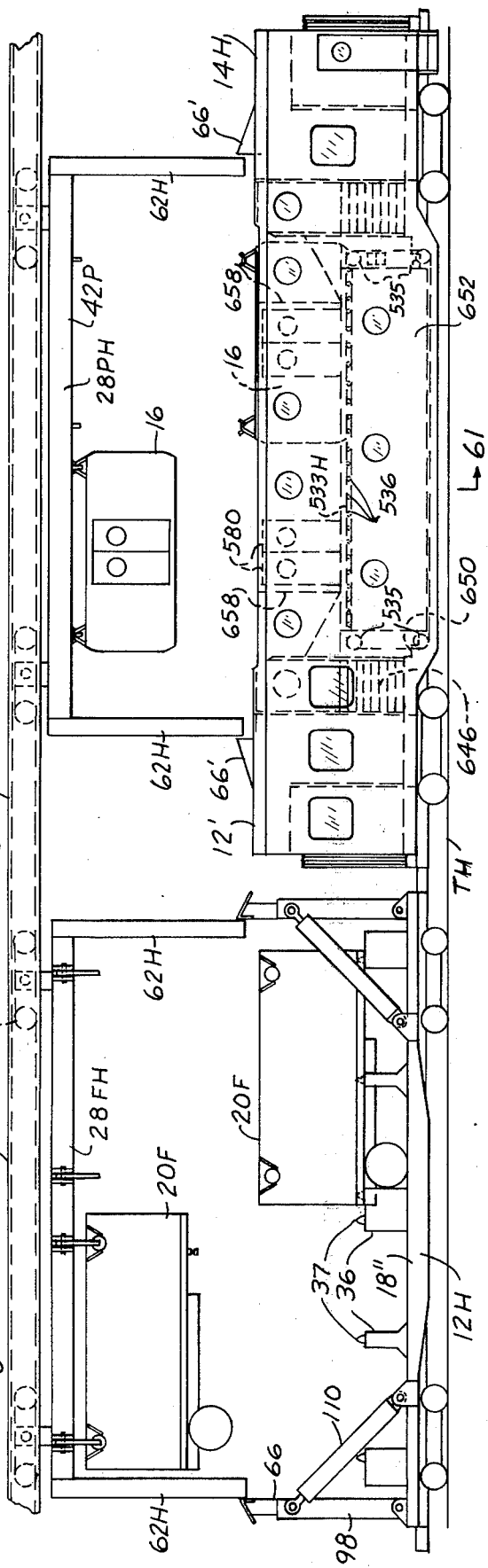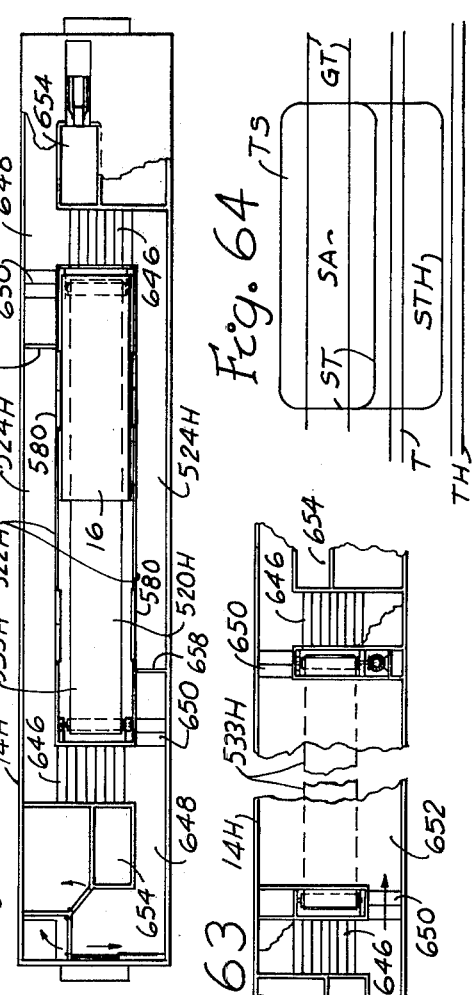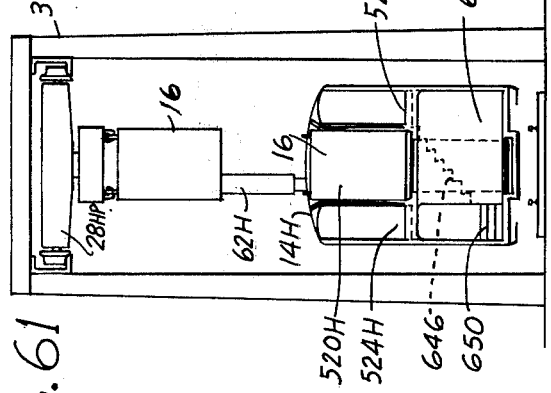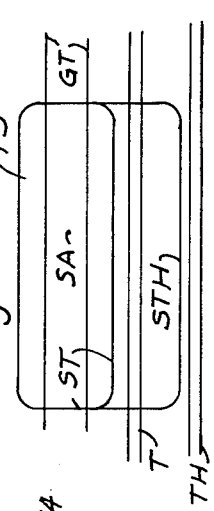

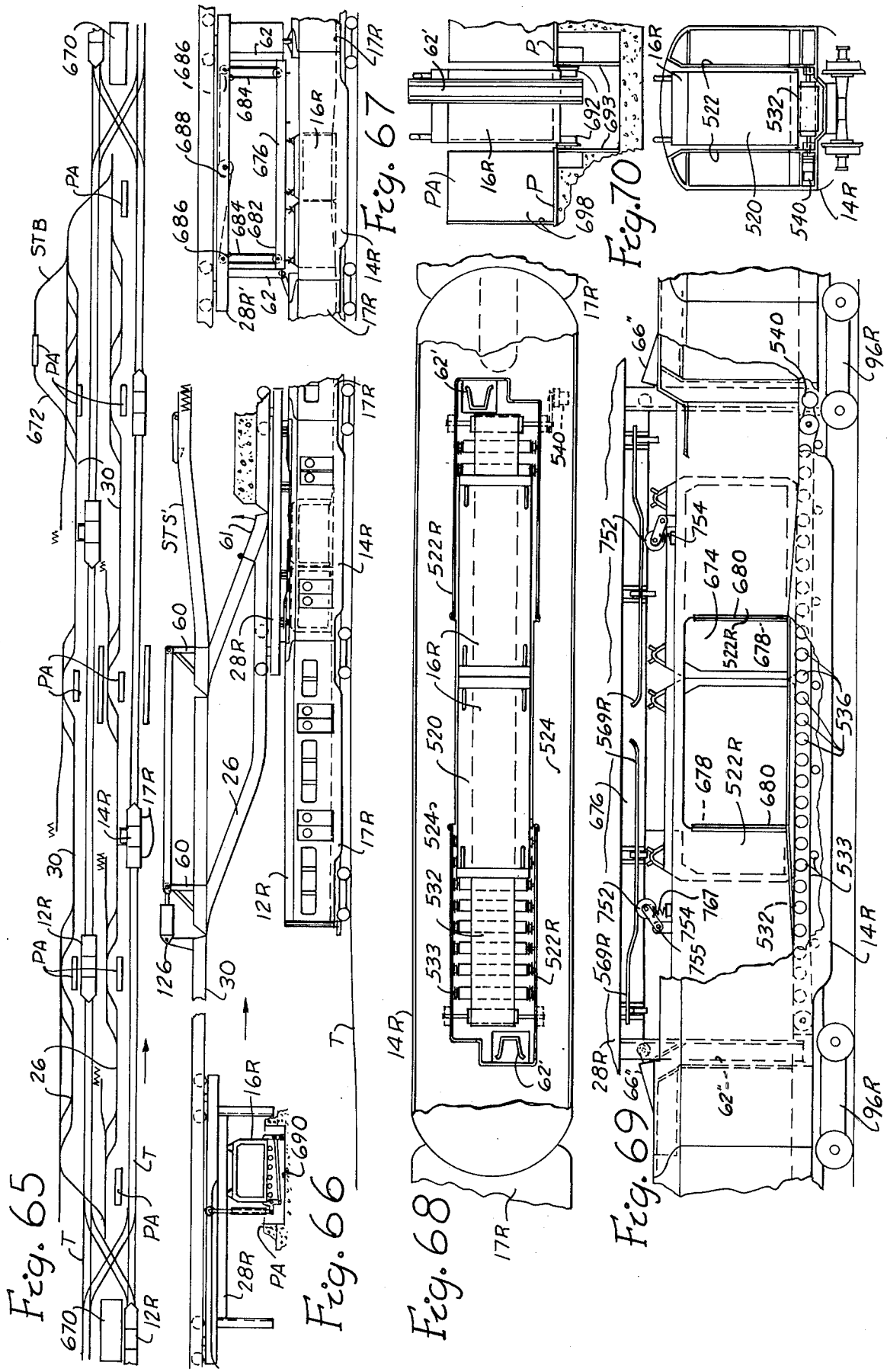

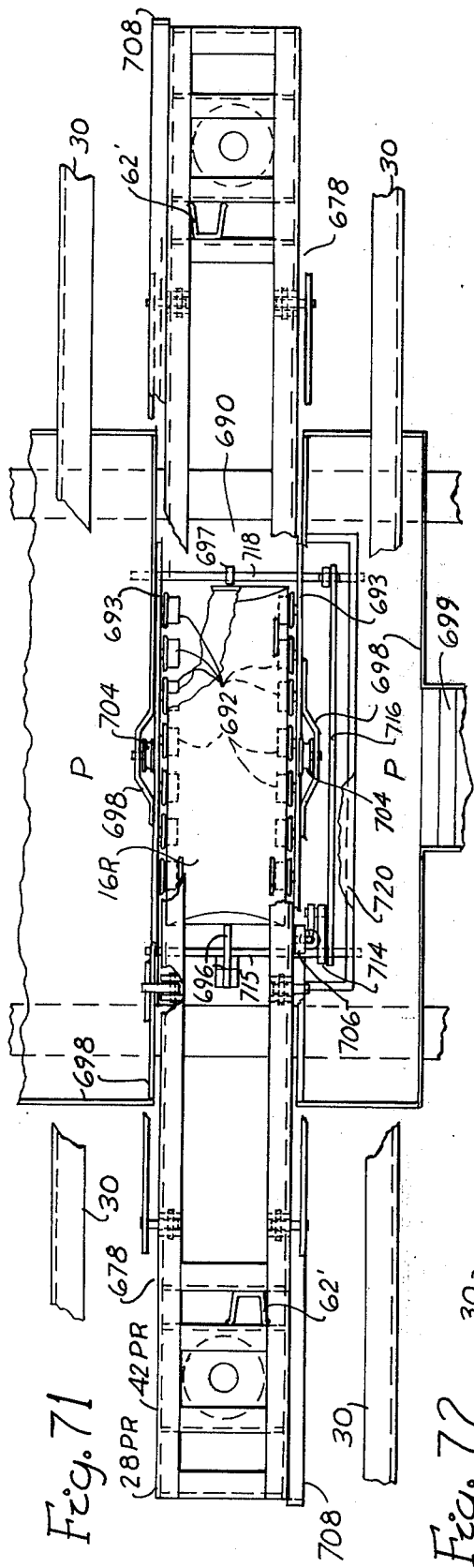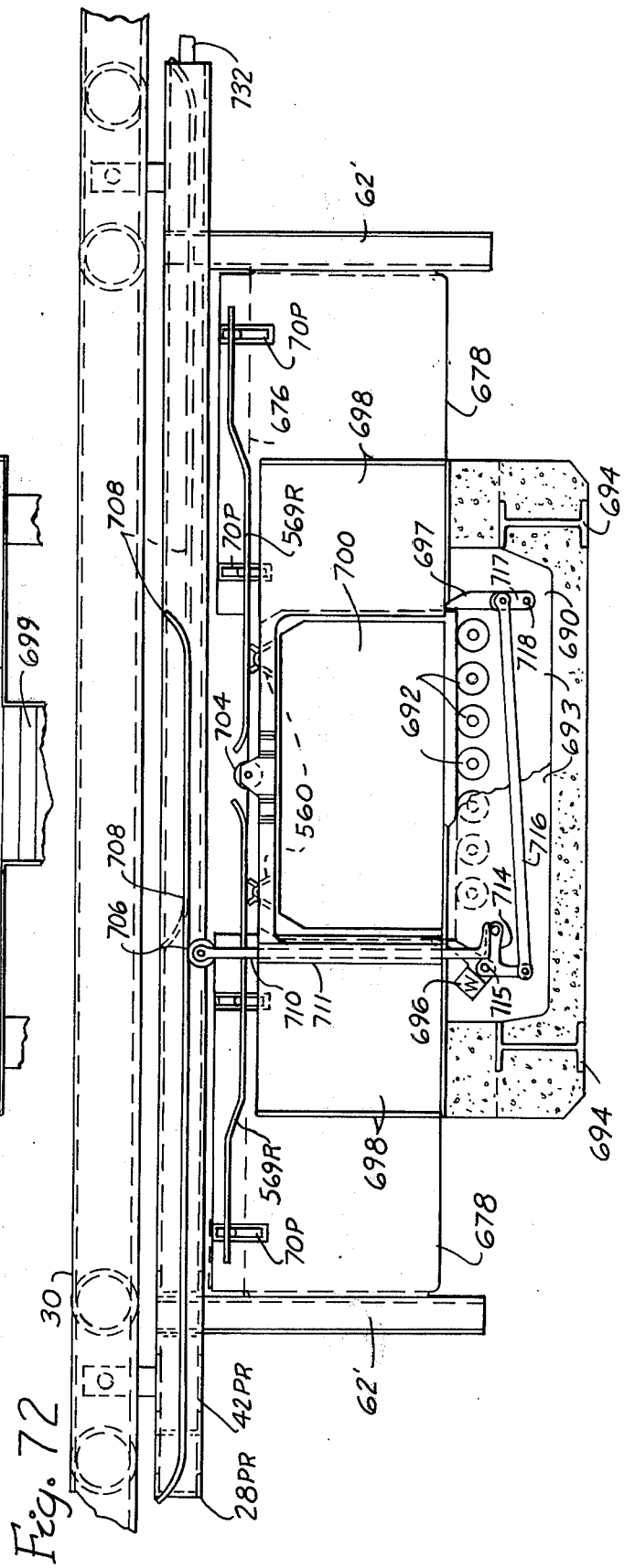

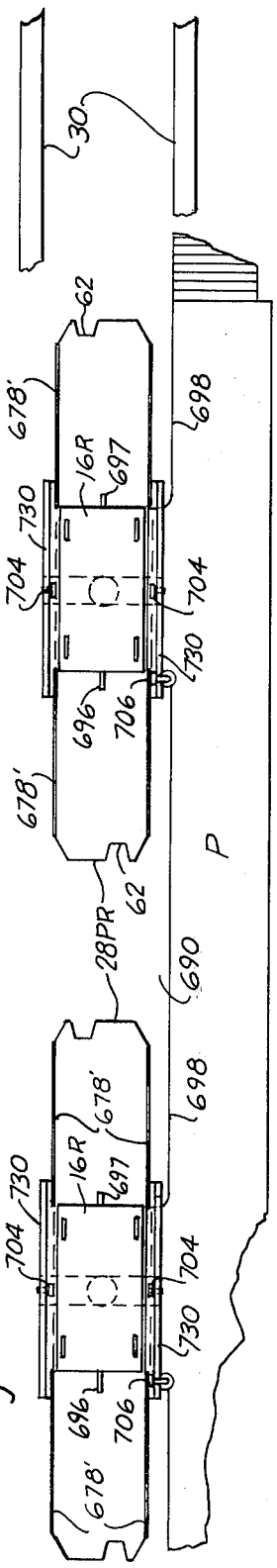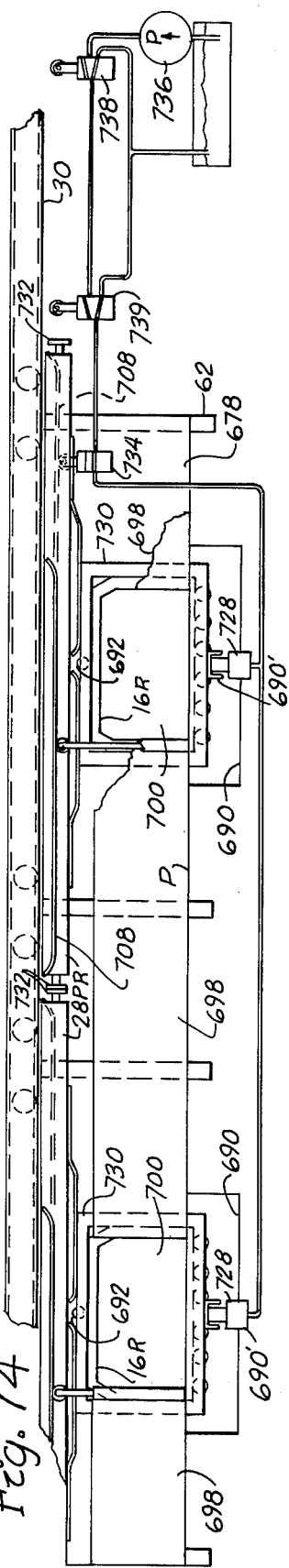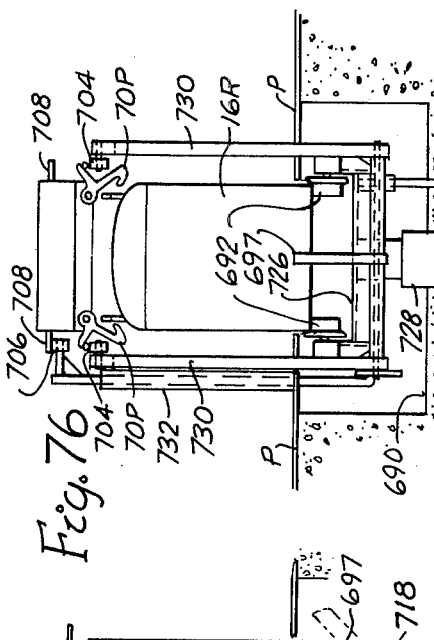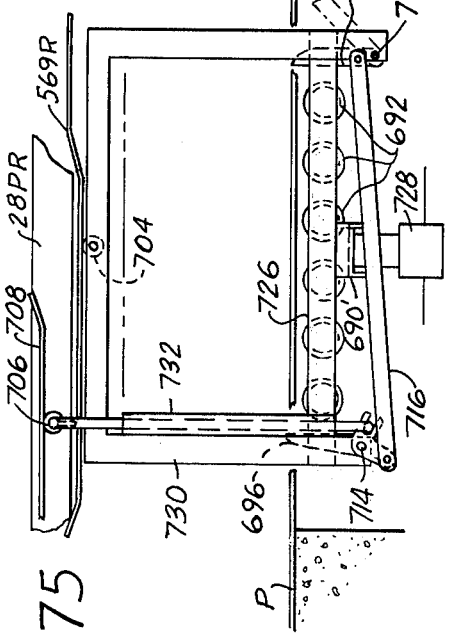

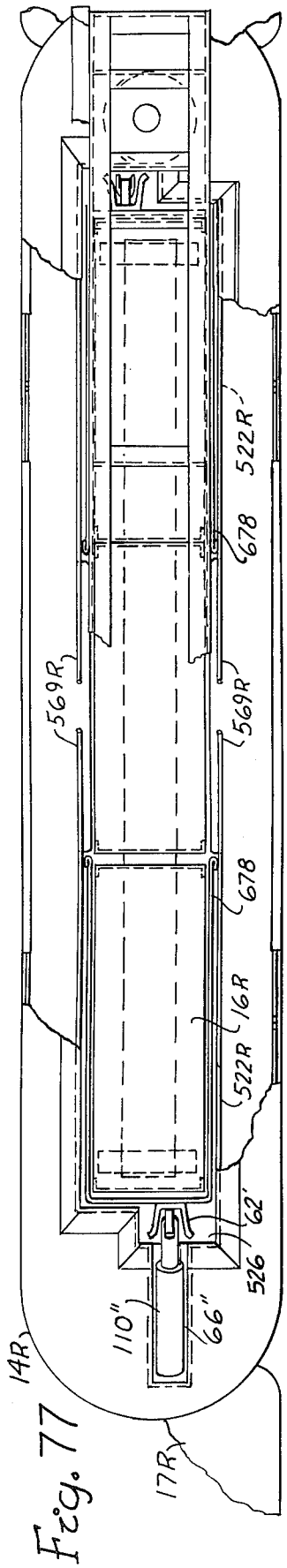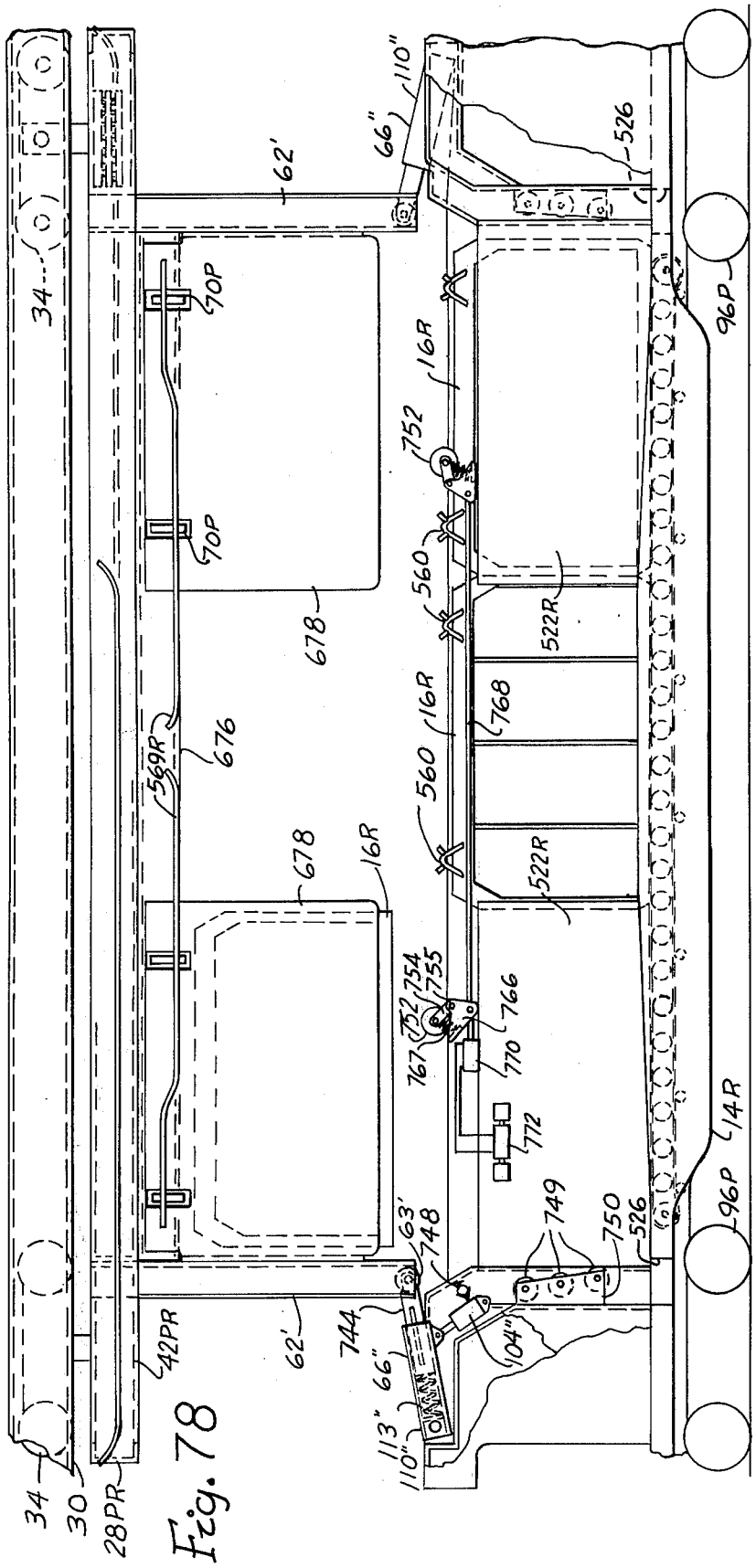

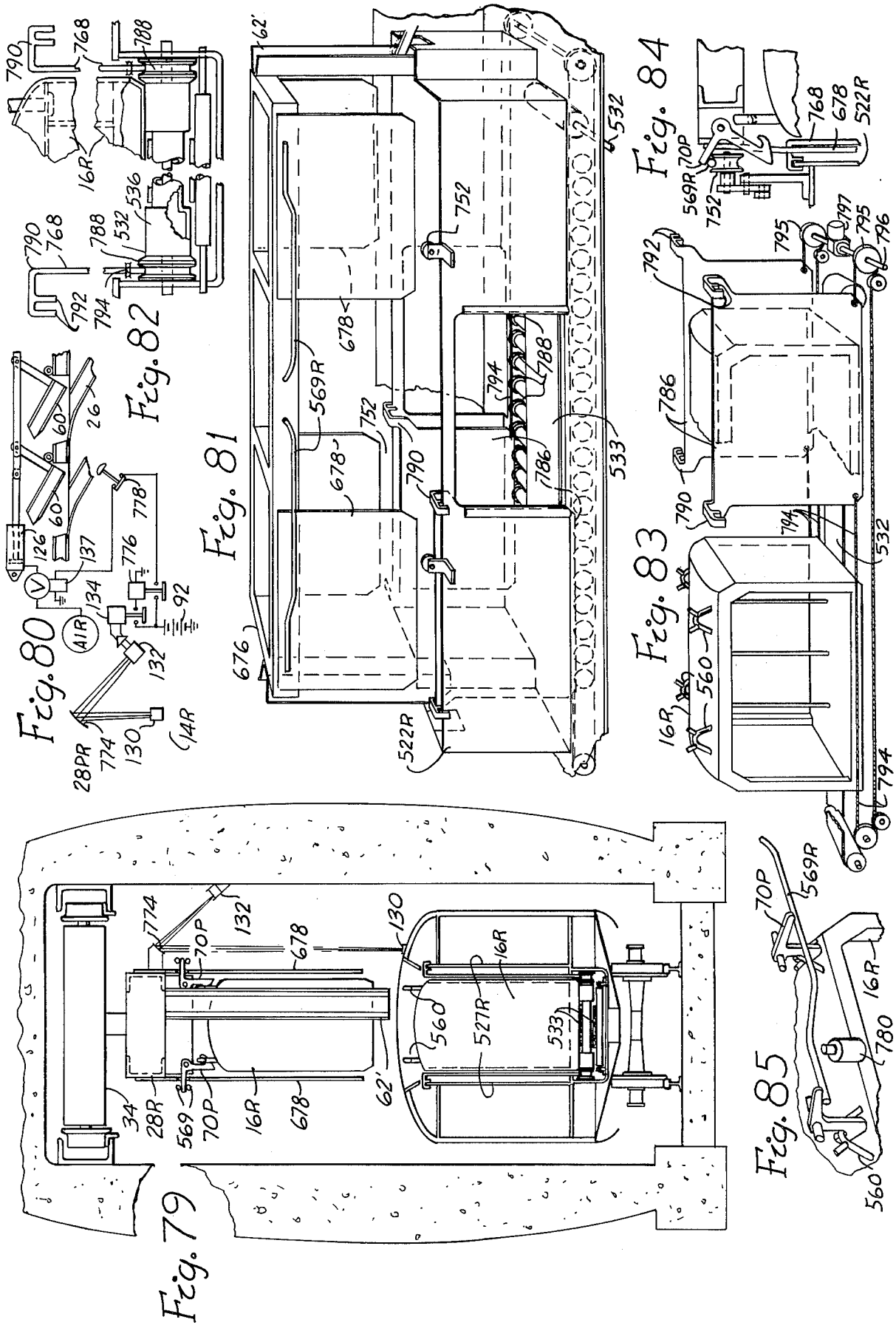

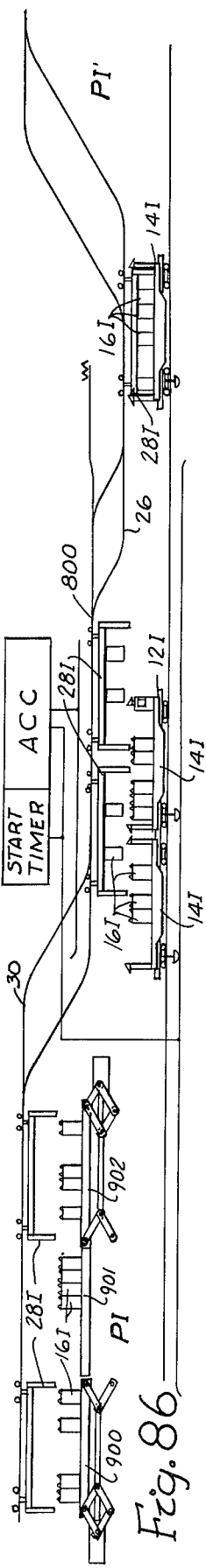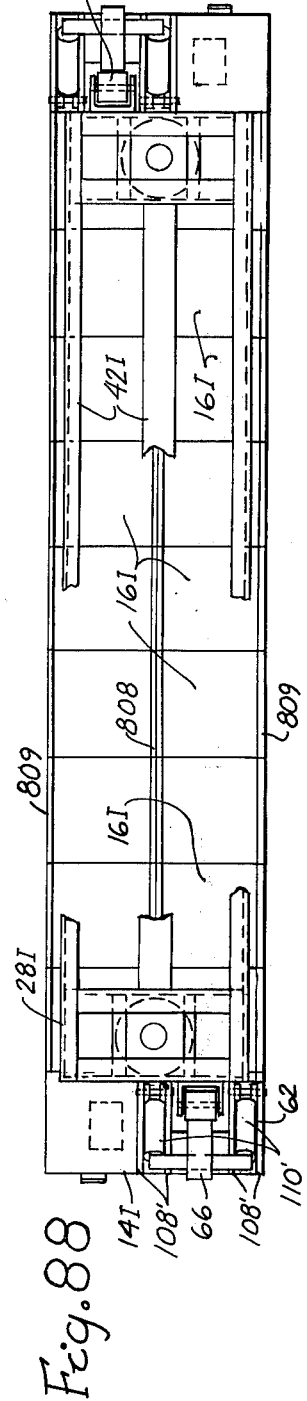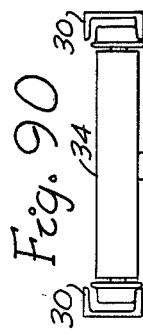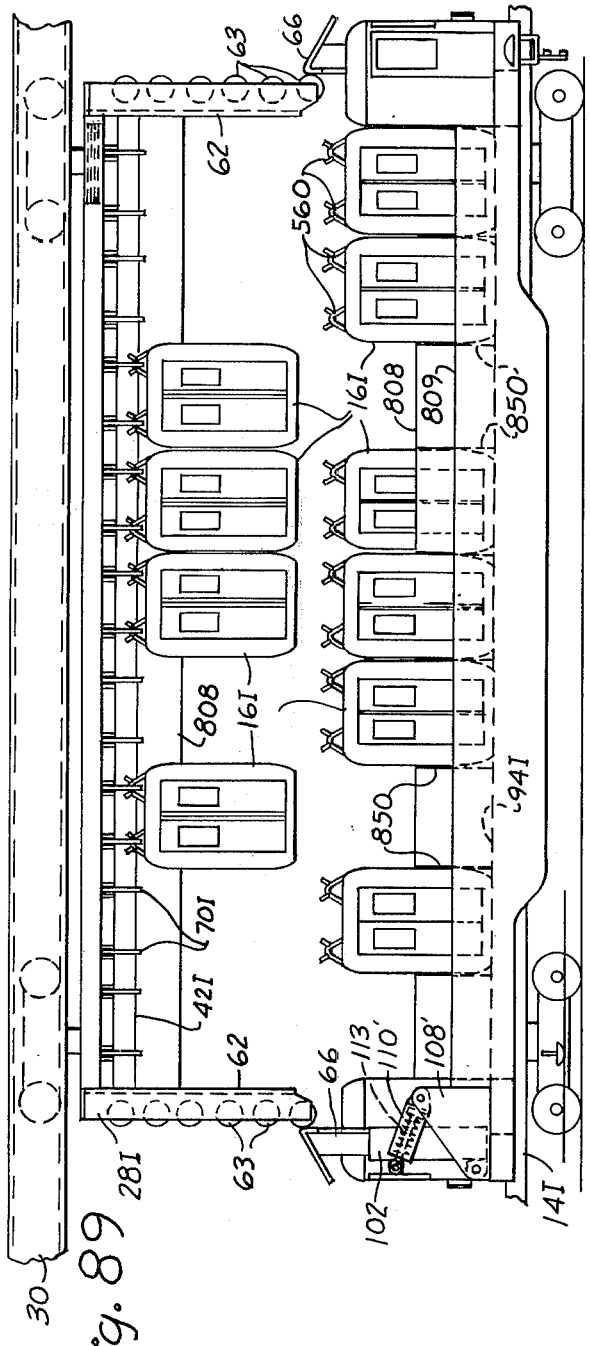

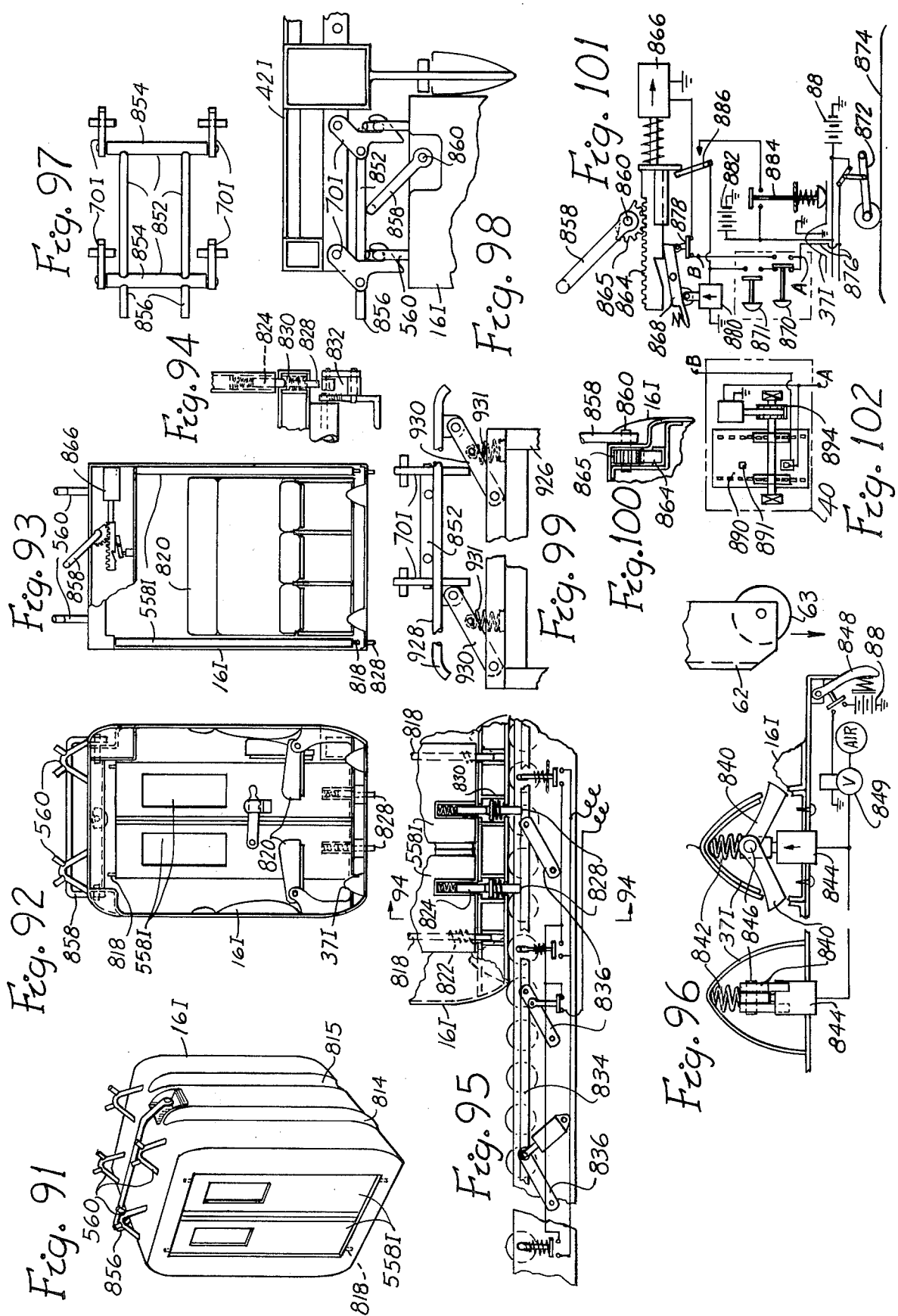

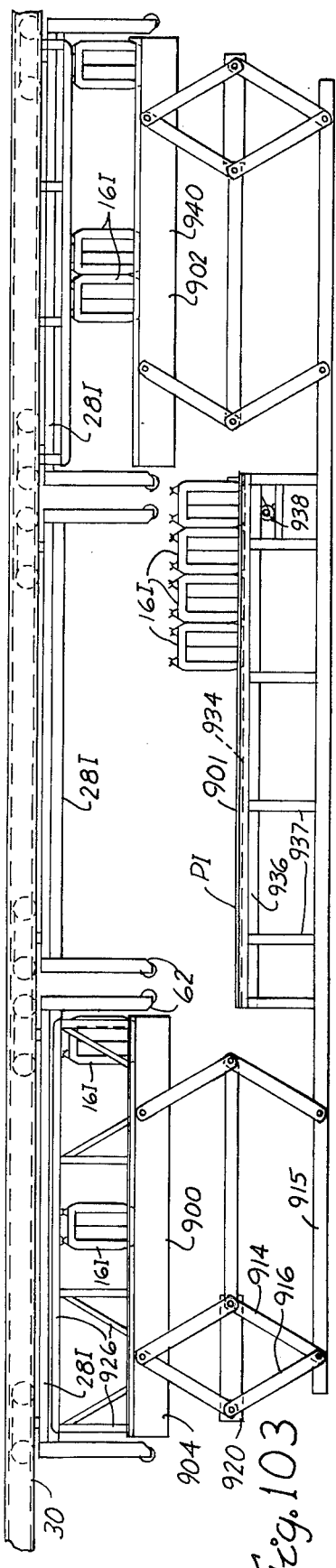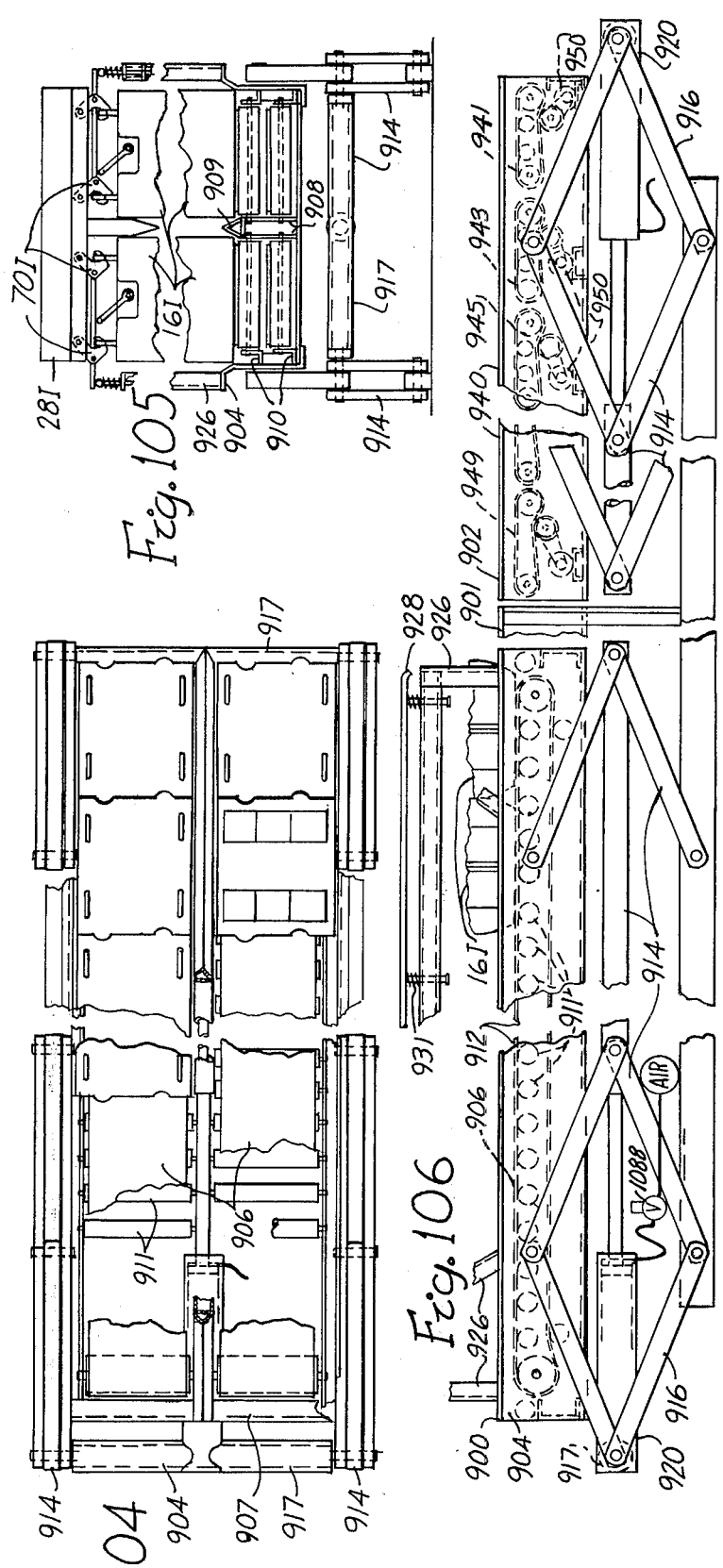
Fig. 103
Fig. 104
Fig. 105
Fig. 106

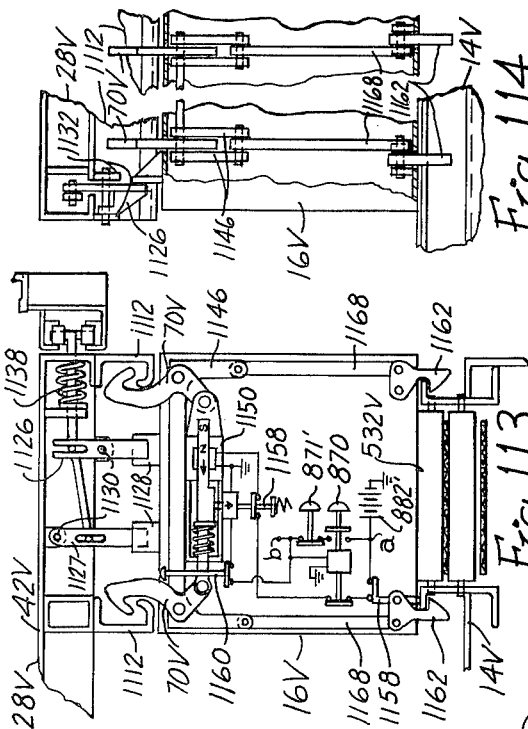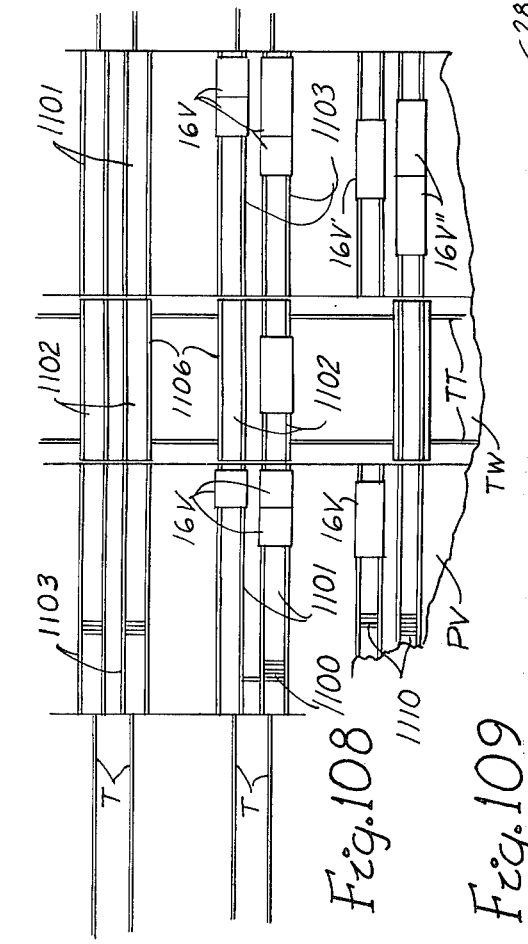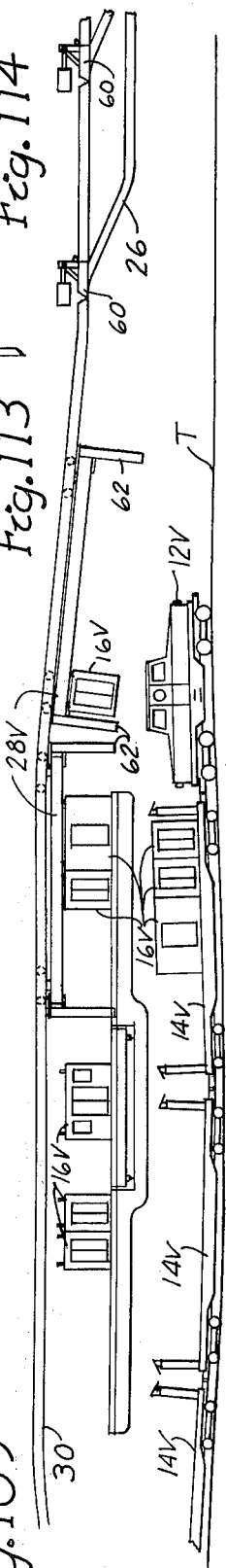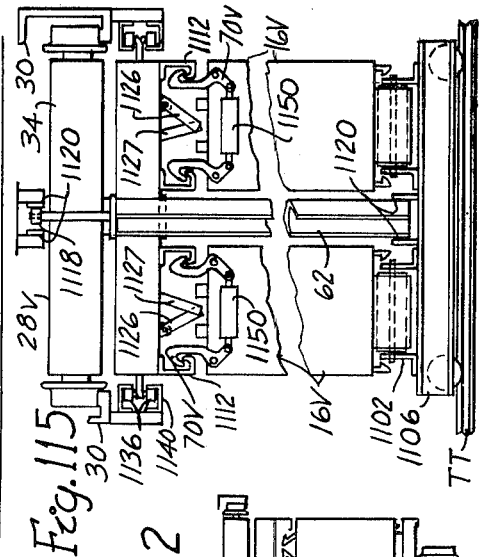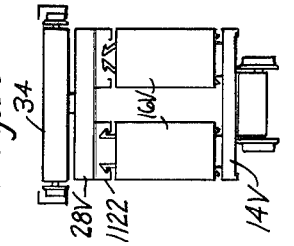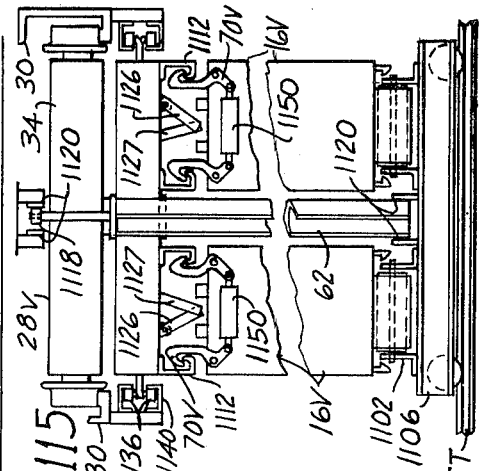

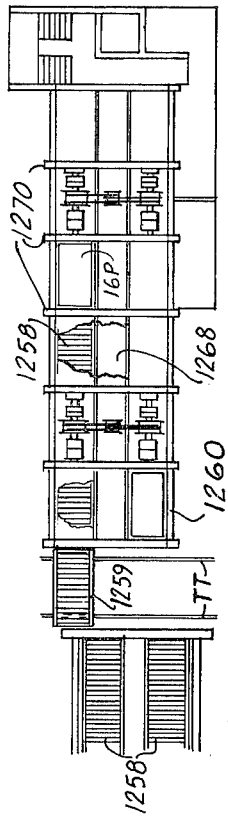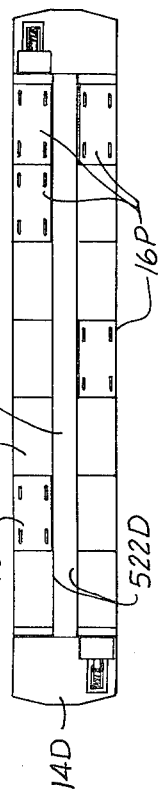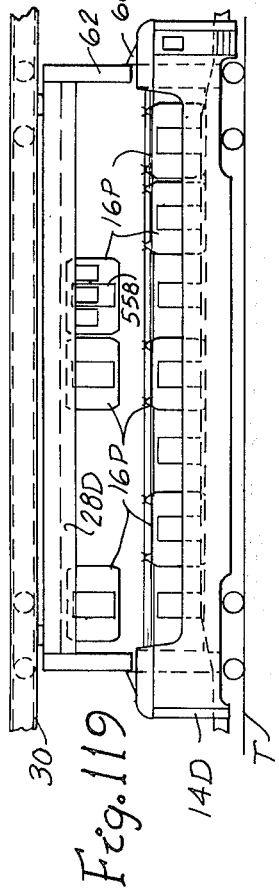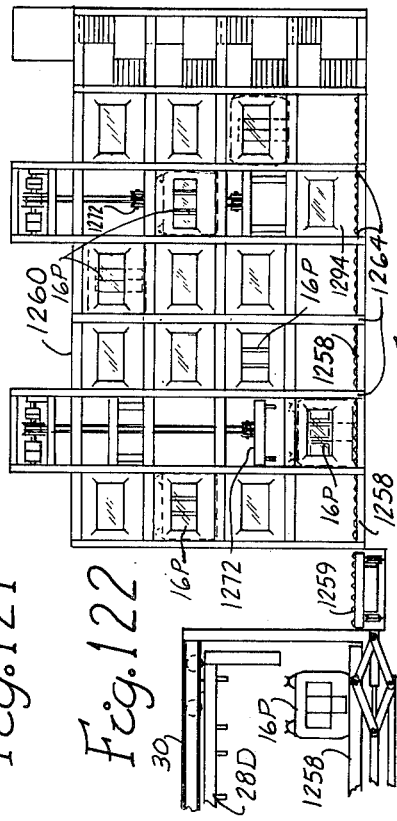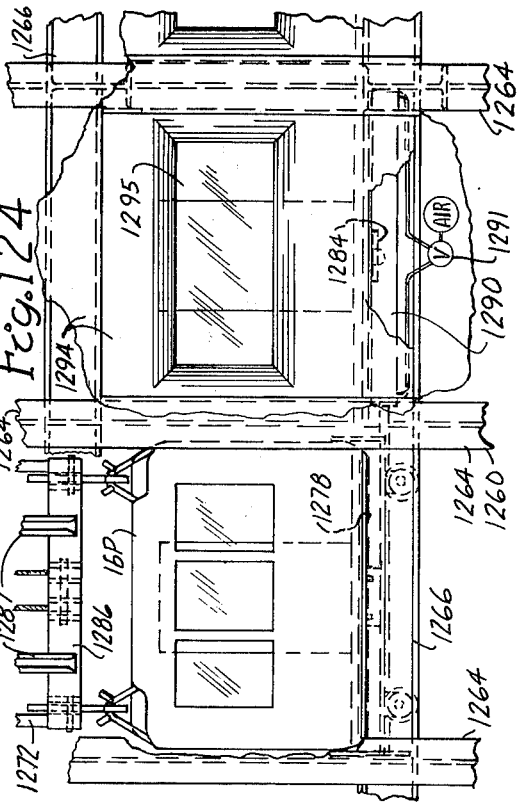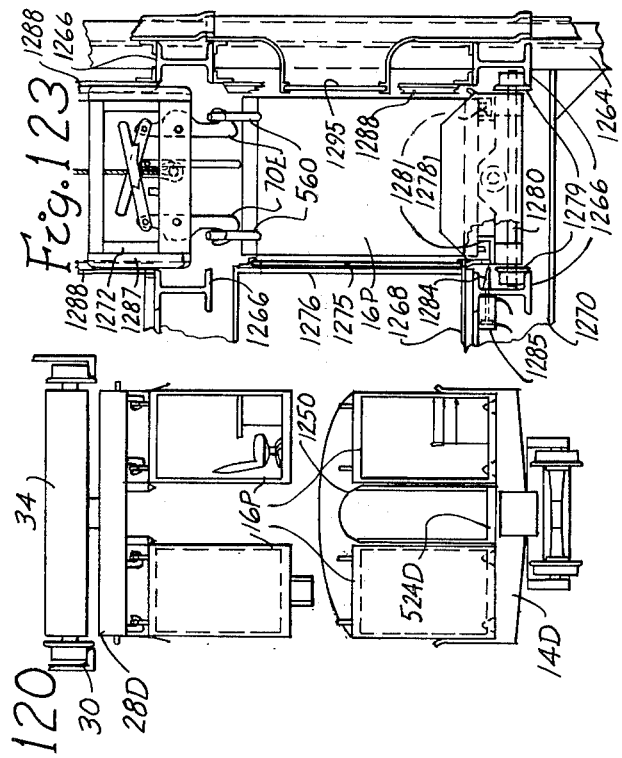

CONTAINER OVERHEAD TRANSFER AND STORAGE SYSTEM

Objects of this invention are to improve the station, container handling vehicles and carrier track to provide greater storage capacity for a given station area, replace the dolley runs with stationary storage spots spanned by a gantry transfer vehicle for transfer of containers between the storage spots and carriers above, to handle containers or trailers of different standard lengths on the same equipment, to provide high level passenger container transfer cars, to simplify carrier movements and eliminate back and forth movements for leading and unloading the carriers, provide level dip transfer, to shorten transfer run, to reduce radius of curves on station track, and to provide a long transfer dip between subway stations to reduce tunneling for this system.

A primary object is to provide overhead container transfer for both freight and passengers in the same train. The freight train can run a better schedule with nonstop container transfer and not be broken up at classification yards and so is suitable for nonstop passenger service and the heavy freight need not stop when passengers are taken on or put off. It is the object to provide a mixed container train with nonstop freight and passenger transfer with passengers transferred on the same dip track as the freight.

This invention simplifies container cars and carriers for both passengers and freight and provides for both to be in the same train and serviced while passing the same transfer run. The vertical coupling for dip transfer is improved and simplified by providing a level dip for transfer and coupling tolerance greatly increased by offsetting vertical couplers at opposite ends to prevent coupling in misalignment. The control and movement of carriers is simplified, the same stops at call sections are used for storing both empty and loaded carriers. Each carrier makes one stop for loading or unloading and is not shifted back and forth for loading and unloading as in my previous freight system. Drum controllers are designed to simplify and improve the automatic control of carriers and enable variations of control and additions to be convient.

It is an object to eliminate signaling between cars in train and carriers at station for loading regular passenger containers by moving the containers from a spot for receiving containers on the car to a spot for removing the containers from the car. Another object is to increase the passenger carrying capacity of the system for mass transit by opening the full side of the container both while on the train and at the station. It is an object to provide handling for large numbers of various sizes of containers efficiently and provide individual passenger type containers with ticket control of transfer, different sizes and types of containers in the same system including containers for use as hotel rooms, offices, shops and hotel and office buildings for these and/or other containers of this system.

Other and further objects and advantages will be pointed out herein or should be evident upon consideration of this invention as described with reference to the accompanying drawings wherein:

FIG. 1 is a plan of a portion of the railway showing the preferred container overhead transfer and storage station for passenger freight train shown moving to the right.

FIG. 2 is a side elevation of the station and train of FIG. 1.

FIG. 3 is a perspective view of the station with train moving by to the right transferring containers.

FIGS. 4 and 5 are respectively plan and side views of carrier with container in position for transfer over a railway freight car in the train.

FIG. 6 is a side elevation of the double dip transfer track with carrier thereon coupled to railway car moving along under the dip for transfer of the container.

FIG. 7 is a perspective view of a swivel truck for the carrier with portion cut away to show interior.

FIG. 8 is an end elevation of the railway car coupled to the carrier for transfer at the station.

FIG. 9 is a floor plan of corner of the railway car taken at elevation 9—9 of FIG. 10.

FIG. 10 is a side elevation of end of the railway car engaging coupling on the carrier.

FIGS. 11, 12, 13, and 14 are sections on lines 11—11, 12—12, 13—13, and 14—14 of FIG. 10, FIGS. 12-14 being to larger scale.

FIG. 15 is a plan view of longer railway car for coupling two carriers.

FIG. 16 is a perspective of carrier frame and container hooks with control shown schematically.

FIG. 17 is a side elevation of the transfer dip with carrier coupled to railway car and dip switch controls shown schematically.

FIG. 18 is a schematic view of a variation of the double dip with self operating upper switches without the bypass and self operating bottom switches separated for placement far apart.

FIG. 19 is a partial end view of the carrier engaging a switch control lever of FIG. 18.

FIGS. 20 and 21 are plan and side views of a simplified carrier for operating on the double dip over straight track.

FIG. 22 is a side view of I-beam trolley self-centering mount on the carrier.

FIGS. 23 and 24 are plan and side views of a further simplified carrier.

FIGS. 25, 26 and 27 are respectively plan, side and end views of a container transfer gantry vehicle at the station with carrier on track above and containers positioned thereby on carrier and on storage pedestals.

FIGS. 28 and 29 are front and end views of a set of container lift arms on the gantry.

FIGS. 30 and 31 are end views of a set of lift arms on guides on the gantry in respectively running position for the gantry and lifted in latching or releasing position to the carrier.

FIGS. 32 and 33 are respectively front and end elevations of a lift arm when lowered to set down or pick up container in storage shown in phantom in relation to container shown on carrier hook.

FIG. 34 is a perspective of recessing cam wheel on a lift arm that runs on channel of guide and up cam to position the hook arm.

FIGS. 35 and 36 are sections of FIG. 31 taken on lines 35—35 and 36—36 respectively.

FIG. 37 is a schematic of the gantries elevator controls.

FIG. 38 is a plan view of right-of-way approach to station from each direction.

Figure 39:
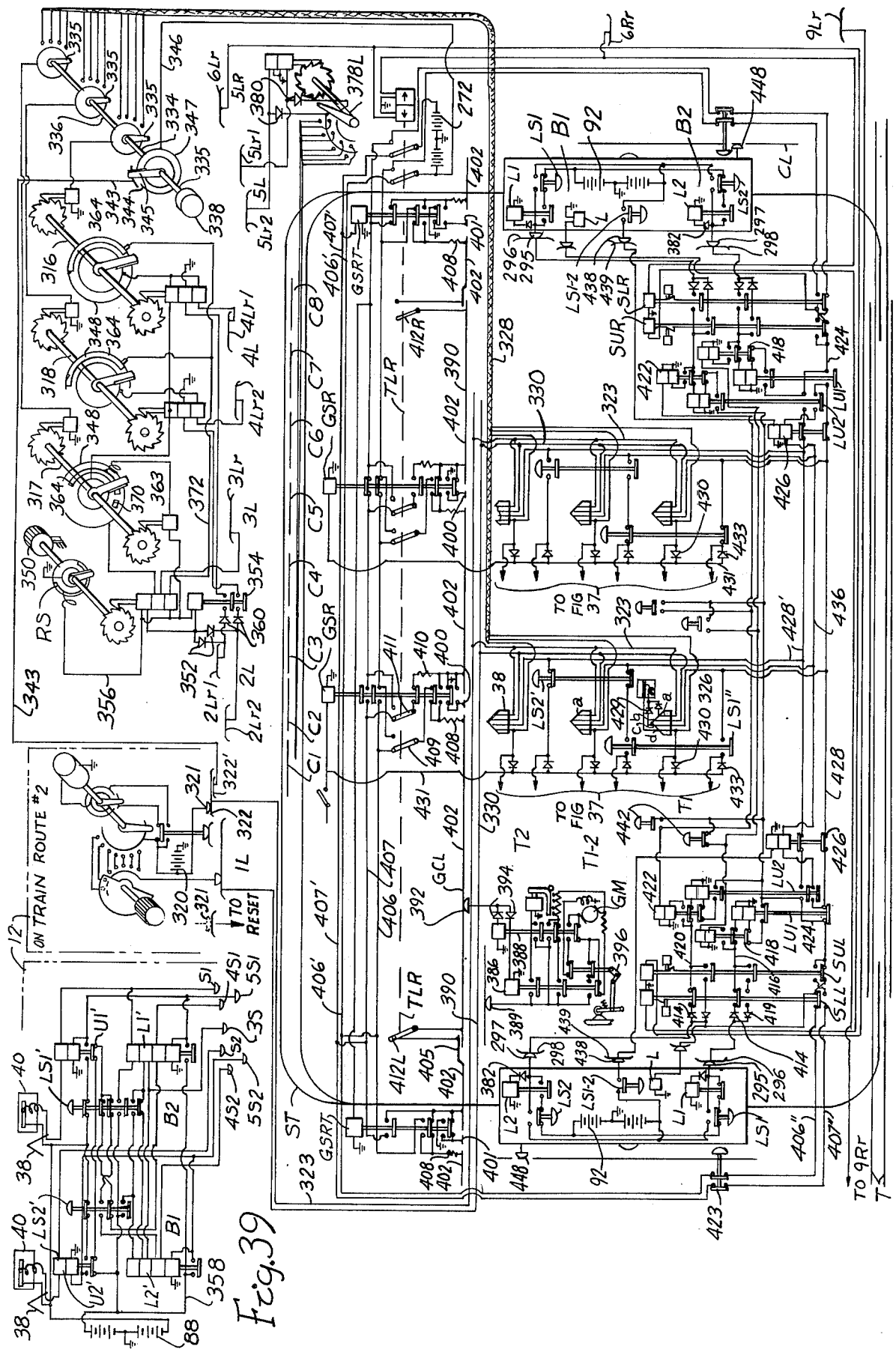

FIG. 39 is a schematic of circuits on and between the train and station and on gantry and carriers for loading and unloading the carriers.

FIG. 40 is a schematic of circuits for controlling movements of the carriers around the station loop track.

FIG. 41 is a control drum rap-out diagram.

FIGS. 42, 43, and 44 are respectively plan, side and end sectional elevations of the passenger transfer container car engaging a carrier at the station, portions being cut away to show details.

FIG. 45 is a plan to larger scale of the vertical coupling extended on the passenger car engaging a coupling channel on a carrier.

FIGS. 46 and 47 are sections of lines 46—46 of FIG. 47 and 47—47 of FIG. 45 respectively to show details of the coupling.

FIG. 48 is a perspective of the hooks for suspending containers from the carrier with controls and circuits shown schematically.

FIG. 49 is an end broken sectional view of the passenger transfer car with carrier therein for transferring one container to and another from the car shown in larger scale than FIG. 44.

FIG. 50 is a plan view of container and car partition doors and operating mechanisms.

FIG. 51 is a cut-a-way of portion of bottom of carrier doors and partition door and operating mechanism.

FIG. 52 is end view of doors of FIG. 51 showing portion of carrier frame on conveyor roller.

FIG. 53 is a schematic of partition door controls for two berths.

FIG. 54 is a schematic of controls for conveyor in container area of passenger car.

FIG. 55 is plan of railway car with three container berths along side with two containers therein.

FIG. 56 is end elevation of carrier with container on track over car of FIG. 55 to larger scale.

FIGS. 57, 58 and 59 are schematics of variations of the station.

FIG. 60 is a side view of a portion of a highlevel container train showing a bi-level passenger container car coupled to a container-trailer car each coupled to a carrier with container for transfer along a transfer run.

FIG. 61 is a section on line 61—61 of FIG. 60 with overhead track support.

FIG. 62 is a plan view of the passenger car of FIG. 60 showing top level with a container.

FIG. 63 is a plan view of the lower level portion of the passenger car of FIG. 60.

FIG. 64 is a station plan with a separate transfer run for high and low level transfer.

FIG. 65 is a schematic plan of a subway using the double dip container transfer.

FIG. 66 is a closer side elevation of a portion of the subway.

FIG. 67 is a variation using an elevator on each carrier.

FIGS. 68, 69 and 70 are plan, side and end views of the subway container car in the subway with FIG. 70 including and view of container and carrier at station above.

FIGS. 71 and 72 are plan and side views of a carrier with container at a station on the subway.

FIGS. 73 and 74 are plan and side views of multicarrier station.

FIGS. 75 and 76 are side and end views of container shifts at station.

FIGS. 77, 78 and 79 are plan, side and sectional end views of the carrier coupled to car with containers arranged for transfer.

FIG. 80 is a schematic of alignment-check track-switch control circuits to open dip for transfer only for carriers aligned and coupled to car.

FIG. 81 is a perspective of portion of railway car and carrier coupled for transfer thereover showing the partitions and shielding.

FIG. 82 is a broken section enlargement of portions of FIG. 79.

FIG. 83 is a perspective of a container and portion of another on conveyor on railway car with shuttle shields and shield drive.

FIG. 84 is an elevation of hook control releasing a container.

FIG. 85 is a perspective of hooks engaging bails on roof of container to show the hook releasing rod for releasing the container at the station and on the train.

FIG. 86 is a side elevation on an individual container subway run between stations.

FIG. 87 is a plan view of carrier tracks at station on the subway, FIG. 86, to reduced scale.

FIGS. 88, 89 and 90 are plan, side and end views of an individual container car with carrier coupled above and containers arranged to mesh.

FIGS. 91, 92 and 93 are respectively perspective, side and end views of the individual container with respectively side and end cut away to show interior.

FIG. 94 is a sectional vied on line 94—94 of FIG. 95.

FIG. 95 is a side sectional view on control on stopping section showing details of door controls.

FIG. 96 is a sectional view of two latch-down cones turned 90 from each other and controls therefore partly in schematic for securing containers to the car.

FIG. 97 is a plan view of a hook yoke for opening hooks at a container spot on the carrier.

FIG. 98 is a partial transverse sectional view of carrier with container to show a hook yoke on the carrier and opening bar on the container.

FIG. 99 is a side elevation of yoke opening frame with spring loaded parallel bar for releasing the hooks at the station.

FIG. 100 is an enlargement of top right corner of FIG. 92 showing rack and gear drive for the hook opening bar.

FIG. 101 is side view of hook opening mechanism with schematic of controls.

FIG. 102 is a schematic of a ticket reader for controlling the mechanism of FIG. 101.

FIG. 103 is a side elevation of station of FIGS. 86 and 87 to larger scale with unload and reload conveyor sections lifted.

FIGS. 104 and 105 are respectively plan and transverse sectional elevations of station through unload conveyor.

FIG. 106 is side view of portions of FIG. 103 to larger scale with unload and reload conveyor sections down.

Figure 107:
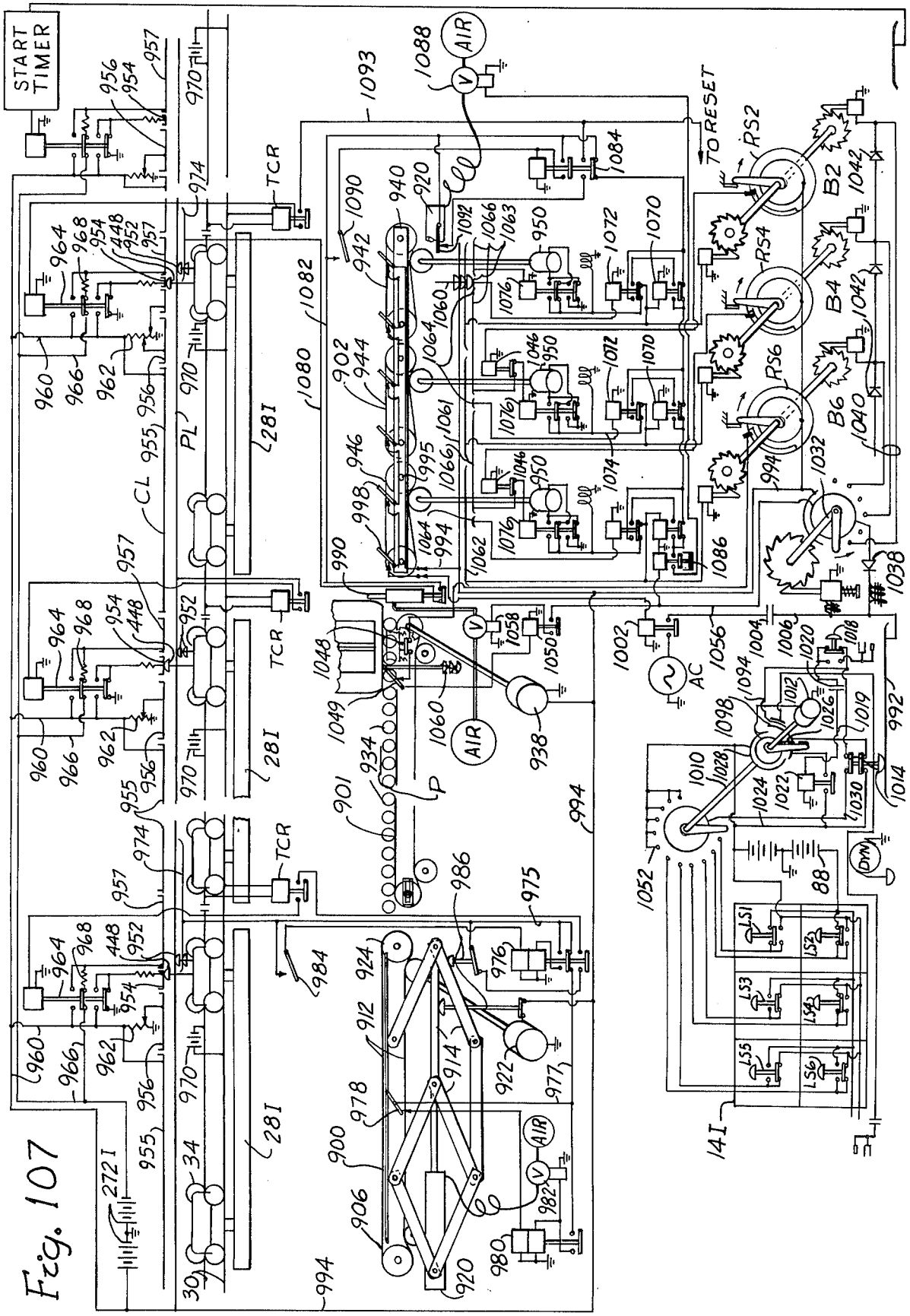

FIG. 107 is a schematic of controls for the station in FIGS. 86–87 and 103–106.

FIGS. 108 and 109 are respectively plan and side elevation views of a subway type container station with storage for various sizes and types of containers with train passing under station.

FIGS. 110–112 are respectively plan, side and end elevations of carrier and car on bottom of transfer run on subway of FIGS. 108 and 109.

FIGS. 113 and 114 are respectively end and partial side views of container to larger scale with hooking and latching controls shown schematically.

FIG. 115 is a sectional elevation on line 115—115 of FIG. 108 showing container on transfer table aligned in carrier at the station.

Figures 116, 117:
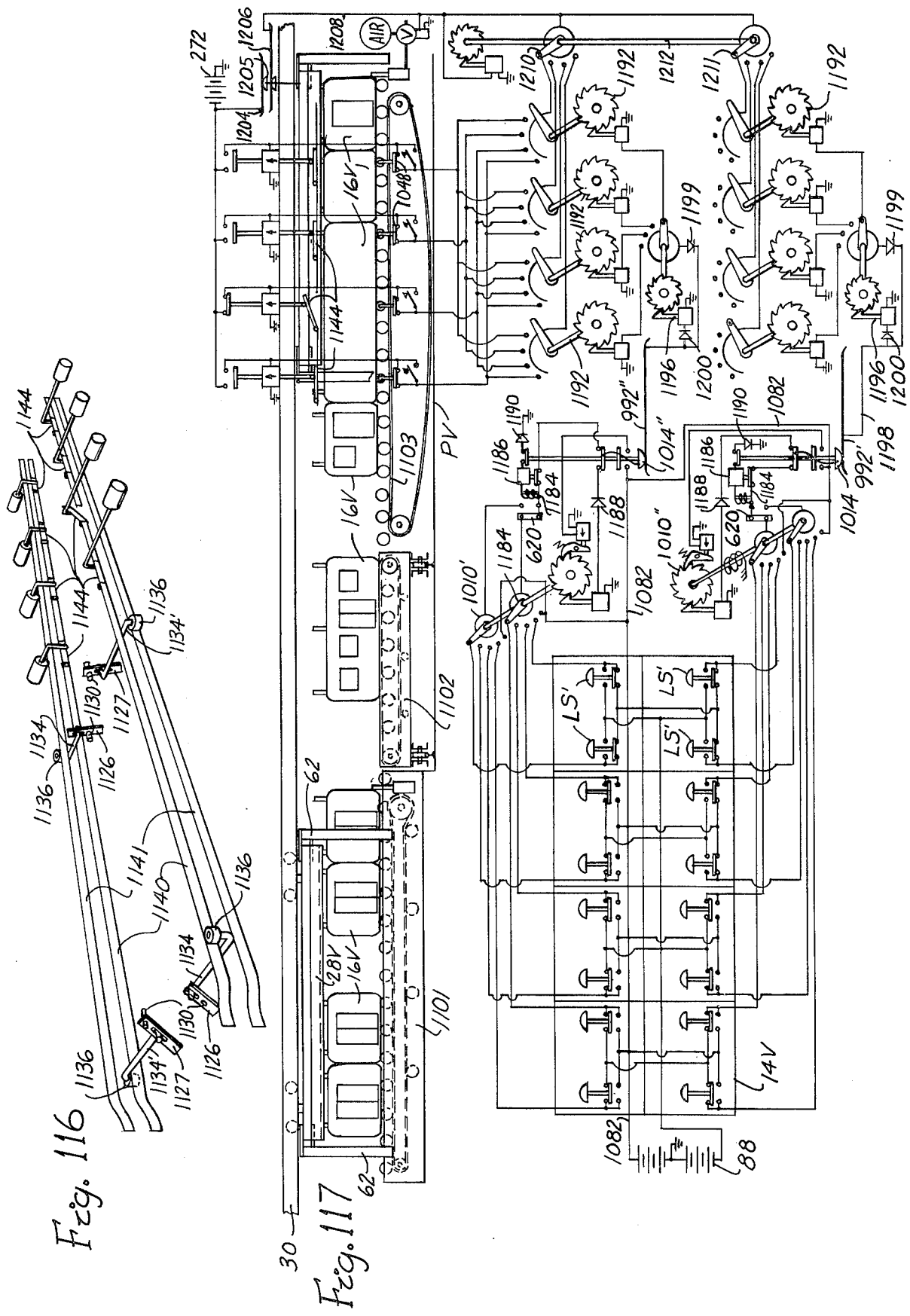

FIG. 116 is a perspective of carrier loading controls along station.

FIG. 117 is side view of near side (traffic from left) of the station FIG. 108 to larger scale and showing loading controls schematically between a car in train and the station.

FIGS. 118, 119 and 120 are respectively plan, side and sectional end views of a variation of the container car with carrier shown coupled in FIGS. 119 and 120.

FIGS. 121 and 122 are respectively plan and side elevation of container hotel-office-storage building with container conveyors thereto and portions cut away to show container handling.

FIGS. 123 and 124 are sectional elevations to larger scale of respectively end and side of an elevator-berth unit of the building of FIGS. 122 and 123 with a container on elevator at berth set on rack to insert into berth.

In the Figures like reference characters designate similar parts.

MIXED CONTAINER TRAIN

Referring to the drawings and in particular to FIGS. 1—3, mixed passenger and freight container train 12 passing container transfer and storage station TS on track T has one or more passenger container cars 14 for transfer of passengers to and from the train in containers 16, one or more coach type passenger cars 17 coupled thereto at head end, and freight container cars 18 of length for two 20 ft. containers 20F or one 40 ft. container 22F and cars 18' for twice as many containers 20F or 22F.

FREIGHT AND PASSENGER CONTAINER STATION

Station TS has a container storage area SA straddled by one or more container transfer gantries 24 on track GT, truck loading-unloading area TA covered by the gantry, and a passenger container load-unload platform PA, all connected by a suspended station track ST in the form of a rectangular loop having one side centered over track T for a double dip transfer run 26 of wide gage, ends of loop run at right angles over track GT above gantry 24, and the far side from track T serving to store one or more passenger container carriers 28P and/or freight container carriers 28F which run on track ST. The far side of track ST has a passing siding STS to separate the passenger carriers to platform PA. Station track ST has two channels 30 spaced wide gage for the transfer run, the rest of track ST being either wide gage or as shown I-beam type monorail 32 which enables sharper turns than practical with the wide gage. Carriers 28F and 28P on this track therefore have I-beam trolleys 33 secured central to top of wide gage trucks 34. The ends of channels 30 are flaired out to receive the wheels of trucks 34 and overlap the I-beam rail 32 to effect a smooth transition and provide continuous support for the carriers between I-beam and wide gage portions of the suspended track ST.

The container storage area SA has rows of spots or storage berths SB for containers lengthwise in rows of carrier length across the storage area which the gantry spans. Each row can hold one 40 foot or two 20 foot containers end to end. The berths for 20 foot containers closest to track T are for loading in the first berth on cars in train 12 and are labled tier T1. Those for 20 foot containers next behind are in tier T2. The 40 foot containers in storage are in both tiers or tier T1-2. Each berth preferably has pedestals 36 with latchdown catches 37 on top as in my U.S. Pat. No. 3,528,569 and has at least one receptical 38 for connecting circuits to a route reader 40 on each container 20F and 22F.

CONTAINER CARRIERS

Referring to FIGS. 4–8 and 16, carriers 28F have a rectangular frame 42 suspended from a truck 34 at each end by a swivel tube 44 secured on a bearing disc 46 mounted at the bottom between ball raceways 48 secured to the frame 42 so the tube is centered between the sides of frame 42 and held vertical thereon to swivel. The upper end of tube 44 has a transverse pin 50 bearing mounted in the truck's frame 52 to secure the truck to tilt up and down to run on inclines of the double dip 26 while maintaining the carrier level (FIG. 6). Truck frames 52 support traction motors 56, FIG. 7, where required for self-propelled carriers. Trucks 34 have wheels 58 along each side outboard beyond the frame of the carrier to enable the carrier to operate on the double dip and vertical switches 60.

The carriers have a vertical coupling channel 62 at each end secured to right of center depending from frame 42 legs endward. Rollers 63 on shafts 64 are secured between the legs of channel 62 for engaging vertical coupling 66 on the cars. The carriers have end cushioning bumpers or shock absorbers 68 and do not need end couplers in the operation to be explained.

The carriers have automatic hooks 70 pivotally secured on brackets 72 along the sides of frame 42 for engaging in pockets 72 on the containers. The hooks or suspending means and control can be of any suitable type such as disclosed in my U.S. Pat. No. 3,483,829, FIG. 45, col. 30, lines 15–38, or preferably as described herein with FIG. 16 where the hooks for each 20 foot section of container are connected to operate together. These improved hooks have an arm 76 extending up above the pivot 78 and an air cylinder 80 pivotally connected between frame 42 and the top of each arm 76. Cylinder 80 has a spring 81, FIG. 8, between its piston and rod end to bias the hook to open and/or is double acting, FIG. 16. Hooks 70 each have an upturned tooth so not to open when supporting the container. The head ends of cylinders 80 are connected by hose, tubing and fittings through a solenoid valve 82 for each 20 foot container length to air pressure tank AIR when deenergized and to exhaust when the valve 82 is energized, the rod ends being reversely connected through the same valve. A container removal lamp 84 for each berth on car 18, controlled as in FIG. 15 of my U.S. Pat. No. 3,483,829, directs light up to a photoelectric cell 86 controlling relay U1 or U2 for that berth to energize the solenoid of valve 82 of the carrier berth aligned over a container to be removed from the car to close hooks on the container. Lamp 84 is lit by circuit from positive of battery 88 on car 18, contacts on a receptical 38 to and from route reader 40 completing circuit for container to be removed, lamp 84 for that berth to ground of battery 88. The solenoid of valve 82 for first berth is connected across battery 92 through front contacts of relays L and U1' in parallel. Likewise solenoid of valve 82 for second berth is connected through a second front contacts of relay L in parallel with front contacts of relay U2'. Relay L closes the hooks for loading at the station as will be described with FIG. 39. Relays U1' and U2' control hooks selectively to close on only containers which route reader 40 determines to be put off from car 18.

FREIGHT CONTAINER CAR

Car 18 has a flat bed or frame 94 supported on swivel trucks 96 on same center distance as trucks 34 on carrier 28F and has catches 37 mounted on the bed or on pedestals 36, FIG. 60, as in my U.S. Pat. No. 3,528,569. These are spaced to align latch-downs 37' on the containers to lock the container or trailer to the car.

Car 18 has a vertical coupler 66 at each end. Coupler 66 has a vertical channel 98 with outer edges of legs turned in to form a track for wheels 100 mounted on sides of a vertical rectangular tube 102 to roll up and down in channel 98. An air cylinder 104 extends up from bottom of channel 98 with rod end on shaft 105 between bottom rollers 100 for extending coupling 66 to engaging position shown in FIG. 10. A formed latch plate 105 secured to top of tube 102 engages bottom roller of coupling 62 to recess tube 102 past forward coupler 62 on the carrier aligned. The bottom of channel 98 is pivotally secured between brackets 108 to frame of car 18 to swing in vertical plane parallel the car and off center the same as coupling 62 on carrier 28F to engage therewith when extended by cylinder 104. The coupling 66 is held vertical by a dashpot 110 on each side of car 18 and connected at top of channel 98 by a tubular section 112. Dashpot 110 cushion coupling by swinging endward the car against restoring force of spring 113 in each dashpot and can release a coupling at unsafe speed difference by moving back and down to position shown in phantom, FIG. 10. This coupling will only engage the end of a carrier 28F aligned for coupling, and will not engage the wrong end on the carrier because the couplings are similarly offset from center on each end of both the carrier and car, FIG. 4.

Vertical couplings 66 on car 18 are extended only if transfer is required and a carrier is arranged for the transfer. Couplings 66 are extended only on these cars when cam switch 114L engages rail 115 extending along track T for the transfer run, completing a circuit from positive of battery 88, front contacts of relays U1, U2, L1 and L2 in parallel, cam switch 114 closed by rail 115, solenoid of valve 116 to ground, connecting pressure from AIR' to head end of cylinders 104 to extend couplings 66 on car 18 to couple the next carrier. Ends of rail 115 can be segmented into car 18 lengths and controlled as described for FIG. 51 of my U.S. Pat. No. 3,483,829 to extend couplers on successive cars for coupling one car length sooner, or the carriers moved forward as each is coupled as will be described with FIG. 40. If car is turned cam switch 114L is parallel with 114R on 115.

Referring to FIG. 15, car 18' has two sets of couplers 66 each for coupling a carrier on either end for transfer of containers along only straight track T.

DOUBLE-DIP TRANSFER TRACK

Referring to FIGS. 2, 3, and 17 the channel rails 30 of track ST along the transfer run each has two vertical switches or half switches 60L in rail on left and the opposite half 60R in rail on right on truck centers distance apart to turn down into two identical dips, slopes DS down and back up to two opposite hand half switches 60R and 60L, so the passenger and freight carriers having identical truck centers can travel over or down and up this double dip substantially level. The inclines DS can be steeper than if the carriers were tilted thereby and the length of right-of-way for the inclines down and up shorter than with the single dip, FIG. 44 of my U.S. Pat. No. 3,483,829. This improved dip greatly reduces alignment problems and maintains the load level reducing shifting of the load and strain on the hooks and enables the improved and simplified vertical couplings 62 and 66 to be used.

The upper vertical switches 60 each have a straight switch section 60L and 60R in opposite rails 30 bridging turn down curves 120L and 120R respectively. Opposite switch sections are secured together parallel on pin 122 supported in brackets 123 as a hinge on top of channels 30 to swing up and have an arm 124 secured thereto connected by linkage 125 to air cylinder 126, which is pressurized to open the switches to the curve down after the first truck of the carrier has passed the first switch and engaged shoe 128 on rail 129 before the second switch down, to open both switches 60 for both trucks of a carrier to simultaneously enter a curve down.

Switches 60 are controlled to open the dip only if the carrier is aligning (ie. coupled to) a car in mesh (ie. containers aligning empty spots). Car 18 has a lamp 130 connected across battery 88 in series with limit switch LS1' for first berth closed when the berth is empty to direct light to photoelectric cell 132 on carrier connected to energize relay 134 for the aligned berth. A switch control circuit is closed from positive of battery 92 on the carrier, front contacts of relay 134 for each berth in series, each relay 134 having across its contacts a limit switch LS1 or LS2 opened by a container in that berth, direction reverse switch 136 to shoe 128 on right side of lead truck engaging rail 129 at time to open switches, solenoid of valve 137 to ground, to open switches 60 for carrier to enter dip. Cylinder 126 is preferably double acting to close switches 60 by air quickly as the trucks clear into the dip as shoe 128 leaves rail 129 for the first truck of the next carrier to run over the first switch 60 before opening the dip.

At the bottom of the middle down slopes 120L and 120R are vertically curved opposite switches 61L and 61R pivoted at 138 to the top of the outer bottom end of the down slope channel 30 and connected together by lever arms 139 and linkage 140 to alternately drop and lift in balance. Wheels 58 coming down a middle slope 120L will lower switch 61L at end of the down slope which raises adjacent switch 61R for these wheels to pass under. Wheels of the second truck of the carrier meet the bottoms of switches 61L or 61R to lift them lowering the forward switches 61R or 61L to run the trucks up their respective inclines.

Switches 60 are opened by trucks 34 rising from the dip and can be pushed open by the trucks but are preferably opened while the carrier is on the assent by shoe 128 on the forward truck connecting with rail 144 along the dip. Rail 144 is connected to solenoid of valve 137 for opening switches 60R and 61R with the circuit from battery to shoe 128 described.

The carriers can operate in either direction through the dip. In the reverse direction (right to left) switch 136 connects power to shoe 128' on far side of the front truck (now on left) which engages rails 129' and 144' connected respectively to rails 144 and 129 so the dip appears and operates the same from either direction.

Each switch section can be operated by a cylinder 126 or one cylinder used for all four switch section to open a dip. Switches 60 can be operated by the rod of cylinder 126 engaging arm 124 to open the switch or by a wheel 58 engaging the bottom of the switch. On dips for one direction of traffic cylinders for exit switches can be omitted for low speed operation but for high-speed operation the control to operate switches ahead of the trucks is preferred to eliminate pounding.

Where the dip bypass is omitted, FIG. 18, the middle switches 60 are omitted, and the outer switches 60 at each end of the dip can be operated as described or by a lever 140 connected by rope 141 to arm 124 of switch 60 to open that switch for the rear truck of the carrier when the forward truck pushes lever 140 forward.

Where bottom switches 61' are far apart, FIG. 18, they can be controlled so the first wheels 58 leaving the dip pass straight and actuate a directional lever 142 to lower the switch 61' for the second truck or set of wheels to start up the incline. Switches 61' are held open by spring or counterweight 143 and are closed by desending wheels from the top and swing back up. In the opposite direction they are up to let the first truck pass straight under. This truck operates a one-way lever 142 connected by rope 145 to lower switch 61' for the second truck to start up the incline as the first truck reaches the curve up. Lever 142 is engaged by underside of truck 34 as shown in FIG. 19.

SIMPLIFIED CARRIERS

Since the wide gage transfer run 26 can be straight track as viewed from above and central I-beam 32 used for curves, the carriers can be modified as shown in FIGS. 20–24 to omit the truck swivels for straight transfer dip runs.

The carrier 28', FIGS. 20–21 has trucks 34' with side plates 148 connected by yoke 149 and pivoted on pins 150 on transverse axis to frame 42 of carrier 28' to tilt up and down with two wheels 58 outboard on each side plate to follow dips of run 26. A trolley 33 is mounted to turn on a vertical pin 152 central on each truck 34' for horizontal turns on the I-beam 32 beyond ends of rail 30 and is held parallell the length of the carrier to engage the I-beam rail by a spring 154 or other self-centering device, FIG. 22.

The carrier 28", FIGS. 23–24 has four outboard wheels 58 on two axles 155 bearing mounted through holes in its frame 42' and the swivel trolleys 33 mounted on vertical pins 152 secured to frame 42' central over axle for each pair of wheels 58. Such a carrier would be for light loads and can be powered or otherwise moved into position for coupling and transfer.

GANTRY

One or two gantries 24 cover the storage area SA to put containers into berths SB or remove them and load and unload the carriers as required to meet the trains.

Referring to FIGS. 3 and 25–37, the preferred gantry 24 has a horizontal rectangular open frame 160 spanning the storage area SA for passing containers to and from the carrier above and the storage spots below. Frame 160 has four columns 162, two at each end of height to clear under the frame of the carrier 28F', FIG. 26, a truss 164 along each side between columns 162 at a height to clear the tops of containers or trailers in storage and below hooks 70 on the carriers, and a sill 166 along each end supporting the columns on wheels 168 bearing mounted between sides of each sill 166. Columns 162 are offset at 170 inward from the end for clearing between the vertical couplings 62 on the carriers. Upper cross member 172 connects columns 162 on each end at height below vertical couplers 62 on the carrier above so the loaded carriers can run between columns 162 and trusses 164 to and from stopping position over the gantry for transfer of containters therebetween. Each wheel 168 of the gantry is driven by motor GM through usual type gear reduction, shaft, gears, roller chain and sprockets except vertical shafts 174 are tilted for clearance.

Storage pedestals 36 are high enough to support semitrailers 20S thereon with room for the trailer's wheels 175 below. The carrier 28F' shown over the gantry for handling containers or trailers is the same as 28F except the coupling channels 62' are longer to extend below wheels 175 on the semitrailer. This carrier will operate on a higher trransfer dip to provide the additional clearance, and is shown over the gantry to establish the clearance for it. Either carrier 28F or 28F' can be loaded or unloaded by gantry 24 on track ST above.

The gantry has an elevator 176 having two lift sections 177 along each side for lifting containers in 20 or 40' lengths by simultaneous operation of a selected number of opposite pairs of sections. Each lift section has two oppositely facing hook assemblies 178 with two hooks 180 on each side of a 20' container spot connected by a horizontal ledge member 181 between the hooks on each side. The lift sections are selectively synchrocoupled to operate in opposite pairs of one or two adjacent sections. Additional shorter lift sections could handle containers in lengths of 10, 20 or 40'.

Each lift section 177 has two vertical I-beam guides 183 secured flange to each truss facing and aligning those on the opposite truss; an intermediate guide 184 of three vertical channels, two 185 faced legs together and spaced apart on back of third 186 faced legs over the inner flanges of each guide 183 on which guide 184 is held by rollers 188 secured at top of intermediate guide 184 to roll one in each trough of I-beam 182 and rollers 190 secured at bottom of each I-beam 183 to roll in trough of facing channel 186; and a support comprising assembly 178 wherein horizontal ledge or tooth member 181 is secured on two vertical hook arms 180 each pivoted on a pin 196 with roller 198 and link 199 to roller 200 on the opposite side of link 199 between facing channels 185. The lower rollers 198 are spring loaded outward on pins 196 and are each directed out from the trough of the channel 185 on which each rides by an incline 201, FIGS. 33 and 34, near top of travel and snaps out over on side of channel 185 where it rides by opening 202 through which it emerged from the trough of the channel. The support 181 has an upstanding lip or leg 204 along the outer edge to engage the side of the container on ledge 181 and an apron 206 from the inner edge of the ledge at angle down and back for camming the support out when engaging the top of the container. The ledge 181 drops under the container when moved down below the container and is synchronized with the opposite support to hold the container thereof between legs 204. A cam lobe 208 extention of arm 180 above roller 198 engages side of container to steady the load and ensure engagement.

Ropes 210 and 211 are secured to top of respectively each link 199 and intermediate guide 184 and run up over a sheave 212 on top of truss 164 and down the outside and around respectively the larger and smaller diameters of stepped drum 214 to move arms 180 about twice as fast as the intermediate guides 184. The stepped drums 214 for each section of hoist on each side of the container area are secured on a shaft 216 turned by worm gear 218 engaging worm 220 secured on vertical shaft 221 aligning shaft 222 connected thereto by a hydraulically operated positive clutch 224. Each shaft 222 is connected by beveled gears 226 to a shaft 228 supported along that truss. Shafts 228 are connected by miter gears 230 and shafting 231 down and 232 across an end of the gantry. Shafting 232 is driven by motor HM through reducer 235. Worms 220 hold the elevators from lowering except when driven.

GANTRY HOIST CONTROL

Referring to FIG. 37, power is connected to gantry hoist motor HM from shoe 236 on power line 237 along the gantry track, front contacts of starter relay 238 to line 240. The armature of motor HM is connected through contacts of reverse relay 242 between line 240 and ground and its field between line 240 and ground. Drum 244 controls motor HM according to signals received on four brushes $1b$, $2b$, $3b$, and $4b$ mounted on slide assembly 246 on track 247 secured to frame of the gantry so brushes slide lengthwise on drum 244, Drum 244 with four slip rings 01, 02, 03, and 04, and worm 248 are secured concentric on shafting 232 to turn therewith. Worm 248 is engaged by finger 252 on brush assembly 246 to slide the assembly on track 247 along drum 244. Drum 244 has a nonconducting face 254 with conductive segments 1S, 2S, 3S, 4S, and 5S engaged by one or more of the brushes at respectively: start up, top limit, start down, bottom limit, and stop at gantry running position for the brushes and hoist. The brushes are spaced relative to the segments and energized as follows: brush $1b$ energized for picking up container from below, brush $2b$ for setting down container, brush $3b$ for loading container on carrier, and brush $4b$ for removing container from carrier. The hoist lowers farther to release container than to engage container on storage spot, since hooks 180 open by lowering below engaging position. Brush $1b$ therefore engages segment 4S before brush $2b$. The hoist raises higher to unload the carrier (release hooks) then to load the carrier, so that hooks as in my U.S. Pat. No. 3,257,142 can be used on the carrier, therefore brush $3b$ is positioned to engage segment 2S at top of travel for engaging hooks on the carrier with container and brush $4b$ is set behind brush $3b$ to engage segment 2S at higher top of travel for release of the hooks. Thus when brush $1b$ or $2b$ is energized the hoist moves down respectively to engage or farther to release a container, and when brush $3b$ or $4b$ is energized hoist moves up to respectively load or further to unload the carrier before reversing. The hoist is reversed at these double upper and lower limits of travel and returns to gantry run position where the live brush engages stop segment 5S to disconnect power and stop hoist. With hooks 70 controlled as in FIG. 16 brushes $3b$ and $4b$ can be connected as one. Rectifiers 256 and 257 are connected to pass current from brush $1b$ to $2b$ and from $3b$ to $4b$ respectively, ie from outer to adjacent brush.

Connections from drum 244 to hoist controls are from segment 1S to ring 01, top coil of starter 238 to ground, to start the hoist up; from segments 2S and 3S to ring 02, middle coil of starter 238 and coil of reverse relay 242 in parallel to ground, to reverse armature connections and then start motor HM to lower hoist, the starter having dashpot or time delay; from segment 4S to ring 03, coil of relay 258 to ground, to open holding circuit of reverse relay 242 to return hoist up; and from segment 5S to ring 04, coil of relay 260 to ground, to open holding curcuits to stop hoist and disconnect power from the live brush and connect brake solenoid 261 to stop hoist. Relay 260 has a dashpot to only delay closing until after the starter relay 238 drops.

Power is put on brush $1b$ or $2b$ by circuit from positive of battery 262, back contacts of relay 260, line 263 to middle front contacts of relays 265 and 264 for elevator section over tier T1, to line to respectively brush $1b$ or $2b$. Relays 264 and 265 are lifted respectively by circuit from negative and positive of battery 272 at station through manual switches 274 and 275 to respectively rail 278 and 279 engaged by shoe 280 and 281 respectively when the gantry is aligned for transfer over the storage spot, top coils of relays 264 and 265 respectively to ground, lifting relay 264 to signal unloading or 265 to signal loading the gantry over tier T1. Relays 264 and 265 close holding circuits from line 263 through their top front contacts to their lower coil to ground. Similarly relays 264' and 265' are connected for the elevator section over tier T2. Relays 264 and 265 connect line 263 through their lower front contacts in parallel to line 282, solenoid of valve 284 to ground to couple the elevator over tier T1. Relays 264' and 265' connect line 263 through their front contacts in parallel to line 282', solenoid of valve 284' to ground to couple elevator over tier T2. Valve 284 or 284' when energized connects pressure from pump 288 drawing fluid from tank 290 to cylinders of the coupling clutches 244 for berth over tier T1 or T2 respectively to engage these positive clutches before the elevator drums turn. Valves 284 and 284' when deenergized exhaust the cylinders through orifices 292 and 292' to tank to release clutches 244 after the hoist has stopped. The operator closes switch 274 to lower hoist over tier T1 to set down a container or switch 275 to lower the hoist to engage one to pick up over tier T1 to respectively enter or remove a container in the system as where containers are received or delivered to trucks. Similarly he can operate switches 274' and 275' for tier T2.

When a container is put in storage a routing card is inserted in reader 40 thereon as in my U.S. Pat. No. 3,483,829 and the container called out by train to take it on its route for which the gantry is automatic as will be explained with FIG. 39.

Power is put on brush $3b$ or $4b$ by circuit from positive of battery 262 through bottom front contacts of relays 292 and 292' in parallel to brush $3b$ and of relay 293 and 293' in parallel to brush $4b$. Line 263 is connected through top front contacts of relays 292 and 293 in parallel in line 282 to solenoid of valve 284 and through top front contacts of relays 292' and 293' in parallel to line 282' to solenoid of valve 284' and through top front contacts of relay 292' and 293' in parallel to line 282' to solenoid of valve 284' to couple the hoist drive to drums in sections of elevator to be operated according to loading or unloading requirements of the carrier in position for transfer over the gantry.

Each carrier 20F engages its shoe 295 for berth B1 with rail 296 and shoe 297 for berth B2 with rail 298 over the gantry track at either end to signal loading with a positive shoe or unloading with a negative shoe for each berth. Circuit for loading berth B1 on carrier at right is from positive of battery 92, contacts of limit switch LS1 closed when berth is empty, front contacts of relay L1, shoe 295 engaging rail 296 in loading position along track ST, rectifier 299, front contacts of relay SLL or SLR for left or right end of station, rail 300 for tier T2, shoe 301 on gantry when aligned for transfer, rectifier 302, coil of relay 292' to ground, lifting relay SLL or SLR and relay 292' to load carrier berth B1. Circuit for unloading berth B1 is from negative of battery 92, contacts of limit switch LS1 closed by container in that berth, shoe 295, rail 296, rectifier 303, front contacts of relay SUL or SUR, rail 300, shoe 301, rectifier 304, coil of relay 293' to ground. Similar connections for berth B2 lift relay 292' or 292 for loading or relay 293' or 293 for unloading respectively at left or right. Track ST over the left end of the gantry track has rails 296 and 298 reversed from those at right, since the carrier is facing in the opposite direction at opposite ends of the station loop ST. Relay SLL for train from left or SLR for train from right is lifted to signal for loading, and relay SUL or SUR is lifted for unloading, so that a carrier just loaded or passing the opposite end of the gantry run is not unloaded. Circuits for energizing relays SLL, SLR, SUL and SUR will be explained with FIG. 39.

WAYPOINTS AHEAD OF THE STATION

When the train is about 10 miles ahead of the station it signals from waypoint 1L, FIGS. 38 and 39, resets controls and signals a number representing the train's route to step to this number ratchets of reader 40 on containers in storage at the station similarly as in my U.S. Pat. No. 3,483,829. All containers on storage for the train route complete a circuit through the reader. These containers are counted in tiers in T1, T1-2 and T2 separately on ratchet stepping switches 316, 317 and 318 respectively. Circuits are from positive of battery 320 on forward car or locomotive of train 12, shoe 321, rail 322, line 323 to contact a of plug 38 for each storage spot, rectifier 326, connection through reader 40 on container for train, contact d of plug 38, wire in harness 328 to corresponding contact of rotary switch 334 having contacts connected to plugs 38 in each tier arranged around the switch for separate engagement by a wiper 335 for each tier making connections from tiers T1, T1-2 and T2 to coil of top ratchets of steppers 316, 317 and 318 respectively to ground, for counting the containers in tiers T1, T1-2 and T2 separately for the train. Switch 334 has shaft 336 to which wipers 335 are secured and driven by gearmotor 338 started by signal from train at waypoint 1L by circuit from positive of battery 320 on first car or locomotive, shoe 321, rail 322, line 343, segment 344, wiper 345, motor 338 to ground of battery 320. Shaft 336 continues to make full revolution by connection from positive of battery 272, line 346, segment 347, wiper 345, motor 338 to ground. When switch 334 returns to start position shoe 321 has left rail 322 and switch 334 has connected each storage berth once to top ratchet of counters 316, 317 or 318 according to tier to set a segment disc 348 on each counter to number of containers in that tier for the train. The number of carriers available at the station is set on counter RS by knob 350 as in my U.S. Pat. No. 3,483,829.

At waypoint 2L, just after 1L, cars 18 in the train which have one or more containers for the station complete a circuit from negative of battery 88, contact a of plug 38 in each berth to back plate and brush of reader 40 on container in the berth, contact b of the plug 38, coil of relay U1' or U2' for respectively the forward or rearward berth on the car according to direction of travel, shoe S1 or S2 for respectively berths B1 and B2. Shoes S1 and S2 engage respectively rails 2Lr1 and 2Lr2 at waypoint 2L. Rails 2Lr1 - 2 are each connected in series through a rectifier 352 to coil of relay 354 across which is connected top coil of ratchet of counter RS to extend its pawl; line 356; arc and wiper of RS to ground, to subtract one carrier from number available at station after this circuit opens. Relay U1' or U2' for berths having containers for the station are thus energized and close holding circuit from negative of battery 88, normally open contacts of limit switch LS1' or LS2' closed by the container in the berth, front contacts and coil of the relay U1' and U2' to ground, to reserve the car for transfer. If the car has a 40' container for the station both relays U1' and U2' are lifted and held.

If a berth is empty on car with container to be removed and station has a 20' container for the train relay U1' or U2' completes a circuit from positive of battery 88, line 358, normally closed contacts of limit switch LS2 or LS1 closed when berth B2 or B1 is empty, top coil of relay L2' or L1' of empty berth to shoe S2 or S1 on respectively rails 2Lr2 or 2Lr1 each separately connected through a rectifier 360 and front contacts of relay 354 to middle coil of bottom ratchet on counter 318 and 316 respectfully to ground, to subtract a 20' container from those in tier T2 or T1 which corresponds with the empty berth on a car having a 20' container to be removed. Relays L1' and L2' each close a holding circuit from positive of battery 88, front contacts and coil of the relay to ground. Thus the car is reserved for unloading one berth and loading an empty berth.

At waypoint 3L a train length closer the station, empty cars 18 can complete a circuit from positive of battery 88, line 358, normally closed contacts of limit switches LS1' and LS2' in series, second coils of relays L1' and L2' in parallel, shoe 3S which only engages rail 3Lr or 3L (and 3Rr at 3R), middle coil of carrier counter RS; outer ring, wiper 363, segment 364 and bottom ratchet coil of counter 317, line 356; arc and wiper of carrier counter RS to ground, to subtract a carrier and reserve the car for loading to limit of carriers and 40' containers for the train. When reservations for taking all 40' containers for the train are made wiper 363 leaves segment 364 and engages segment 370 by the stepping of bottom ratchet of counter 317 changing this circuit from segment 370, inner ring of counter 317, top coils of bottom ratchets of counters 316 and 318 in parallel respectively through ring, wiper and segment 364 of the counter to line 372 to bottom coil of ratchet of carrier counter RS, line 356 to arc and wiper of counter RS to ground, to subtract a 20' container from the count in each tier and a carrier to limit a number of 20' containers in tiers T1 and T2 or to limit of carriers for the train.

At waypoint 4L, a train length closer the station from waypoint 3L, reservations are made for any additional 20' containers for which there are not enough empty cars in the train so these containers can be put on cars 18 which have not yet been reserved for transfer but have one empty berth, to limit of carriers available.

Therefore reservations are made by circuit from positive of battery 88, line 358, back contacts of relays U2' and U1' in series, normally closed contacts of limit switch LS1' in series with normally open contacts of limit switch LS2' both in parallel with the opposite contacts of these limit switches in series, respectively to second from bottom coil of relays L1' and L2', shoes 4S1 and 4S2 respectively engaging rails 4Lr1 and 4Lr2 separately at 4L, bottom coil of bottom ratchet of counters 316 and 318 respectively; ring, wiper and segment 348 of the respective counters to subtract a 20' container from the tier corresponding to the empty berth on the car; line 372; bottom coil of ratchet of carrier counter RS; line 356; segment and wiper of RS to ground, to subtract a carrier to limit of carriers or limit of containers for train or empty berths on train to stop reservations thereat. Thus reservations are made (relays U1', U2', L1' or L2' lifted and held) only when a carrier is available for a transfer desired; and these reservations are made in order to utilize the cars and carriers to good advantage.

After the train has passed waypoint 4L, each car reserved for transfer signals loading requirements from waypoint 5L to the carrier to make the transfer. The carriers are waiting on call stops with shoes 295 on odd numbered contact rail segment or sections C1, C3, C5, and C7 and shoes 297 on even numbered segments C2, C4, C6, C8 etc. along back run of track ST in sequence for train from left or in reverse sequence for train from right, so carriers can be ready for train from either direction by shifting to beginning of the segments according to train direction or without shifting if the number of carriers just fill the call sections to per carrier (one for each berth) eight call sections being shown for four carriers 28F at this station. Waypoint 5L is the same as shown in FIG. 27 of my U.S. Pat. No. 3,483,829 and as described col. 15, line 65 to col. 16, line 66 therein and as shown herein in part in FIG. 39.

At waypoint 5L shoes 5S1 and 5S2 on cars 18 or 18' engage rails 5Lr1 and 5Lr2 respectively. Cars with berths reserved to load connect from positive of battery 88, line 358, front contacts of relay L1' for first berth to shoe 5S1 engaging rail 5Lr1, and from line 358, front contacts of relay L2' for second berth to shoe 5S2 engaging rail 5Sr2. Cars with berths reserved to unload connect shoe 5S1 or 5S2 for that berth to negative of battery 88 through front contacts of respectively relay U1' or U2' that holds the reservation. A ratchet stepper 378L has a coil connected between rail 5Lr1 and ground and another coil between rail 5Lr2 and ground to extend its pawl as each reserved car passes waypoint 5L. To rails 5Lr1 and 5Lr2 are separately connected a rectifier 380 to pass loading signal only (current from positive of battery 88) each through an arc, brush on wiper of stepper 378L to contacts to call lines C1 and C2 respectively for first car reserved and to C3 and C4 for second car reserved etc. on successive steps of the ratchet. Only these positive loading signals are received by the carrier's memory relays L1 and L2, whose coils are each connected in series with a rectifier 382 from shoes 295 and 297 to ground on each carrier. Relays L1 and L2 each close a holding circuit from the positive of battery 92, normally closed contacts of limit switch LS1 or LS2 and front contacts and coil of relay L1 or L2 for that berth to ground, to provide a loading signal for the gantry. A similar stepper connects rails of waypoint 5R to the call lines in reverse order for signals from train from the opposite direction.

After the train passes waypoint 5L shoe 321 engages rail 6Lr at waypoint 6L to shift relay TLR to left and lift relay SLL to start loading. A train from right has a shoe 321 on opposite side of train for engaging the rail of waypoint 6R to shift relay TLR to right. Relay TLR is polorized with opposing coils connected from the rail of waypoints 6L and 6R. The coils or relays SLL and SRR are connected across the corresponding coil of relay TLR.

CARRIER LOADING-UNLOADING SIGNALING TO GANTRY

The carriers with loading instructions received at the call sections are ready for positioning one at a time over the gantry for loading with containers or trailers in storage that make contact through the routing card. The lifting of relay SLL or SLR starts the carriers to move toward loading position as will be explained with reference to FIGS. 40 and 41 and connects the carrier moving into loading position to signal loading requirements along the tiers to the stop for the gantry at the nearest storage row having a container for the train in that tier. The carrier moving into loading-unloading position over the gantry engages shoes 295 and 297 on respectively rails 296 and 298 at the gantry-carrier load-unload stop at left or right according to the train direction. A carrier is shown at each of these stops though only the one at entrance end according to train direction would be used. Each carrier when stopped for transfer above the gantry aligns its berths B1 and B2 with tiers T1 and T2 on the left or berth B1 and B2 with tiers T2 and T1 respectively at the right in which case berth B2 would be first. Each carrier berth with relay L1 or L2 lifted sends loading signals along the tier of storage spots that will align with that berth to set stops for the gantry at rows having one or more containers for the carrier berth or berths to be loaded. A relay GSR for each stop lifts where conditions are for loading and nearest one disconnects power to those beyond from either end according to train direction. The gantry on left, FIG. 1, is used to load and after transfer to unload for train from the left, and the gantry on right or moved to the right is for train from the right.

GANTRY TRACTION MOTOR CONTROLS

Gantry 24 has its DC traction motor GM connected by relay 386 or 388 for reverse directions in typical circuiting from shoe 389 on DC power line 390. Coils of relays 386 and 388 are connected across shoe 392 on control line GCL and ground each in series with a rectifier 394 connected to pass current when control line is respectively positive or negative to drive the gantry to right or left respectively. The traction motor is braked to stop when the control line is grounded, ie when both relays 386 and 388 are deenergized. Limit switch 396 opens the motor's circuit whenever the elevator sections are not all in gantry run position.

GANTRY POSITIONING CIRCUITS FOR LOADING AND UNLOADING CARRIERS OVER STORAGE AREA

Contact rails or lines 390 and GCL are run overhead along the side or along the ground on insulators to respectively power and control the gantry along the storage run on track GT. The control line GCL is segmented into a stop segment 400 at each storage row and 401 at each loading-unloading stop and a positioning segment 402 on each side of each stop segment 400 and 401, one between adjacent storage steps 400 and two between stops 400 and 401 where these segments 402 are overlapped at 405, insulated apart and bridged by contacts of relay TLR at left or right end of gantry run for train from left or right respectively. The stops are short enough to locate the gantry accurately for transfer of containers. Each stop at each storage row is controlled by a stop relay GSR which sets the stop when energized and disconnects control current beyond the stop relative to the carrier being served.

Segments 402 on each side of each stop are connected through back contacts of the stop relay to segment 401 of the stop to bridge the segments together. Relay TLR connects left ends of lines 406 and 407 to respectively the positive and negative of battery 272 for train from left and the right end of the same lines for train from right. Positive and negative control current is fed along lines 406 and 407 respectively through back contacts of each stop relay GSR in sequence from left for train from the left or from right for train from the right. Line 406 runs through top back contacts of relays GSR, and line 407 runs through next lower back contacts of relays GSR to interrupt power beyond a set stop. Each stop relay GSR connects its stop segment 400 to ground through bottom front contacts, its segment 402 on the left through resistance 408 and its next higher front contacts in series with contacts 409 of relay TLR to positive line 406 and its segment to the right through resistance 410, front contacts of the relay GSR in series with contacts 411 of relay TLR to negative line 407 and makes these connections respectively through contacts 409 and 411 to the line (live) side of its back contacts in lines 406 and 407, ie. the left of these contacts for train from the left or right therof for train from the right. For train from the left, center grounded battery 272 is connected by relay TLR across lines 406' and 407' run to left end of lines of 406 and 407 respectively which are now said to run to the right through top back contacts of the stop relays GSR for storage rows in sequence, so that the first stop relay set interrupts control power to the following control line segments beyond the segments for that stop.

Segments 402-4o1-402 of each carrier loading stop for the gantry are connected together through back contacts of the stop relay GSRT therefore and connected in series with resistance from left to right through front contacts to positive line 406, ground and negative line 407 respectively. The coils of these stop relays GSRT are connected across far end of line 406 or 407 and ground to drop whenever a storage stop is set so gantry at the carrier can start for the storage stop set which is the nearest one qualifying for loading. The gantry stop relay at opposite crossing of track ST is lifted to locate and stop any gantry at that end so carriers can run across the gantry run without interference from a gantry.

Each storage row, which takes two 20' or one 40' container on pedestals 36, has an electrical receptical plug 38 for each container tier connected only to a container when set in that row and tier, ie. a 40' container only connects to plug on tier T1-2 and not to plugs for tiers T1 or T2. Containers on these pedestals completing connection through the routing card set the stop relay GSR for that row when a carrier in transfer position above the gantry track calls for a container in that tier of containers. Only two storage rows SR1 and SR2 are shown in FIG. 39; others would be similar.

For loading berth B1 on carrier at left, connection is from positive of battery 92 on the carrier, normally closed contacts of limit switch LS1 closed while the berth is empty, front contacts of relay L1, shoe 295, rail 296, rectifier 414, front contacts of stick relay SLL, line 416, back contacts of relay 418, top coil of relay LU1 to ground. For unloading, the circuit is from negative of battery 92, contacts of limit switch LS1 closed by container in the berth, shoe 295, rail 296, rectifier 419, back contacts of relay SLL front contacts of stick relay SUL in series to line 416, back contacts of relay 418, coil of relay LU1 to ground, likewise lifting relay LU1. Similarly for loading or unloading berth B2, relay LU2 is lifted by circuit from positive of battery 92 through normally closed contacts of liimit switch LS2 in series with front contacts of relay L1 to shoe 297, for loading, or from negative of battery 92 through normally open contacts of limit switcy LS2 to shoe 297, for unloading; shoe 297 engaging rail 298 in transfer position, a rectifier 414 and top front contacts of relay SLL for loading, paralleled by a rectifier 419 and top front contacts of relay SUL for unloading, to line 420, back contacts of relay 422, top coil of relay LU2 to ground.

Relay SLL is energized by circuit from positive of battery 320 on train, shoe 321 engaging rail 6Lr at waypoint 6L, coil of relay SLL to ground. Relay SUL is energized by shoe 321 engaging rail 8Lr at waypoint 8L after the train has passed the station, coil of relay SUL, to ground in parallel with release coil of stick relay SLL. Stick relay SUL is released by the reset circuits energized at waypoints 1L and 1R. Relay LU1 is held by circuit from positive or negative of battery 272 through contacts of relay TRL in left position respectively to lines 406' and 407' each through normally closed contacts of limit switch 423 opened by each carrier moving out to transfer run, lines 406'' and 407'' respectively, from line 406'' front contacts of relay SLL in series with back contacts of relay SUL to line 424, and from line 407'' through back and front contacts of relays SLL and SUL in series to line 424, front contacts of relay LU1, back contacts of relay 418, lower coil of relay LU1 to ground. Likewise relay LU2 is held by circuit from line 424, front contacts of relay 422 and relay LU2, back contacts of holding coil of relay LU2 to ground. Thus the lifting of relay SLL connects positive of battery 272 to line 424, or the lifting of relay SUL connects negative of battery 272 to line 424 when relay SLL drops.

The lifting of relay LU1 connects line 424 through back contacts of relay 426 to line 428 branching to each contact C of plug 38 in tier T1, rectifier 429 on container, brush engaging plate through hole in routing card in reader 40, contact d on the plug 38, rectifier 430 to line 431 from each tier in the row, coil of stop relay GSR for the row to ground, lifting the stop relay at each row having a container in tier T1 for the train. Likewise the circuits for setting the stops when a container in tier T2 is called for is similar, being from line 424 positive for loading or negative for unloading, middle front contacts of relay LU2, back contacts of relay 426, line 428' branching to each contact c of plug 38 in tier T2, through a rectifier 429 and routing reader 40 of any container in tier T2 for the train, contact d of the plug, a rectifier 430 to line 431, coil of stop relay GSR for that row, to ground.

For locating empty storage spot in tier T1 to set a container, line 424 will be negative (relay SU: lifted) connecting circuit to line 428 to each spot in tier T1 branching to normally closed contacts of limit switch LS1″ opened by any container in that spot, rectifier 433 to line 431, coil of relay GSR for that row to ground. For location of empty spots in tier T2 the circuit from line 428′ to each spot in tier T2 is connected through normally closed contacts of limit switch LS2 for that spot, a rectifier 433 to line 431 to lift relay GSR for that row.

If the carrier calls for loading both berths (relays L1 and L2 lifted) first priority is to load a 40 foot container until all 40 foot container for the train are loaded. Accordingly from line 424 connection is made through bottom front contacts of relay LU1 and LU2 in series to line 436 branched to each plug 38 of tier T1-2 to find 40 foot container for train or through normally closed contacts of both limit switches LS1″ and LS2″ in series to find empty row for placing a 40 foot container and connected respectively through a rectifier 430 or 433 to pass current of positive or negative polarity to line 431 to coil of relay GSR for that row for respectively removal or placement of a 40 foot container therein.

If the carrier has a 40 foot container to be unloaded by the gantry, limit switch SL1-2 is closed only by this long container connecting negative of battery 92 to shoe 438 engaging rail 439 in position for transfer, top coil of relay 426, to ground, lifting relay 426 disconnecting lines 428 and 428′ from battery 272. Then, since relays LU1 and LU2 are also lifted as when both berths on the carrier have a container to unload, only line 436 to each berth in tier T1-2 is connected to find empty row for the 40 foot container, setting stop GSR at each empty row.

If no 40 foot containers are to be loaded, relay 426 drops, since no circuits are completed through routing cards in tier T1-2. Then lines 428 and 428′ which run to each plug 38 to find 20 foot containers in respectively tiers T1 and T2 are connected through back contacts of relay 426.

The gantry will then run to the nearest stop set, since the stop relay opens top front contacts in lines 406 and 407 to cut off power to the control line at stops further from the gantry to prevent shorting the control line and to drop stop relays GSRT at left or right station track positions for the gantry to start for the nearest storage stop set according to train direction. The stop relay GSRT at the carrier stop for loading (or unloading) and those at stops to be passed being dropped to connect sections of control line to positive of battery 272 for the gantry to move to the right to nearest stop set, or to negative to move to the left. Gantry at opposite end of station from train is held at carrier stop set by relay TLR.

Relays 418 and 422 are lifted when the gantry elevator engages a limit switch 442 adjacent each storage spot at bottom of travel in respectively tier T1 and T2. Connection at each end of station is from line 424 through each limit switch 442 in tier T1 to top coil of relay 418 and from line 424 through each limit switch 442 in tier T2 to top coil of relay 422. The lifting of relay 418 drops relay LU1 disconnecting power to storage spots in tier T1. Likewise relay 424 drops relay LU2 to disconnect tier T2 when the gentry has fetched or set a container on a storage spot in that tier.

Circuits for loading or unloading carrier at right are the mirror immage of those at left with the corresponding parts given the same symbols. These circuits are connected when relay TLR is thrown to right by train from right. The waypoints for the right are designated with R in place of L.

The carrier remains in fixed position for loading and unloading over the gantry. Each berth on carrier can only call for a container or empty spot in the tier aligned with that berth when the carrier is centered over the gantry track. If only one berth on the carrier is to be loaded only 20 foot containers in that tier will be called for train and set their row stops for the gantry to load at the nearest stop from the carrier. If both berths on the carrier call for loading, 40 foot containers for the train will be called to set stops and run gantry to nearest 40 foot container for the train. If no 40 foot containers are to be loaded on the empty carriers calling for loading both berths 20 foot containers for train will be called for in each tier for gantry to stop to load nearest from carrier first and move on to nearest called in remaining tier. With this preferred system for making reservations with containers in particular tiers a carrier will never set a stop for a container which is not in the tier aligned. Therefore the carrier will not need to be shifted to align for loading a container from an adjacent tier. The carrier could be shifted on track ST by manual control to align an empty storage spot if the other tier is full, but by providing enough storage spots and cars in the train there can be room for unloading and loading all containers without shifting the carriers.

CARRIER POSITIONING CONTROL

Automatic control of the carriers for positioning and runs around the station loop is provided by control line CL, FIG. 40, engaged by shoe 448 on each carrier to control carrier's movements with circuits as in FIG. 38 of my U.S. Pat. No. 3,483,829. Control line CL is segmented into stops and runs. The control line has a call stop for each carrier 28F at station. These call stops CS1, CS2, CS3 and CS4 each have a carrier thereon aligning shoes 295 and 297 on successive call sections to receive loading signals from train from either direction. The control line also has stops LSL and LSR at respectively left and right end of station track for positioning the carriers one at a time over the gantry track for loading and unloading and stops WL and WR for positioning the carriers for transfer run for train from left and right respectively.

Two drum controllers 450L and 450R are provided, one for each direction of train to set stops and throw switches etc. as required. The drum controllers can be hand operated but are preferably driven by solenoid ratchet 452 for automatic operation. These drums have a rap-out, FIG. 41, engaged by brushes labled from top to bottom at left and right for drums at left and right of FIG. 40 for train from left and right respectively. The brushes are shown in starting position where carriers are on the call stops. The drums are ratcheted clockwise only or to left, FIG. 40, by various circuits labled in FIG. 41 across top for drum at left and across bottom for drum at right of FIG. 40. The first six brushes from top step the drum and the lower four control the carrier stops. The drum face is conductive at 454 and insulating at 456 in the configuration shown. The dashed lines are electrical connections on the inside of the drum between conductive faces.

Control line CL at each call stop has a stop segment 458 and a run segment 460 and 462 on respectively the left and right to direct a carrier to the stop. Call stops CS1, CS2, CS3 and CS4 have respectively limit switches SL1, SL2, SL3 and SL4 closed by a carrier within the control of that stop. Each call stop has a two coil relay CSR to set the stop when energized. Segments 460, 458 and 462 of each stop are connected by tie through back contacts of the stop relay for that stop and all but this first tie connected to the next segment 462 to the left to bridge the segments together when the carriers are to operate. Line 470 is connected to positive or negative of battery 272 through relay TLR in left and right hand positions respectively and connected to the connecting tie at the first stop at the left and through lower front contacts on the stop relay for the last call stop on the right to segment 460 of that stop. The call stop segments 460, 458 and 462 for each stop are connected respectively to the positive, ground and negative of battery 272 through front contacts of its stop relay CSR. The bottom coil of the first stop relay CSR1 is connected by line 474 to brush B-1 on drum 450L and through its front contacts to line 476 to its top holding coil. Line 476 is connected through limit switch SL1 to bottom coil of the next stop relay CSR2 etc. to operate the stops in sequence from left to right. The top coil of the highest stop relay CSR4 is connected to brush B-4 on drum 450R for operating the chain of call stops from right to left.

The control line Cl has loading-unloading stop segment 478 at LUL and at LUR. Each segment 478 is flanked by an approach segment 479 at back and an overrun segment 480 at front. Segment 479 overlaps the adjacent segment 460 or 462. Each loading-unloading stop has a load-unload signal relay LU, a gantry clearance relay 484 and a stop relay CSLU. The signal relays LU have two coils one connected from contact conductor 486 to ground, the other from contact conductor 487 to ground. Conductors 486 and 487 extend around backcurves and along load-unload sections of track ST across gantry run to be engaged by shoes 295 and 296 (FIG. 39) respectively to lift relay LU whenever a carrier to be loaded or unloaded approaches that load-unload stop. Gantry clearance relay 484 is controlled by circuit from positive of battery 262, limit switch 396 closed by elevator in run position for the gantry, shoe 490 on the gantry engaging rail 491 at the stop, coil of relay 484 to ground of battery 262. Stop relay CSLU is lifted to set stop by circuit from brush LULB on drum 450L, front contacts of relay LU, coil of the stop relay to ground.

Segments 479, 478 and 480 of each load-unload stop are connected by tie through back contacts of the stop relay CSLU. This tie is connected through bottom back contacts of relay 484 to ground and through bottom front contacts of relay 484 to line 470 to positive or negative of battery 272 according to direction of carrier movements according to direction of train. These segments are connected through front contacts of relay CSLU respectively through top front or back contacts of relay 484 respectively to line 493 or ground, to ground, and through middle front or back contacts of relay 484 respectively to line 492 or ground. If relay 484 is dropped, indicating gantry or elevator is not in position to receive carrier thereabove, the stop is broadly set to stop the carrier when shoe 448 engages segment 479 before the carrier moves over the gantry run. When relay 484 is lifted, the gantry and its elevator are positioned for carriers to run thereabove.

A load-unload stop is set narrow when relays 484 and LU are lifted and the drum for that stop is in a load or unload position. Then, for stop at left, section 479 is connected through front contacts of relays CSLU and 484 to line 493 to negative of battery 272; section 478 is grounded; section 480 is connected through front contacts of relays CSLU and 484 to line 492 to positive of battery 272; and the next section 498 is a waiting section connected through resistor 499, back contacts or relays CSLU and front contacts of relay 484 to line 470 connected through relay TLR to negative of battery 272 for train from the left. Circuits are the same for stop on the right except connections to lines 492 and 493 are reversed to move the carrier in opposite direction around loop ST.

The control line waiting sections 498 extend around to stops WL and WR at respectively left and right ends of the transfer run. Stops WL and WR are each less than a carrier length and adjacent and parallel line CL whereon shoe 448 of each carrier first in line for the train engages the stop to stop and control the carriers on section 498 to slow to a stop thereat. Stops WL and WR each have a stop relay CSW whose coil is connected between the corresponding brush WLB or WRB on drum 450L or 450R and ground. Each stop relay CSW when deenergized connects its waiting section 498 through resistor 500 and its upper back contacts to line 470 and connects the transfer run section 502 of line CL through its lower back contacts in series with those of relay CSW for the waiting stop at opposite end of the transfer run to line 470 connected by relay TLR to positive or negative of battery 272. Section 502 is thus connected to polarity for carriers to pass transfer run when neither waiting stop WL or WR is set and is otherwise disconnected. When a stop WL or WR is set the waiting section 498 for that stop is connected through resistor 500, front contacts of the stop's relay to negative line 493 for stop WL but to positive line 492 for stop WR; the stop section is grounded through front contacts of the stop relay; and the transfer run section of line CL is open circuit to run carriers around corner of the loop to the near stop to wait for the train. Control line CLT extends along the transfer run and beyond each end of section 502 to connect the speed controls between train and carrier as in my U.S. Pat. No. 3,483,829, FIG. 38.

From starting position the drum at left is ratcheted by a signal from the train, from positive of battery 320, shoe 321, rail 6Lr, line to brush W6LB on drum 450L connected by conductive face to brush W6RB and brush RATCHET to solenoid of the ratchet to ground, to step the drum one position to left, FIG. 41. This connects brushes LS5B, LS6B to RATCHET and disconnects brushes W6LB and W6RB. For carrier control this connects brush LULB to POWER and disconnects brush B-1 dropping all call stop relays, starting all the carriers to move to the left. The first carrier out closes limit switch LS5 connecting power from negative of battery 272, contacts of relay TLR closed by train from left, line 506, rectifier 508, limit switch LS5, brush LS5B on drum to RATCHET to the next position whereat brush B-1 engages POWER, lifting stop relay CSR1, connecting POWER through its top front contacts in series with limit switch SL1 closed by a carrier on that stop, bottom coil of the next stop relay CSR2 which closes its top front contacts to extend this circuit to the next stop relay, etc., stopping the remaining three carriers on the first three stops.

The first carrier out engages shoes 295 and 297 with rails 296 and 298 respectively connected to top and bottom coils of relay LU to ground, to lift relay LU if either or both berths on the carrier have load (or unload) signal. Relay LU closes circuit from negative of battery 272, single throw contacts closed to left on relay TLR, line 506, rectifier 508, line 510, brush POWER, drum face to brush LULB, front contacts of relay LU, coil of load-unload stop relay CSLU to ground of battery 272, to set the stop relay if the carrier is to be loaded (or unloaded).

The position of the gantry and its elevator are checked by circuit from battery 262, limit switch 396 closed when elevator is in clearance position, shoe 490 engaging rail 491 when gantry is laigned for transfer under the station track, coil of relay 484 to ground. Relays LU, CSLU and 484 when lifted set the stop by connecting line 493 from negative of battery 272 through front contacts of relays 484 and CSLU in series to segment 479, grounding segment 478, connecting line 492 from positive of battery 272 through front contacts of relays 484 and CSLU to segment 480. When the gantry moves out for loading, relay 484 drops, grounding sections 479, 478 and 480 through its back contacts, holding the carrier still. After the carrier returns and loads the carrier, limit switchs LS1 and LS2 on the carrier are open, dropping relays Li and/or L2, dropping relay LU, dropping relay CSLU. When the gantry elevator lowers to clearance position after loading, relay 484 lifts, connecting line 470 from negative or positive of battery 272 according to position of relay TLR, through lower front contacts of relay 484 to separate back contacts of stop relay SCLU to segments 479, 478, 480 and 498, the last being connected through current limiting resistor 499.

The carrier proceeds counter-clockwise on loop ST closing limit switch LS6 at exit from the load-unload area. Limit switch LS6 then connects power from line 510 to brush LS6B on drum to ratchet the drum another notch whereat brush B-1 is disengaged from POWER dropping the call stops until the next carrier out engages limit switch LS5, stepping the drum another step, engaging brush B-1 to POWER, lifting stops SL1, SL2, and SL3, stopping the following two carriers on the first two call stops and setting the next for the first carrier around the loop. Thus each carrier moves past the loading section, loading if required, and around over the transfer run above the dip. The carriers running counter-clockwise around loop ST close limit switches LS8 and LS7 but no circuit is closed since contacts of relay TLR has disconnected drum 450R on right. Each carrier after passing around the loop for loading, stops on the last call stop cleared and advances until all the carriers are back on the call stops ready for transfer.

When the train reaches waypoint 7L a maximum train length or more ahead of the station it engages shoe 321 on rail 7Lr connected to brush B7L-R-8 connecting by drum 450L in its then position to brush RATCHET, turning the drum another step where POWER is disconnected from brush B-1, dropping stops SL1, SL2, etc. to start the carriers, and where POWER is connected to brush WLB to lift relay WL, setting the stop at which the line of carriers are to wait for the train, brushes LS5-6-7 and 8 being disconnected by drums 450L and 450R in their then position.

VERTICAL COUPLING AND TRANSFER

The cars reserved for transfer extend vertical couplings nearly up to a carrier length ahead of alignment at WL or WR to each engage the next carrier which is to transfer therewith. The carriers are coupled at WL and uncoupled at WR after the transfer run and vice versa for train frim the right. The vertical coupling is extended only on cars reserved for transfer by circuit from positive of battery 88, FIG. 10, front contacts of relays U1, U2, L1 and L2 in parallel, cam switch 114L closed by rail 115, solenoid of air valve 116 to ground to connect AIR to cylinders 104 to extend couplings 66 for engaging carrier over those berths. Cam rail 115 extends along track T between WL and WR and nearly a carrier length thereunder each to hold valve 116 open to pressure cylinders 104. Valve 116 is spring returned to exhaust cylinders 104 to lower couplings 66 at end of transfer run.

The line of carriers moves along to fill the space at WL left by carriers as they move out for transfer. Each carrier engages shoe 128 on rail 129 when its first truck clears past the first switch 60L to complete circuit to open the switches to the dip if the carrier load checks to align empty berths on the car coupled as explained with FIG. 17. (Preferably all shoes on the carriers and cars are mounted on the trucks thereof.) Thus only carriers which will mesh with the car that couples then will open the dip for transfer; any that do not register for transfer will pass over the dip safely and not block following carriers from making their transfer run.

When the train reaches the station it connects circuit from positive of battery 320, shoe 321, rail 8r, line 516, brush 7L-R-8, drum 450L to brush RATCHET, to step the drum another step whereat brush B-1 is connected to POWER to set stops SL1 etc. in succession as carriers return to their stop. The call stop SL1 is set during the transfer runs so that after transfer the carriers each run around and stop on the forward most empty call stop.

When the train reaches waypoint 7R maximum train length beyond the station a circuit is completed from positive of battery 320, shoe 321, rail 7Rr, line to brush 7L-R-8 on drum 450L to brush RATCHET, to ratchet, to ground, to step drum 450L to the next position where brush B-1 is disconnected by the drum from POWER, dropping the call stop relays, starting the carriers around to unload at LUL. Rail 9Rr is also connected by line to coil of stick relay SUL to ground, to lift relay LUL to receive unloading signals on carriers having limit switches L1, L2 or both and L1-2 connecting negative of battery 92 to shoe 295, 297 or both and respectively to unload berth B1, B2 or a 40 foot container. After each carrier is unloaded or passed by the gantry it moves around loop ST and lines up on empty call spots the same way as after loading. When all the carriers are empty and back on the call stops drum 450L will have been stepped around one revolution. Stick relays SUL and SUR are released with the general reset circuit from waypoint 1L or 1R. Shoe 321 is on or connected on opposite side of locomotive or first car on train from right to engage only waypoints 1R-9R on opposite side of track T from waypoints 1L-9L.

PASSENGER CARRIERS ON AUTOMATIC LOOP

Referring to FIGS. 1-3 and 43-44, the passenger carrier 28P is the same as for freight except it has a narrower frame 42P, omits the loading-unloading control; and has modified coupling channels 62', container hooks 70P and hook control. The carrier's narrow frame is suspended from wide gage trucks 34 spaced the same as on carrier 28F to run level through the double dip. This spacing can be shorter than the truck spacing on car 14 if used only on substantially horizontally straight transfer runs. A coupling channel 62' without rollers is secured legs endward depending from frame 42P offset to right of center on each end.

The passenger carrier with a container 16 in position for transfer is run from its siding STS onto the main loop ST ahead of the freight carriers 28F after they come back on the call sections from loading. The monorail switches 518 to the siding STS are remotely controlled by available means and the carrier moved by control line from siding STS to waiting stop WL or WR when set ahead of carriers 28F loaded for the train. Siding switch 518 is opened for carrier 28P to move out ahead of the freight carriers which are held by interlocking until the switch is closed. After transfer carrier 28P is shunted back into the opposite end of siding STS and the switch closed before the freight carriers return. With their narrow frames carriers 28P do not operate limit switches SL1-4 and LS5-8 or step drum 450L or 450R and require no call stop, thus keeping control simple. They stop on stops WL or WR when set and stop following carriers with their shoe 448. Passenger platform PA is along side siding STS near ground or adjacent a floor under track STS below the containers, so a partition is not needed between the platform and containers.

PASSENGER CONTAINER TRANSFER CAR

Referring to FIGS. 42–49, the preferred passenger transfer car in train 12 has a central container area 520 open at top for two containers 16 to be inserted. A partition 522 separates the container area from an aisle 524 along each side. The partition extends across ends extended to include coupling channels 62' which move down at ends of the container area and into holes 526 in the floor 528 and frame 530 of car 14. The container area is preferably in center of the car instead of along the side, so that an offset passenger track or off-center-loading carrier is not required and so that the cars can run the transfer either end first.

A belt-over-roller conveyor 532 moves the container forward in area 520 so container to be removed is at front leaving space to put container ar rear to eliminate need to signal where to load the container on the carriers. The conveyor has belt 533 extending around drive drum 534 and takeup pulley 535 at opposite ends of area 520 and supported on rollers 536 all secured between channels 537 as in conveyor practice. Channels 537 can be part of frame 530. The conveyor is driven at low speed by a reversible gearmotor 540 controlled to shift the newly inserted container forward after each transfer as will be explained with FIG. 54.

A retractable coupling latch 66' at each end of the opening for containers is secured to frame of car 14 at roof and off center equally and oppositely to engage coupling channels 62' on the carrier therebetween. Each latch 66' has a roller 63' pinned between sides of outer end of latch lever 544. An L-bracket 546 is mounted on pin 547 between sides of lever 544 as fulcrum intermediate the ends of lever. An air cylinder 104' is pivotally connected at head end by pin 548 through bottom of bracket 546, and its rod slip mounted through trunnion eye 549 between sides of lever 544 below the fulcrum. A spring 550 secured on rod of cylinder 104' between end cap and eye 549 lets lever recess down to latch channel at front of car when the coupling is extended by cylinder 104'. The latch has a frame of four channels 550, two on each side, legs in, one on top the other, between end plates 552 and 553, to form tracks for flanged wheels 554 secured on ends of pins 547 and 548 to roll in respectively top and bottom channels 550. A spring 113' is pocketed between plate 552 and bracket 546 at pivot 547 to cushion coupling. Opposite facing pairs of latches direct wheels 63' inward the car to latch, engage in and guide channels 62' therebetween to roll down and up aligned for transfer. Wheel 63' has depressed center into which sides of lever 544 are recessed to clear outward flaired legs of channels 62'. The latch levers recess by gravity into the housing when cylinders 104' exhaust and are extended for coupling when rod end is pressured by air through coiled hose 555 at pressure which lets them recess to latch. Cylinders 104' are controlled similar as 104, FIG. 10.

The passenger containers 16 are cages with doors 558 similar as for elevators and have four lifting loops or bails 560 on the roof. Each bail has two side pins 562 to guide hooks 70P on the carrier to latch under the bail to support the container. Hooks 70P are pivotally mounted on pins 564, FIG. 48, between plates 566 extending from side of frame of carrier to swing in transverse planes to each engage under a bail 560. There are two hooks 70P for each side of each container 16, each hook having a lever arm 568 extending out from the pivot of the hook connected by an opening rod 569. Hook opening pins 570 mounted on ends of two parallel teeter toter bars 572 one along each side of the container area and secured on shaft 574 between partitions engage under bars 569 to lift them and open hooks 70P at either container spot according to which way bars 572 tilt. Cylinder 576 is pivotally connected between an end of bar 572 and the body of car 14. Opposite ends of cylinder 576 are connected through two-position double-solenoid valve 578 to AIR or exhaust.

Doors 580 in partition 522 to each container berth are latched closed by solenoid release latches 582 lifted to unlock doors 580 when safe for passage by circuit from positive of battery 88P, normally closed contacts of cam switch 584 opened by cam rail 586 along the portion of each transfer run where containers are removed, normally open contacts of limit switch LS1' or LS2' closed by container in first or second berth, solenoids 582 for each door to that berth to ground. A wheel on bottom of plunger of each solenoid 582 rides on top of door and drops down only at end of closed door to hold the door closed and completes a circuit from positive of battery 88P, normally open contacts on cam switch 584 closed when tilted back by rail 586, line 587, normally open contacts of limit switch LS1' or LS2' closed by container in that berth, back contacts of all solenoids 582 for that berth in series all closed when the doors are all latched closed to that berth, coil of relay 588 for that berth to ground. Relays 588 each close a circuit from positive of battery 88P, front contacts of limit switch 584 closed when switch is tilted back, front contacts of relay 588 for that forward berth, solenoid of valve 582 to tilt bars 572 down over that berth, to ground, and to lift pins 570 over rear berth to open hooks to release a container put into the car when safe for removing forward container (all doors 580 closed). If the doors are not closed to forward berth (rear doors cannot be opened) relay 588 will be dropped and complete circuit from line 587, back contacts of the relay 588 to opposite solenoid of valve 582 to ground, to reverse valve 582, reverse tilt of bars 572 to prevent container set in from being left on the car and to prevent the forward container from being removed when the carrier in withdrawn.

Hooks 70P cannot release a container until it is set down and hooks lowered further, since the hooks each have a tooth 590 extending up to craddle bail 560. Therefore a carrier setting a container down into a berth will force pins 570 down to where arms are about horizontal against air pressure in cylinder 576 until hooks 70P are lowered below hooking position where pins 570 can pop rods 569 up opening the hooks to release the container to the car. If the container in the other berth does not have its doors closed and locked for transfer, arms 572 will be tilted opposite to when safe for transfer ie. lifting pins 570 to prevent the hooks from engaging bails of the forward container in the car and lowering pins 570 where the container is inserted so as not to open these hooks so the carrier will pull its container back out without any transfer, leaving a container with open door on the car. Arms 572 do not open any hooks when in horizontal position.

Referring to FIGS. 50–53 the container doors 558 and partition doors 580 are of sheet metal or plastic with side edges turned out ie. toward each other. A center flanged wheel 592 is secured to each bottom corner on outside of each door 558 and 580 to support the door on the floor or platform with the flange in a slot. A rack 594 is suspended on tabs 595 pinned to each door and extending down through the slot to the rack 594 parallel the bottom of the door in area below the floor. A pinion 596 on end of shaft 597 is engaged with each rack on a door 580 and is shifted out by solenoid 598 to engage rack of adjacent door on a container. The pinion is retracted by spring 600 and driven by permanent-magnet gearmotor 601 through reduction gearing and spline drive unit 602 to open and close the partition door and container door in register together. A gear rack block 604 is secured on end of shaft 605 which shifts in sleave 606 horizontally mounted under floor of container and is extended by spring 608 to engage rack 594 on each container door to lock closed. The pinion 596 has a slightly conical face which pushes block 604 out of engagement of rack 594 as the pinion is extended before turning to open the door.

Motor 601 for each pair of doors operate in reverse directions and are connected in circuit, FIG. 53, from positive of battery 88P to open and from negative to close doors. The opening circuit is from positive of battery 88P, normal position contacts of switch 584 closed except along where containers are transferred out, top normally open contacts of limit switches LS1' and LS'1 or LS2' and LS'2 in series closed by container in that berth, motors 601 for that berth in parallel each in series with a limit switch 610 opened when the door is open full, to ground of battery 88P. The closing circuit is from negative of battery 88P, contacts of cam switch 584 closed by rail 586 along where containers are transferred out of the car, bottom normally open contacts of limit switches LS1' and LS'1 closed by container in the forward berth, motors 601 for that berth in parallel each in series with a limit switch 612 opened when the door operated thereby is fully closed.

Referring to FIG. 54, conveyor 532 is controlled to move containers to en end of the car, preferably to forward end where they cannot slide forward and become out of place for transfer if brakes are applied quickly. Its motor 540 is shunt wound with field connected in parallel through front contacts of relays 618 annd 619 across battery 88P and armature reversably connected in series through front and back contacts of relays 618 and 619 across battery 88P or reversely through back and front contacts of the relays respectively. A circuit is closed from positive of battery 88P, reverse switch 620 (as in my U.S. Pat. No. 3,038,066, FIGS. 8–9) shifted by reverse of train movement to forward contacts, normally closed contacts of cam switch 622 at front end of front berth opened by container in position for transfer, coil of relay 618 in series to ground of battery 88P to drive the conveyor forward until the limit switch 622 at front is opened. Cam switches 622 are mounted on partition 522 near top for their wheel to roll on end of container to stop motor 540 to hold the conveyor stationary until the container thereat is removed or the direction of travel reversed so that container inserted at rear is not pushed against container being removed. Lamp 130 at the empty rear berth is lit by circuit from positive of battery 88P, reverse switch 620 closed to forward, normally closed contacts of limit switch LS2' or LS1' at rear berth, lamp 130 at rear, to ground to lift relay 134, FIG. 17, when safe for transfer.

After the transfer on dip 26, passenger containers are returned to platform PA, FIG. 3, with the container 16 removed from car 14 in front berth of carrier 28P. The container is correctly positioned on the carrier for the next train if from the opposite direction with respect to which the container is in the rear berth and need not be shifted. If more than one train passes in one direction before another passes in the opposite direction and number of trains to be serviced with a carrier 28P in opposite directions balance out, a number of carriers 28P in opposite directions balance out, a number of carriers 28P could be provided on siding STS equal to maximum difference in number of trains in sech direction. This would save repositioning containers on carriers and is most practical where the number of trains in one direction does not much exceed number in opposite direction at any time.

OFF-CENTER CONTAINER CARRIER

Referring to FIGS. 55 and 56, carriers 28PS are provided for cars 14S which have their container berths along one side of the car. Cars 14S are the same as cars 14 except the berth area and couplings 66' are shifted to side to eliminate one aisle 524 and partition 522 and enable use of wider containers 16S. Carriers 28PS are the same as carriers 28P except their frames are wider and mounted off center on trucks 34 to align berths along one side of car 14S. Carriers 28PS run of track ST centered over track T along with carriers 28F and 28P to serve any car 14S in train 12.

STATIONS WITH TRACK FOR EACH DIRECTION OF TRAFFIC

Referring to FIG. 57 where two tracks T and T' are provided, one for each direction of traffic, station track ST branches for a double dip transfer run 26 over each track. Two carriers 28P are shown loaded back to back waiting at the station platform PA to transfer a container to car 14 in train 12 from either direction first, and thereafter up to two trains 12 in the opposite direction before the next in the first direction without shifting the containers on the carriers.

Likewise the station plan FIG. 58 requires no repositioning of containers on the carriers 28P and serves two tracks T and T', one for each direction. Ends of a double dip transfer run 26 over each track are connected by switch 624 (as in U.S. Pat. No. 3,483,829, FIG. 2) beyond station platforms PA1 and PA2 so carriers on this switch-back loop of station track 30, wide gage, can serve a train 12 on either track in direction of arrows. The carriers are preloaded wach with container on rear at each platform PA1 and PA2. Carrier at left makes transfer run with train from left, deposits container in rear and lifts out container at front of car 14, switches onto return track beyond station platform PA2, reverses and brings container from train to the platform PA2 behind the other carrier where passengers leave and reload container 16 for train in return direction. If a carrier on this station layout makes its run without transfer it can run back on return track or run backwards to put container at rear ready for its next transfer run.

If a person parks near platform PA1, FIG. 58, and takes train to right and back he would be able to leave train on container transferred out on dip adjacent his out-going dip and arrive at the platform he left from. Thus though there are two platforms separated by possibly a quarter mile or more he can return to the one he leaves from. Several carriers each with a container can serve this twin station.

If the operation at any of these stations described requires shifting the position of the container 16 on the carrier to be on the rear, refer to FIGS. 71–72, 99–103 and 112–113 for preferred mechanisms for this, which will be described with variationss of the system for rapid transit.

TRANSFER RUN CONTROLS

Referring to FIG. 59 for controls to accelerate the carriers 28F, 28P and 28PS to couple for the transfer run for station FIGS. 1–3, 57–58 or 59 where used separately with platforms PA1 and PA2 on ends or PA1-2 at middle of transfer run on single track passenger line, the carriers are controlled along the transfer run as in my U.S. Pat. No. 3,483,829, FIG. 38. Each car 14 in train 12 has a dynamo DYN1 developing a voltage representing train speed. The dynamo is connected across shoe 626 and ground, track T. Shoe 626 engages rail 628 insulated above ground along the transfer run and to a distance beyond in each direction of train approach. Shoe 626 is connected on side of car according to train direction on two directional track. A start timer 630 in U.S. Pat. No. 3,483,829, FIG. 28, has its motor connected across rail 628 and ground for each entrance end of transfer run for the timer drum to be driven at speed representing train speed by DYN1 on cars passing the station. After a shoe 626 engages rail 628 and starts the timer drum shoes LS1-2 engage a short rail 632 ahead of the station to record that car on the time drum only a freight container car reserved for transfer has power on a shoe 5S1 and/or 5S2 and the passenger container cars have a shoe 5S connected to battery 88P, FIG. 54, for this purpose. Shoes 5S1 and 5S2 are mounted from side of truck 96 to lift when engaging rails 5Lr1 and 5Lr2 respectively, but shoe 5S is mounted from side of truck 96P to pass above these rails but to engage rails 632 which also lift shoes 5S1 and 5S2 to record a car with a live shoe 5S1, 5S2 or 5S. After the elapsed time approximately inversly proportional to train speed to replay head in the timer picks up the recorded signal and close contacts connecting rail 628 to rail CLT along track ST along the transfer run. Each carrier has a dynamo DYN2 similar to DYN1 and connected in series with automatic car controls ACC as in U.S. Pat. No. 3,484,022, FIG. 31, or U.S. Pat. No. 3,483,829, FIG. 38, between shoe 634 engaging CLT and ground. Shoe 634 engages rail 632 only when the carrier is in first position to make the transfer run ahead of the dip which should be at or past the station platform PA1 or PA2. Rail 628 is connected to rail CLT through the timer to start the carrier at a precise time to accelerate at constant acceleration independent of load etc. to reach safe coupling speed just ahead of alignment for coupling before the transfer dip. If the carrier is coupled and right for transfer the transfer dip switches are opened as described with FIG. 17 or as will be described hereinafter with FIG. 76.

TRAIN WHICH CAN ALSO HANDLE SEMITRAILERS

Referring to FIGS. 60–64, semitrailers are handled by train 12H which can also handle the freight and passenger containers on cars having a higher loading level. The higher level cars can pass under transfer dip 26 described but not for transfer. A high level dip 26H is provided for these cars. Since the gantry and storage area are designed to handle semitrailers it is preferred that the high level transfer run 26H be a branch run of the station track ST to serve both trains 12 and 12H. Where semitrailers are to be handled on the system, train 12H has freight container cars 18H with pedestals 36 to support two 20 foot or one 40 foot container or trailer secured by latch downs to the pedestals as in my U.S. Pat. No. 3,528,569. The carriers 28FH and 28PH on track STH clear the high type freight and passenger cars with the added height between tracks TH and STH.

High level passenger container transfer car 14H (which can be self propelled) is provided for train 12H to handle containers 16 and shown in FIG. 60 coupled with car 18H to scale to show compatability of both to use same transfer run. This two level car 14H requires the same vertical movement of containers 16 as does a container 20F or semitrailer 20S for car 18H. This is a requirement of the transfer dip to serve both types of cars and is designed to be the same between all carriers and the cars they couple for transfer through a given transfer dip.

Car 14H has an upper-lever central container area 520H for two containers 16, and aisle 524H on each side and partition 522H separating the aisle from the container area, transverse stairs 646 at opposite ends of opposite aisles 524H down to intermediate level car end aisles 648, steps 650 from each end aisle down to room 652 entered from opposite corners. A conveyor having belt 533H over top of rollers 536 runs along bottom of container area 520H to move containers forward as for car 14 and runs around rollers 535 and 536 to return on or below floor of room 652 where it can serve as a moving sidewalk. The car 14H has vertical couplings 66' and coupling wells 654 for receiving channels 62H of the carrier 28PH, a vestabule and restroom at opposite end corners on the intermediate level, and a side door in each vestabule and optionally on each level. The end of each aisle 524H opposite stairs 646 is partitioned off at 658 just beyond doors 580 to berth farthest from stairs 646 to provide headroom for stairs 650 below.

VARIATIONS FOR RAPID TRANSIT OPEN SIDE PASSENGER CONTAINER SYSTEM

Referring to FIGS. 65–81 showing this system applied to mass transit, subway FIG. 65, has the usual two tracks T, one for each direction of traffic connected at ends of the line at terminal stations 670. Trains 12R of one or more coupled units of a container transfer car 14R articulated between two self-propelled MU coach cars 17R run on tracks T from each end to the other nonstop either reversed at the terminals or turned around. Passengers from and to intermediate stations PA board and leave the center car 14R of each train unit in a container 16R. Containers 16R are carried on carriers 28R or 28R' which run on wide gage suspended track 30 parallel to and preferably centered over each track T to align and couple the train for transfer of one container to and one from each transfer car 14R as it passes between stations preferably under a double dip transfer 26. The carrier takes the container removed from the train to the next station for reloading for the next train. Tracks 30 run to second from end stations where they join for the carriers to make a return run in reverse. Track 30 has loops or branches 672 for stations off the main subway.

Cars 14R each have container berth area 520 for three containers 16R end to end plus clearance under opening in roof either along one side or if car width permits along the center. The containers have one or both sides open according if they are used along side or in center of car to speed exit and entrance of people. The berth area 520 shown is on center of car 14R with aisle along each side separated by a partition 522R. Partitions 522R have opening 674 at center berth to expose open side of container in center spot for quick passage of persons from and to a container thereat. The transfer car has a belt-over-roller conveyor 532 as the floor in the container area 520 for moving containers from rear to front of car 14R. The conveyor is driven slowly by motor 540 through the reverse switch 620 reversed by change of direction of train. Switch 620' can be actuated by train line control according to which end of train is front or be reversed with axle rotation as switch 620 in the control diagram therefore, FIG. 54.

Carriers 28R or 28R' each deposit a container in rear of a car 14R and remove a container at front of the car between stations PA. Containers removed are brought on the carrier to a station PA where the container is held stationary for unloading and reloading as the carrier moves forward to position the container at rear spot on the carrier where it is again secured for movement to the next train.

The carrier, 28R or 28R' has a frame 42PR suspended from two powered trucks 34 on same center distance apart as articulated trucks 96R supporting car 14R. The carrier has a hook frame 676 three container berths long and narrower than the containers. The hook frame has hooks 70P for containers in end berths only and does not hold a container in center space. Side shield plates 678 extend down from the hook frame to cover the open sides of containers in end berths but not in center container space. Shields 678 slide into car 14R behind partitions 522 when the hook frame 676 is lowered to roof of car 14R as in FIGS. 66, 67 and 69. This insertion is not seen by persons in container or on car. The opening 674 is always covered by a container or containers with maximum of a few inches clearance gap between containers passing the opening. Shields 678 along the opening can have an edge of looped strip rubber 680. The cars and containers could have doors as in FIGS. 43 and 49–53, but shields and open side containers enable much quicker unloading and reloading of containers on train and at station which enables closer spacing of stations for given train speed and closer spacing of trains.

The carrier track 30 between stations PA can be at height over track T for carriers to clear over the trains 12R and an elevator 682 provided in each carrier 12R', FIG. 67, to transfer to container to rear berth in car 14R and pick out container at front. The elevator 682 is hook frame 676 guided on coupling channels 62 and lifted and lowered by ropes 684 run up and over sheaves 686 and hoist drum 688 thus taking the place of two elevators on carriers in my U.S. Pat. No. 3,483,829, FIGS. 61 and 84–89.

The carrier track 30 is preferably a double dip transfer run 26 between stations PA to eliminate container elevators between cars and carriers and to reduce the subway bore and height of track 30 between stations to little more than that for the train 12R. A safety stop track STS' is provided beyond the entrance switches 60 of each double dip to stop a carrier if not proper for transfer.

Referring to FIGS. 66 and 70–72, the station comprises a platform P along one or both sides of a container bed or pit stop 690 having a row of flanged wheels 692 secured on plate 693 on each side of the pit, which are sides of platform P all supported on concrete floor over beams 694 above the subway track. The carrier brings a container on its forward berth into the station where the rows of flanged wheels 692 engage the bottom side edges on the container to lift it off hooks 70P. Stop arms 696 and 697 at respectively the entrance and exit to bed 690 hold the container secure at the stop for persons leaving and entering the container while the carrier moves forward to position the container at the rear berth. A partition 698 surrounding each platform P and stairs 699 thereto has opening 700 at pit 690 where the open side of the container is exposed when stopped while shields 678 and opening between on sides of carrier move by. A cam wheel 704 secured to partition 698 facing the carrier way on each side central above opening 700 engages under latch cam rods 569R to open hooks 70P while the container rolls onto wheels 692 just before engaging stop 697 which is set by cam wheel 706 engaging cam track 708 on frame 42PR of carrier 28PR when releasing the container. Wheel 706 is mounted on top of rod 710 mounted to slide vertically in sleeve 711 secured to partition 698 and linked to one end of bell crank 714 secured to turn shaft 715 between plates 694 to raise stop arm 696 secured on shaft 715 to swing up behind the container. The opposite end of bell crank 714 is connected by link 716 to crank arm 717 secured on shaft 718 with stop arm 697 between plates 693. When cam 708 lifts wheel 706 bell crank 714 is rotated clockwise swinging stops 696 and 697 up from opposite directions against ends of container 16R securing it steady therebetween. A removeable tread plate 720 along the edge of each platform P gives access to an opening behind plates 693 to service wheels 692 and linkage 716. Rods 569R extend from end berths along sides of carrier nearly to center of center berth to be lifted by wheels 704 to hold hooks 70P open while the carrier is passing container to rear and hooks 70P are passing bails 560 on roof of the container.

The carrier can keep moving slowly as controlled by a low voltage on the control line CL along the station and preferably waits for the train with first container therefor open at the station for reloading until the train reaches a waypoint to connect power to the next section of the control line CL to move the carrier to reposition the container behind shields at rear of carrier hooked thereto to wait for train to set the start timer to start the carrier after the timed delay before connecting the speed control circuit through dynamos DYN1 and DYN2 and automatic carrier controls ACC on line CLT overlapping the waiting stop and preferably run between stations to end of the dip to reduce coupling strain. The control is as described in U.S. Pat. No. 3,483,829, FIG. 38, where the voltage on the control line sets the speed for the carrier.

When the carrier moves forward to where the container is at the rear loading spot, bars 569R have moved along on wheels 704 to where the bars are bent up, dropping the bars and closing hooks 70P on each side, lacthing the container on rear of carrier as cam 708 on the carrier moves out from above wheel 706 to drop to open stop 697 for the container to roll off the end of the roller bed hooked on the carrier and to open stop 696 for entrance of the next container on front berth of next carrer.

If trains 12R of more than one unit are to be run with a carrier 28PR for each car 14R between stations, the preferred station, FIGS. 73–74 has a plurality of retractable container releasing lifts 690' each at an opening 700 in partition 698 extended with platform P the length of number of carriers to have containers simultaneously opened for reloading, thus increasing the capacity of the station and system. Wheels 692 are mounted on frame 726 on rod of lift cylinder 728 guided from turning in pit at each opening 700.

Frame 726 has a U-bracket 730 extending up in tubing 732 on partition 698 at each side and run behind the partition over the opening to support wheel 704 to open hooks 70P as at station FIGS. 70–72 after frame 726 is lifted. Frame 726 also supports stops 696 and 697 and the cam linkage to move up to operating position or down to clear the carriers and containers.

The carriers have buffers 732 on their ends to cushion when they slow to enter station and bunch together. They run by openings 700 slowly until first carriers reaches last opening 700 where its cam track 708 engages cam valve 734 to connect hydraulic pressure from pump 736 in succession through valves 738, 739, and 734 to head of each cylinder 728 to lift all container releasing lifts before container on carrier thereabove is centered thereon. Each container is lifted slightly (about 1–2 in.) by the lift thereunder or as it is moved onto the lifted wheels 692 by movement of the carrier to release from hooks 70P. The carriers then stop and wait for next train to reach waypoint to connect voltage to nest section of control line CL to move slowly, about a carrier length to waiting stop for train, thus reengaging the containers on rear berth behind shields loaded and closed ready for the train. Cam valves 738 and 739 are spaced beyond valve 734 to engage cam rails 708 on the carriers to exhaust cylinders 728 when the first carrier has moved from station to stop and maintains this exhausted condition as the line of carriers moves out of the station, so the containers thereon will clear the releasing lifts. Thus persons do not need to wait for successive containers to unload or in containers successively loaded a considerable time before the train.

Ends of the carriers shown in FIG. 73 have shields 678' tapered at ends to deflect persons too near the carriers passing the platform. The carriers and containers clear about a foot and a half above floor of pit 690 for safety incase someone falls in.

The start timer starts each carrier after a delay from time car for the carrier engages waypoint rails 632, FIG. 59, and connects successive sections of line CLT to start successive carriers to accelerate quickly to safe coupling speed just ahead of alingment with their car. After coupling alignment and loading are checked before opening switches 60 at entrance to the dip.

Car 14R engages the carrier for transfer run as shown in FIGS. 77–78. Vertical coupling latches 66'' on car 14R can be as shown in FIGS. 45–47 or as shown in modified form in FIGS. 77–78 where ram rod 744 compresses spring 113'' in cylinder 110'' to cushion impact when hitting coupling channel 62' on the carrier 28PR. Rod 744 has wheel 63' on its end for rolling in trough of channel 62' on the carrier. Rod 744 is keyed to prevent turning in cylinder 110''. Cylinder 110'' is secured on pin to frame of car 14R and setended up at latching angle by cylinder 104'' pivotally connected between rod end of cylinder 110'' and frame of car. Cylinder 104'' exhausts through pressure relief valve 748 for cylinder 110'' to latch under channel 62'' at front of carrier engaged by car. Rollers 749 mounted on pins through legs of channels 750 are secured on inside of partition 522R to align in channels 62' to guide coupling into more exact position as the carrier recesses into car 14R. Coupling channels 62' extend into holes 526 in floor of car.

Four hook opening wheels 752, two over each end berth on car 14R, are mounted to lift hooks bars 569R at rear of carrier when engaged in the car, and two at front are lowered to let hooks on the carrier engage container in front berth. Wheels 752 are each mounted on an arm 754 pivoted at 755 with lever 766 to frame of car and forced up by spring 767 pocketed between lever 766 and arm 754 against stop below pivot on lever 766. Levers 766 on each side of car are connected by link rod 768 so one wheel 752 is up and the other down. A double-acting cylinder 770 is pivotally connected between rod 768 and frame of car on each side. Opposite ends of cylinder 770 are connected through solenoid valve 772 to be reversed with switch 620. FIG. 54 or by train line control.

Before car 14R with carrier coupled as in FIGS. 77–79 can open the dip a check is made as in FIG. 17 or preferably as in FIGS. 54 and 79–80 where lamp 130, on roof of car 14R, is lit when containers are moved forward against limit switch 622, FIG. 54, at front end of container area and rear spot is clear for a container to enter. The circuit is from positive of battery 88P, FIG. 54, contacts of reverse switch 620 closed to front and reversed when car is reversed either by train line or movement, normally closed contacts of limit switch LS2' open if container is in rear berth, normally open limit switch 622 closed by container in position for transfer in front berth, lamp 130 to ground. Limit switch LS2' is located at front of rear berth to be opened when container is completely clear from rear spot. Lamp 130 directs light up to concave mirror 774 on carrier 28PR, FIGS. 79–80, when aligned for transfer. Mirror 774 reflects the light to side to photo-electric cell 132 connected to amplifier to lift relay 134.

Relay 134 closes a circuit from positive of battery 92, its front contacts, coil of relay 776 to ground, closing circuit from positive of battery 92, front contacts of relay 776, limit switch 778 opened by carrier after passing the switches 60, solenoid of valve 137 in parallel with coil of relay 776 to ground, to open valve 137 to pressure cylinder 126 to open switches 60 for carrier to enter dip 26. The exit switches at the far end of the dip are hinged for trucks 34 to push open from underneath. The bottom switches 61 are controlled as in FIG. 18. Any of the switches can be controlled by limit switches to prevent being hit to open.

METHODS FOR HANDLING CONTAINERS ON RAPID TRANSIT CARS

Referring to FIGS. 66–69, two containers 16R can be moved on conveyor 532 in car 14R while the carrier is in the car. This requires hooks 70P to be open to clear bails 560 while the conveyor is running. For this a cylinder 780 is mounted to partition 522R on each side of end berth with rod extended up with plate on end to engage under and lift hook lever opening bars 569R to open hooks 70P to clear bails 560 while the conveyor operates to move the two containers forward until first container closes limit switch 622, stopping the conveyor. The conveyor is held stationary after the forward container is removed by the carrier to keep a container at passage 700 and to give more time for releasing the container at opening 700. Conveyor 532 is not started until container is inserted at rear, closing limit switch LS2' thereat. The circuits are as in FIG. 54, limit switches SL1' and LS2' being in opposite end berths just beyond center berth.

Referring to FIGS. 77–78, two containers 16R can be moved by conveyor 532 while the car travels between the transfer dips. This method of operation is provided if any transfer dip is too short to allow time for shifting containers while the carrier is in the car. The carriers, containers and stations are the same for both operations. The cars are slightly modified to operate either way and have center berth filled at all times. With this operation, cars 14R are run with 2–3 containers at all times and have shuttle shields 786 added to protect persons on front container in car when front shield 678 on carrier descends. Shields at front descend between shuttle shield 786 and partition 522R so no one will get caught thereby. Shields on carrier 28PR cover the sides of the container as it is lifted out of the car. The shuttle shields remain in place except when the car is reversed they are moved to forward berth.

Referring to FIGS. 81–83, shuttle shields 786 are steel plates between which the forward container is conveyed to shield from descent of shields 678. Plates 786 rest on sheaves 788 mounted on each end of shafts of the conveyor's rollers 536 against ends of the rollers between side channels of the conveyor 532. Shields 786 have an upward endward and outward projecting bracket 790 at each end with fingers 792 which straddle top edge of partition 522R to space the shields in from partitions for room for shields 678 at front of carrier to descend between a shuttle shield and partition.

When car 14R is reversed, shuttle shields 786 are shifted to front by a rope 794, FIG. 83, connected to opposite ends of each shield 786 at bottom and run endward over sheaves 788 one end around end sheave and back to other end wrapped around drum 795 and takeup sheaves a few turns. Drums 795 are secured on shaft 796 turned by gearmotor 797 driven from battery 88P connected through reverse switch 620 and limit switches opened when the shuttle shields reach the forward end of car 14R. The conveyor is reversed with the shuttle shields and is stopped and started by circuits FIG. 54, but could run continuous with the 2–3 containers per car operation and belt slip.

Car 14R thus equipted can be operated with either 1–2 containers moving two on conveyor while the carrier is in car along the transfer run and leaving one in center spot between transfer runs; or with 2–3 containers, moving two while the car is not coupled to the carrier between transfer runs. Three berth cars 14R can have the container area fully enclosed from aisles by partition and elevator type doors 580 at each berth and operate on this subway or suburban type system as long as the doors are open for sufficient time between movements of the containers for people to exit and enter the containers.

Referring to FIGS. 84 and 85, bars 569R on hooks 70P engage wheels 752 when container is set into car 15R and force the wheels down against pressure of springs 767 until teeth of hooks 70P are moved down to release from bails 560 so springs 767 can swing them up as a FIG. 84.

INDIVIDUAL SIZED CONTAINER SYSTEM

The individual container system FIGS. 86–107 (can be a part of the system described) includes track T with trains 12I which have one or more container cars 14I that each hold a double row of small containers 16I for passengers, express, freight, mail, etc. The passenger containers seat six persons three abrest face to face. This system is well suited for and shown as applied to a subway but not limited thereto. Container carrier track 30 generally follows the subway and runs parallel directly above track T for a coupling run 800 and a transfer run 26 between successive stations PI as in the typical section along a subway shown in FIG. 86 between stations PI and PI' which can be side to side or end to end with stations PA in the same subway, FIG. 65, and cars 14I on either end of the train 12R. The transfer run is likewise a douple dip 26 extended if practical most of the distance between stations whereaalong the carrier and car 14I mesh to reduce the height of the subway to a minimum and so reduce construction cost over that of a container system using elevators 682 to support hook frame 676 for transfer of containers 16I.

Carrier 28I has a rectangular frame 42I of rectangular tubing supported on a truck 34 at each end on same center distance as on carriers 28R. Hooks 70I are pivotally secured to frame 42I faced in for engaging 560 on top of containers 16I. A vertical coupling channel 62 on right side of each end of frame 42I aligns on and between couplers 66 on car 14I. Rollers 63 between legs of channels 62 extend beyond legs to roll on couplers 66 and are preferably rubber covered to reduce noise.

Referring to FIGS. 88–90, cars 14I are preferably of types both MU self-propelled and trainers and have a flat bed 94I and optionally a cab at either or both ends or at ends of the train, a vertical coupler 66 on the right side of the car at each end, two rows of containers berths along the bed between the coupler areas at ends. The rows are defined by a central tapered guide 808 and side tapered guides 809, with berths defined by two conical locators 37I spaced diagonally opposite for each container spot in the row.

Coupler 66 is pivotally mounted between bracket plates 108' to swing endward the car, but engages bed in vertical position to stop inward movement. A dashpot 110' is connected between top of plates 108' and back of coupler channel 102 on each side to take up coupling shock by releaving the coupler to swing endward the car under restoring force of spring 113' in each dashpot. Such a coupler should cushion a six mile per hour coupling speed difference without discomfort to the passengers.

The preferred container 16I, FIGS. 91–93, has an insulated steel body with ends sloped in at top and bottom to guide between containers 16I and double doors 558I in one or both sides. The ends are optionally oppositely corrugated out at 814 and in at 815 to stiffen and mesh with adjacent containers. Doors 558I are pivoted to swing in on pins 818 on each end of each side and stopped from swinging out be top and bottom flange on the container body. Three folding seats 820 in each end recess sufficient for the doors to open in. Two conical impressions 37I' in bottom of container mate on conical hold downs 37I on bed of car to secure container in berth from tipping over. The container has two bails 560 on each side of its roof for engaging on hooks 70I on carrier.

Doors 558I are closed by springs 822. A spring extended locking pin 824 in bottom of each door 558I drops in hole in floor of container when door is closed to lock it. When the door is open the hole is covered flush from underside by cap on top pin 828 supported on spring in tube 830 between bottom and floor of the container. The capped pin 828 is pressed down by pin 824 entering the hole to extend pin 828 from position flush with bottom out to indicate the door is closed. Pins 828 extend down into trough 832 along each side of each car 14I and at the stations. Pins 828 are lifted to release doors 558I to be opened where safe for passage as at station platforms. They are lifted by bar 834 supported on parallel arms 836 to swing up under pins 828 and push them up flush to bottom of containers to lift pins 824 flush with floor so doors 558I can be opened from either side. After persons leave and enter the containers doors 558I swing shut, and bar 834 is dropped to lock the doors shut which are closed or thereafter close.

Referring to FIG. 96, locator cones 37I lock containers 16I on cars 14I with pins 840 which swing out from the cone through holes in the mating cone on bottom of container. Pins 840 are extended by spring 842 and retracted by by air cylinder 844 which lifts pins 840 joined on pivot pin 846 to rod of cylinder 844 against pressure of spring 842 above. A limit switch 848 on car 14I is engaged by vertical coupler 62 on carrier inserted into the car and closes a circuit to release the hold-downs 37I while the carrier lifts off the car. Limit switch 848 then connects battery 88 across solenoid of air valve 849 to connect AIR to head end of all cylinders 844, releasing all hold-downs on the car until the carrier lifts off containers which it hooks onto. An alternative is end partitions 850 separating container berths.

Referring to FIGS. 97–99, the four hooks 70I for each container spot on the carrier are connected by a hook opening frame 852 mounted on pins through holes in opening arms of the hooks, forming a parallelogram linkage at each container spot. Frame 852 comprises two parallel tubes 854 pivotally pined at each end to an arm of a hook 70I and two bars 856 connected between tubes 854 and extending out beyond side of container spot but not as far out as the wheels of the carrier.

Frame 852 is lifted by a bar 858 on the container to prevent removal of the container from the car until bar 858 is lowered. Referring to FIGS. 92, 93, 98, 100 and 101, bar 858 runs from end to end above top of container 16I and has ends bent at 90° and sloped down and secured on shaft 860 mounted in bearings in recesses 862 in ends just below the roof so bar 858 can swing up and down and clear containers engaging ends. Bar 858 is lifted and lowered by rack 864 engaging gear 865 secured on shaft 860. Rack 864 is moved to right, FIG. 101, by solenoid 866 to lower bar 858 and returned by spring. Bar 858 is lowered when it is desired to have the container removed from car at the next transfer out and is held lowered by latch 868.

Bar 858 is controlled by push buttons 870 and 871 conviently located in the container. Button 870 is pressed to lower bar 858 by circuit from positive of battery 88, cam switch 872 closed except when lifted by rail 874 along lift-out section of transfer run, line 876 to each receptical in a locator 37I in each container berth, normally open contacts of button 870, contacts 878 closed when latch 868 is open as shown, coil of solenoid 866 to ground return to battery 88, lowering bar 858 so hooks 70I can close on bails 560 to remove the container when the hooks are lifted. Button 871 closes a cancel circuit from line 876, normally closed contacts of button 870, normally open contacts of button 871, latch release solenoid 880 to ground. Latch solenoid 880 is also connected in a circuit from positive of battery 88, line to contact of each receptical 37I to positive of battery 882 to ground to charge battery 882 in the container, and from positive of battery 882, normally closed contacts of limit switch 884 opened by engaging the floor of car 141, limit switch 886 opened only when rack 864 is extended, solenoid 880 to ground, to release latch 868 after the container is lifted off car 141 to raise bar 858.

Buttons 870 and 871 can be disconnected and replaced with a ticket reader FIG. 102. The reader can be on each container or any container in the system and enables station to station shipment of freight as well as passengers. It is similar to my routing card reader, FIGS. 18–21, of U.S. Pat. No. 3,483,829, except train number reading is omitted. The ticket 890 is inserted similar as a routing card and has a punch hole 891 representing station to which it is to be taken. The reader is indexed when limit switch 872 engages rail 874 at each lift-out, closing a circuit from positive of battery 88 to line 876 to each receptical point A and from A to solenoid of ratchet 894 to ground in parallel with contact through hole in ticket 890 to which the ratchet has just stepped before lift-out to the station punched, point B, contacts of latch 868, solenoid 866, to ground, to lower bar 858, which is then held down by latch 868 engaging dent in rack 864 and opening its contacts.

Referring to FIGS. 103–106, each station for containers 16I has an unload elevator-conveyor section 900, a collecting and storage conveyor section 901, and a spacing and loading conveyor-elevator section 902 all in sequence in line under the carrier track 30 either over track T or off to a side.

Carriers enter station PI from the left with any containers removed from the preceeding train. Containers 161 are unloaded from the carriers by lift section 900, which has a bed 904 with two belt-over-roller conveyors 906 side by side, each for receiving containers along a side of the carrier 281. Bed 904 is raised to release the containers on the carrier to the conveyors and then lowered to clear below vertical couplings 62 on the carrier. The bed is rectangular with side angles 906 turned leg in at bottom connected by channels 907 at ends and at intervals along bottom, a partition 908 of rectangular section lengthwise along center on top of channels 907 and capped with angle 909 turned legs down between conveyors 906 to guide the containers thereto, and angle 910 along inside of each side to form channel 832.along each side of each conveyor. Rollers 911 supporting top run of belt 912 on each conveyor 906 are each secured by their shaft through holes in angles 910 at each end. Frame 904 is supported on double parallelogram linkage 914 to base 915 on each side of secured to the foundation or bridge supporting the station over tracks T. The linkage 914 includes diamond linkage 916 on one end of both sides and tubular members 917 connecting the mid height pivot pins 918 on opposite sides to keep the parallelogram aligned on both sides to hold the bed level. A lift cylinder 920 is pivotally connected between tubular members 917 on the diamond to lift and lower bed 904 to release containers from the carrier above and lower the containers to align storage section 901. Conveyors 906 are both driven in only lowered position by gearmotor 922 connected to drive drums 924 around which belts 912 turn at exit end of the conveyor. Motor 922 is operated through contacts closed at bottom to move the containers taken off the carrier onto the waiting section at right where the containers collect in two solid rows along platform P on each side where passengers leave and board.

Hooks 701 on carriers 28' are preferably opened by a hook release frame 926 secured on each side of bed 904. Frames 926 each support a horizontal bar or tube 928 on parallel linkage arms 930 and springs 931 to float on top each frame 926 to engage under outer ends of bars 856 of hook opening frames 852 to swing open the hooks after the containers are lifted up to release them.

The collecting and storage section 901 has two belt-under-roller conveyors 934 side by side in one frame 936 of one or more carrier lengths. Frame 936 with these conveyors is similar to bed 904 with troughs 832 along each side but is mounted on legs 937 at fixed height. Each conveyor 934 is driven by a gearmotor 938 when the loading section calls for a container ready for transfer in that row.

The loading section 902, next at right, has a loading elevator bed 940 similar to the unloading elevator but with two successions of belt conveyors 941-949 side by side one for each container spot in each row for containers on car 141 and each a container berth in length, replacing both conveyors 906. Each conveyor 941-949 is driven by a separate gearmotor 950 controlled to spot containers called from the storage section to the conveyor 941-949 directly under spot on a carrier to be loaded to align empty spots on the car to be coupled by that carrier.

Containers occupied, and sometimes empty containers when required elsewhere or when they would overload a station, are passed from each waiting section conveyor to the loading section to the right to load on a carrier for transfer with a particular car. The maximum number of containers so passed is limited to the number of empty container spots or berths in that row on the car to which the carrier will mesh for transfer. These containers are distributed on the loading conveyors by control of the individual conveyors thereof to be in loading pattern for the car to which they will be transferred.

Carriers 281 that are unloaded are moved over to the loading position one at a time to receive their load of containers lifted thereto by the loading section 902. The carriers can be unloaded and reloaded with another set of containers in a few seconds thus not delaying the carriers while people leave and enter containers, thus enabling close spacing of trains and high passenger capacity for this system.

Referring to FIG. 107, along track 30 at each station PI runs a power wire PL and a control line wire CL for contact by respectively shoes 952 and 448 on each forward truck 34 and same at opposite side of rear truck for reverse direction or turned around cars. Line CL has a stop segment 954 for positioning the carrier on the station stop with fore segments 955 and 956 on left and aft segment 957 on right of each stop so shoes 448 make contact with control line CL with no dead spots. The speed and direction of the carriers are controlled according to the voltage and polarity engaged by their shoe 448 for control as in my U.S. Pat. No. 3,483,829, FIG. 38. A stop is set to stop the carrier by grounding the stop and run the carrier's shoe 448 thereto by a positive voltage on the section to the left and a negative voltage on section to the right. Control line connections are from positive of battery 272I, line 960 to section 955; from line 960, voltage divider 962 to ground; from tap on resistor 962 to section 956; from line 960, bottom front contacts of each stop relay 964 to segment 954; from segment 954, bottom back contacts of relay 964 to ground; and from negative of battery 272I, line 966, back contacts of relay 964 and resistor 968 in series to segment 957.

Track 30 is insulated for a track circuit along the length of each carrier stop and has a battery 970 and relay TCR connected across ends of each block. Each stop relay 964 is lifted to let the carrier move to the next position when clear by circuit from line PL to front contacts of each track relay TCR to coil of relay 964 for preceeding stop.

A check that conveyors 906 are empty before lifting to unload a carrier is made by circuit from positive of battery 2721, line PL connected by shoe 952 to rail 974 where carrier is positioned on the unload stop, line 975, back contacts of relay 976, line 977, limit switch 978 closed when conveyor bed 904 is empty, coil of relay 980 all in series to ground of battery 272I. Relay 980 then closes a holding circuit from line 977 through its fromt contacts and holding coil to ground and energizes solenoid of valve 982 connected across its holding coil. Valve 982 is then opened to connect pressure from AIR to rod end of cylinder 920 to lift bed 904 to engage and lift all containers on carrier above so tubes 928 will open hooks 701 and hold them open with springs 931 as bed is lowered until when hooks swing back their tooth will swing against or above bails 560 and not latch under them. Limit switch 984 engaged at top of travel of bed 904 closes a circuit from rail 974, line 975, to top coil of relay 976 to ground, closing a holding circuit from line 975, front contacts and coil of relay 976 to ground. The lifting of relay 976 drops relay 980, deenergizing valve 982 to exhaust cylinder 920 through restriction to safely lower all containers from carrier thereabove. Elevator 900 closes limit switch 986 at bottom completing a circuit from line 975 to front contacts of relay 976 in series with front contacts of relay TCR in next block, coil of relay 964 for unloading stop, to ground, lifting relay 964 when the section to right is clear to move the carrier to a load section if vacant or to the storage section if the loading section is occupied. The first carrier in the waiting section moves to the loading section when the loading section is clear, its relay TCR lifted. The carrier is stopped for loading on section 902 with shoe 448 on that stop 954 and shoes 952 connecting rails PL and 974 for that stop.

In the mean time when elevator 900 is lowered motor 922 is connected to power line PL through limit switch 986 closed by elevator at bottom to move containers off onto conveyors 934 of section 901 which runs the containers against rod of stop cylinder 990 where passengers leave and board the containers along platform P. Each conveyor 934 is driven by a gearmotor 938 connected to power line when stop 990 is retracted or to run continuously with belt or rollers slipping while the containers are held against stop 990 until the loading section 902 receives instructions from the car 14I in train 12I for which next carrier is to load.

The loading conveyors are controlled by signals from the car in the train for which the carrier is to be loaded for transfer and by the movement of containers on conveyors to position as required by the car to be loaded. The loading on each car is signaled to station PI upon request from the station when ready for loading the carrier with which that car is to couple for transfer.

Station PI puts a signal on rail 992 when ready to receive loading instructions. Rail 992 runs along track T toward the station from a point after the preceeding transfer dip and far enough ahead of the station for loading the carriers in time for the train. When the loading elevator 902 is empty and down it is ready for instructions for loading a carrier and closes a circuit from positive of battery 272I, line 994, contacts to line 995 on bed 940, limit switches 998 in series opened to detect container on elevator, contacts closed by elevator only when down, coil of relay 1002, all in series to ground, lifting relay 1002, connecting signal source AC through capacitor 1004 to line 1006 to rail 992.

Each car 14I has a limit switch in each berth to detect whether the berth has a container or is empty, only limit switches LS1'–LS6' being shown in first six berths. The limit switches on each car 14I are read in sequence by wiper on rotary switch 1010 driven by gearmotor 1012 one revolution from position shown upon the car receiving the AC signal from the station to return loading signals to the station.

A shoe 1014 on each car 14I is lifted by rail 992 to receive and send the signals. When shoe 1014 of the first car 14I in train 12I lifts on rail 992 the AC signal circuit is completed from shoe 1014, lead to stop contacts closed by the shoe when lifted by rail 992, normally closed contacts on coupling switch 1018 closed on front car 14I and opened between cars 14I, line 1019, capacitor 1020, coil of AC relay 1022 to ground, lifting relay 1022 to start switch 1010 for one revolution clockwise to read loading of the car to the station. Relay 1022 closes a circuit from positive of battery 88, line 1024, front contacts of relay 1022, start segment 1026 connected by wiper to motor of switch 1010, to ground, to start switch 1010. The wiper then engages segment 1028 connected directly to positive of battery 88 to drive the switch most of the revolution while its wiper contacts lines from positive and negative of battery 88 respectively through normally open and normally closed contacts of limit switches LS1-LS6 etc. to contacts in sequence about the wiper. The wiper contacts ring connected by line 1030 to top contacts and lead to shoe 1014. Shoe 1014 sends the positive and negative signals on rail 992 representing respectively full and empty berths, line 1006 to coil of ratchet stepper 1032 which rotates its finger one step counter-clockwise from starting position shown for each berth read. A rotary counting loading count comparitor is provided for each container berth in car 14I (For simplicity of explanation only three are shown: RS2, RS4 and RS6 in near row for controlling conveyors 942, 944 and 946 respectively for these berths.) Each of these counters has a wiper driven by an upper ratchet over a switch disc driven by a lower ratchet. Line 1006 is connected through rectifier 1038 to pass negative pulses (or no pulse if positive) through finger of stepper 1032 to contacts to lines 1040 to coils of bottom ratchets of counters RS1, RS2 etc. in succession, to ground. Rectifiers 1042 are connected between lines 1040 to successive lower ratchet coils for each row separately to pass the negative pulse to a forward counter (at right) back along to coils of all succeeding counters for that row of conveyors to count number of containers to be moved by each conveyor to align containers on these conveyors to register with empty berths on the car.

Each top ratchet of counters RS1–RS18 resets its finger to position shown against stop, and the bottom ratchet resets disc one step behind finger before each loading cycle. Both top and bottom ratchets step equal arc in same direction when stepped. When any bottom ratchet is stepped all to left of it are also stepped. When a bottom ratchet steps a disc one or more steps under finger a circuit is completed from positive of battery 272I, line 994 to finger of each comparitor RS1-RS18, conductive segment of any disc which has been stepped under a finger, coil of relay 1046 for conveyor on left to ground, and from last conveyor at left, weighting limit switches 1048 closed by forward container on waiting section 901 when the container is occupied and limit switches 1049 closed by pins 828 to detect doors of the container are all locked closed, coil of relay 1050 to ground.

After switch 1010 makes its series of contacts to each berth on car 14I it passes contacts 1052 connected to positive of battery 88 to step finger of switch 1032 nearly the rest of the revolution past segment then connected by the finger connecting line 994 from positive of battery 272I to line 1056, front contacts of relay 1050, solenoid of valve 1058 to ground, opening valve 1058, connecting AIR to rod end of cylinder 990 to retract its rod to let container pass to loading conveyors.

Each container 16I has a shoe 1060 which connects three parallel contact lines 1061, 1062 and 1063 along the loading section when the elevator is down, all in line with trough 832 in which shoe 1060 extends. Line 1061 is connected by line 994 to positive of battery 272I or other power source. loading spot line 1062 is segmented into a length for each container elevator. Stop line 1063 is segmented into a stop 1064 for each spot shoe 1060 can be at for loading the container and a run line 1066 beyond each stop 1064.

Each loading conveyor is controlled by shoe 1060 on each container when on the conveyor and by the comparitor for the next conveyor forward connecting its finger and segment when the container is to be passed forward to that conveyor. Shoe 1060 of container entering loading conveyor connects power line 1061 to section line 1062 for that conveyor. Line 1062 is connected to coil of top ratchet of counter for that conveyor to ground to subtract one from number of containers to be handled by that conveyor in loading Line 1062 is also connected to coil of relay 1070 is ground and connected through back contacts of the stop relay 1072 to line 1074 for each loading conveyor. Each loading conveyor is driven by gearmotor 950 whose armature is connected across line 1074 for that conveyor and ground reversely through front and back contacts of reversing relay 1076 and its field connected across line 1074, and ground. The coil of reverse relay 1076 is connected between ground and line 1066 to right of stop segment 1064 for that conveyor through back contacts of count relay 1046 for all but first conveyor on right. Coil of relay 1078 is connected between annular segment on disc of counter for elevator next at right and ground to drop when the container is last one to be received for loading. This closes circuit of reverse relay 1076 to reverse motor 950 if the container's shoe 1060 passes its stop, to move the container back on the stop into position for loading. Relay 1076 sets stop when dropped, but when lifted it passes container on to next conveyor ahead.

When containers are in place on loading conveyors (or none to be loaded) and empty carrier aligned above, a check circuit is closed from line PL, shoe 952 on the carrier contacting rail 974, line 1080, contacts closed by stop cylinder 990 when set to stop containers from entering loading section, line 1082, back contacts of relay 1084, back contacts of all relays 1070 in series, front contacts of relay 1070 and 1072 for each conveyor in series across back contacts of relay 1070 for that conveyor, front contacts of time delay relay 1086, solenoid of valve 1088 to ground, to connect AIR pressure to rod end of cylinder 920 for elevator section 902 to engage containers on carrier above when each loading conveyor either has a container located on the stop (relays 1070 and 1072 lifted) or no container (relay 1070 dropped). Coil of time relay 1086 is connected between line 1056 and ground, to provide time for containers to enter loading section before elevator can lift.

AT top of travel, elevator 940 closes limit switch 1090, connecting line 1082 to coil of relay 1084 to ground, lifting relay 1084, closing holding circuit from line 1082, and deenergizing valve 1088, which exhausts cylinder 920 through restriction to lower the elevator. When the elevator reaches bottom it closes limit switch 1092, connecting line 1082 through front contacts of relay 1084 to reset line 1093, front contacts of relay TCR for next block to right, coil of relay 964 for the loading stop, to ground, to move loaded carrier on to wait for train, the clearing of the loading spot calling the next carrier to load.

After loading, elevator returns empty and all ratchets at station reset, relay 1002 is lifted, sending signal AC on rail 922 for next car 14I in train to send loading instructions. Shoe 1014 of first car 14I, still engaged with rail 992, completes a circuit by lead to its top contacts, line 1094, segments of rotary switch 1010 now connected where its finger is stopped, train line 1096 to next car, normally open contacts of coupling switch 1018 therein, coil of relay 1022 to ground, lifting the relay to start rotary switch 1010 of second car to signal loading from its shoe 1014 back to the station as for the first car etc. loading carrier for each car in train.

When shoes 1014 leave rail 992, when close to station, they each connect circuit from positive of battery 88 on their car, normally closed contacts of shoe 992, reset segment 1098 to finger to motor of switch 1010 to ground, to complete the revolution of switch 1010 to starting position shown ready to signal after transfer for next loading.

By mounting the carrier's couplers 62 to swing out of the way, as in FIGS. 110–111, the containers need not be lowered and lifted more than a few inches to disengage and engage hooks 70I at stations PI.

CONTAINER TRANSFER SYSTEM FOR SMALL CONTAINERS OF VARIOUS LENGTHS

Individual, public, private or special purpose containers of various lengths can be handled by the variation of the system shown in FIGS. 108–117 using containers 16V, 16V' or 16V" two rows per car 14V and carrier 28V. A typical preferred container station PV for subways has two runs of powered roller conveyor 1100 along under each carrier track 30 for each direction of traffic. Each line of conveyors 1100, one for each side of car 14V, has an unloading conveyor section 1101 at entrance end of station for its direction of traffic, a transfer bridge conveyor section 1102 and a reloading conveyor section 1103. Two transfer bridges 1106, one for each direction of traffic, each with two sections 1102, run on track TT in well TW at right angles to the conveyors to transfer various sizes and types of containers 16V-V" to and from storage conveyors 1110, between lines of conveyors 1100 as to balance loading or send containers back on return trip, and to connect with building for containers or interchange with other lines.

Cars 14V are generally the same as cars 14F except they have a belt-under-roller conveyor 532V along each side to move containers forward similar as conveyor 532, FIG. 54, and are pulled by electric locomotive or are self-propelled under multiple-unit control. Carriers 28V each have a frame 42V with two channel rails 1112 turned legs facing along length of each side on bottom as a rack to suspend containers 16V which have hooks 70V that latch over bottom legs of rails 1112, FIGS. 112–115, and a vertical coupling channel 62 on each end mounted on horizontal arms 1114 to top and bottom of frame 42V to swing from coupling position on right to center to pass between containers and conveyors 1100 at station to open ends of carriers to pass containers out and in. The couplers 62 have a vertical bar 1116 extending up from outer corner of leg at webb with horizontal roller 1118 on top to engage between cam rails 1120 above carrier track 30 to turn the couplers at each end to center position against restoring force of springs or air in cylinder 1122. Cam rails 1122 extend beyond each end of the station to swing couplings 62 into center position before the carrier meets station conveyors and while the carrier is over the station to clear couplers 62 between conveyors 1100 and containers thereon.

The containers are slightly lifted by conveyors 1102 when engaged thereon by the incoming carrier to free them from rack rails 1112. Stop arms 1126 and 1127 extend down from opposite ends of and oppositely on each container rack row on each carrier 28V off center to engage tab 1128 on right side of top on each end of container 16V to hold containers from slipping off end of carrier and to engage containers on loading section of conveyor to take them on carrier. Each arm is pivoted to swing transversely on a pin 1130 between portions of, or brackets 1132 depending from, frame 42V. Arm 1126 extends above pin 1130 to fork connected to bar 1134 which is supported to slide transversely in frame 42V and extends out side and is bent up with a roller 1136 on end a short way from side in from rail 30. Arm 1127 is pivoted on a pin 1130 at top and has slot below connected to bar 1134' supported to slide transversely in frame 42V and extends out side and is bent down with a roller 1136 on end same distance out as on bar 1134. Springs 1138 hold bars 1134 and 1134' in and arms 1126 and 1127 vertical except when roller 1136 engages a cam rail 1140 or 1141 run between ends of station both on each side one above the other with gap between and supported on brackets down from rails 30. Rails 1140 and 1141 are curved in at entrance end of station to engage behind rollers 1136 at each end of the carriers to pull bars 1134 and 1134' out to swing arms 1126 and 1127 in from line of tabs 1128 to free containers to move off ends of carriers, so carriers can take on containers for car in next train. Rails 1140 have gates 1144 hinged at front and operated to direct wheel 1136 either along or behind rail 1140 at an open gate at spot where the rear arm 1126 or 1127 for the container row will engage correct length of containers for loading the car with which it will align.

Looking into station from entrance end, FIG. 115, gates 1144 are in top rail 1140 on right side and in bottom rail 1140 on left. Outer ends of bars 1134 and 1134' extend into slot between rails 1140 and 1141. The roller on bar 1134 on near right side rides out side of top rail 1140, and rollers on bar 1134' at far end of that side rides outside of bottom rail 1141, and the reverse for opposite side. Arms 1126 and 1127 at front of carrier are held open all the way through the station by the cam rails 1141 without gates, on top on left and on bottom on right. The same arms at rear of carrier ride the gate rails 1140 on top at right and bottom on left. Each end of carrier is the same, so carrier can be turned end for end and operate through the station.

Containers are moved forward on cars 14V leaving any space for more containers at rear. Carriers load a maximum length of containers on rear equal to length empty on rear of car with which each aligns for transfer. Carrier rails 1112 are preferably rubber faced or serrated so the containers will not slip position.

Each container 16V has two or more hooks 70V secured on each of two parallel shafts 78V pivotally secured between two transverse yokes 1146 one along each side of the container below top to slide up thereagainst when the hooks are lifted. Hooks are faced out to latch between rails 1112 over bottom upturned edge on legs thereof. The hooks have a depending lever arm connected by solenoid cylinder 1150 at one end of the container. The rod of cylinder 1150 is drawn in by spring to latch the hooks onto rails 1112 and pushed out by solenoid and latched in extended position to hold the hooks open to release from the carrier when the container is set down on car 14V. The hooks are opened by a circuit from the positive of battery 882', contacts of limit switch 1156 closed by engagement with bed of car 14V when container is set on the car and opened by the slightest lifting of the container, normally closed contacts of "remove" button 870 pushed to leave train, normally open contacts of latch solenoid 1158 closed while cylinder 1150 is unlatched, solenoid of cylinder 1150 to ground, to push rod of cylinder out, to swing all four hooks wide open where latch 1158 engages in recess on rod of the cylinder to hold the hooks open. Button 870 is pressed when the container is to be removed at the next lift-off and closes a circuit from positive of battery 882', normally open contacts of button 870, normally closed contacts of "cancel" button 871', point b, hold coil for button 871' to ground, and in parallel from point b, normally open contacts of limit switch 1160 closed by rail 1112 or the carrier when at bottom of dip transfer, solenoid 1158 to ground, to release latch 1158 for spring in cylinder 1150 to retract rod to extend hooks 70V over rails 1112 to lift the container off car when the carrier lifts off. Limit switches 1156 and 1160 open as soon as liftoff starts, thus preventing the closing or misclosing of hooks during liftoff of the frame 42V when latching is uncertain.

Two or more latch-down hooks 1162 are secured on a shaft 1164 along each side of container 16V under floor to swing inward to latch under top of outturned flange of channel with vertical slack along each side of conveyor 532V on bed of car 14V. Latch hooks 1162 each have a lever arm connected by link 1168 to the yoke 1146 directly above. Yokes 1146 have vertically guided movement in container 16V to lift when hooks 70V are lifted to open latch hooks 1162 before the container is lifted. Latch hooks 1162 have slack under top legs of conveyors so the container can ride along on the conveyor held from tipping sidewise and endwise off the conveyor especially while carried by a car. Conveyors at station have no top leg on sides so limit switch 1158 will not be closed or damaged thereby.

The carriers can move through the station slowly nonstop. The containers deposited on each unload conveyor 1101 are held by stop 1170 for unloading while doors 558I on the containers are released by lifting rail 834, lifting pins 828 as in FIGS. 92–95, for passengers to leave. Public containers pass through the station in line on the conveyors except if more are coming in than being loaded they can be transferred to the return runs or to another line or to storage using transfer table 1106, which can be pushed or motorized. The special and private containers are transferred to and from the conveyor runs by table 1106 and put on storage conveyors 1110 or in container building. Special containers can be outfitted for ambulance, fire and police duty and in storage for quick dispatch.

Empty containers are run across the transfer table while in the conveyor line. The empty carriers can run past the transfer table only when in the conveyor line or when the table is completely removed from thereunder.

The containers are collected against stop 1174 on the reloading conveyor along a platform P and door pins 828 lifted with rail 834 ao persons can open and enter when safe as in FIG. 95. Cam rail 834 drops pins 828 before train time when carriers move slowly by and extend arm 1126 or 1127 to catch the correct length of loaded containers with doors locked closed for the car the carrier will couple. The carrier opens stop 1174 at exit end of each conveyor 1103 while any containers engaged by a finger 1126 or 1127 on rear of carrier move off that container row on the carrier. Stop 1174 is connected to cam wheel 1176 and mounted at station to move up and down therewith. Cam wheel 1176 is lifted by counterweight or spring the set stop and is forced down by cam rail 1177 along each side of carrier to open stop while carrier passes.

CONTAINER LOADING CONTROLS

Referring to FIG. 117, only four of the berths per container row are shown to simplify the drawing and explanation. Each berth is a minimum container length and has a limit switch LS' at each end for detecting a container anywhere therealong. Containers are preferably one or more whole berth lengths.

The number of empty berths from rear in each row is signaled to station PV from the first car 14V when its shoe 1014' is lifted by rail 992. A ratchet stepper 1010' for each container row on car has contacts connected in succession each to a limit switch LS' at front end of berths in sequence from rear berth forward from either end of car according to direction of car wheel movement detected by switch 620 as in FIG. 54. The positive and negative of battery 88 are connected through respectively normally open and closed contacts of limit switches LS' at front of each berth to line to contact arranged to be contacted by wiper 1180, one contact per step of stepper 1010' in sequence from rear toward front berth, from the wiper to reverse switch 620 closed to the lines from the front limit switches LS', line 1184, back contacts of time delay relay 1186, normally open contacts closed by shoe 1014' when lifted on rail 992, rectifier 1188 to pass current from negative of battery 88, coil of ratchet stepper 1010' to ground, to step once for each empty berth (connected by its front limit switch LS1 to negative of battery 88) and stop at berth with container (limit switch LS' pushed down by container to positive of battery 88). Coil of time delay relay 1186 is connected from line 1184 in series with top normally open contacts of shoe 1014' and rectifier 1190 to pass current of positive direction to ground, to open the signal circuit after the positive pulse so next car can signal when its shoe 1014' reaches rail 992 for each side of car 14V. Shoe 1014' is connected by lead to its normally open contact to put the positive and negative pulses on rail 992, negative for each empty berth in row and positive when the stepper connects first berth from rear with container, stopping the stepper and opening the signal circuit when the positive pulse is completed.

Each conveyor 532V on cars 14V in train 12V is represented at station by a ratchet stepper 1192, which is set by the corresponding car 14V in the train to number of empty berths from rear in the row. The first contact counterclockwise from reset position shown for each stepper for row is connected together to solenoid 1194 connected to operate first gate from right through limit switches 1048 closed by container weight when loaded and limit switches 1049 closed when container doors are locked closed. The second contact counterclockwise on the steppers for that row are connected together to solenoid of second gate through limit switches 1048 and 1049 for that spot on the loading conveyor, etc. Only these connections for the far row are shown, the near row being duplicate and the connections from its steppers 1192 being omitted for simplicity. Negative signals representing number of empty berths from rear of each row on successive cars are connected to step successive ratchet steppers 1192. Ratchet coils of steppers 1192 for each row are connected by a stepper 1196 which steps once each positive pulse received from train and passes on only negative pulses to coil of stepper 1192 connected to step its wiper to number of empty berths on car represented by that stepper. The positive pulse represents a full berth to index the stepper 1196 to the next stepper 1192 representing next car 14V in train. Rail 992 is connected by line 1198 to station rectifier 1199 to pass negative pulses to wiper of stepper 1196 to contact line to coil of stepper 1192 for first car to step number of empty berths which can be loaded. Coil of ratchet stepper 1196 is connected in series with rectifier 1200 to pass positive pulse between line 1198 and ground to step its wiper to coil of next stepper 1192 to receive negative pulses from second car 14V in the train to step to number of berths available to load on that car etc. In case a car row is full the start contact engaged by wiper 1184 on that row is connected to positive of battery 88 so when shoe 1014' lifts a positive pulse is connected on rail 992 before time relay 1186 lifts after stepper 1196 steps to ceil of next stepper 1192 to receive signals from next car. If a car row is empty stepper 1010' steps for each berth and steps from last to contact connected by line 1202 to positive of battery 88 to ratchet stepper 1192 at station to next stepper 1192. Each car must send its signals before next car engages shoe 1014' on rail 992, which is possible with high speed retchet steppers or memory circuits.

Thus when train 12V has passed rail 992 wipers 1192 indicate number of empty berths on each car in succession for each row. These wipers are connected to power in succession by successive carriers passing the leading section ahead of the train each to open a gate 1144 in turn to release arm 1126 to engage the right length of containers ready for loading to fill the car if it has room for one or more containers.

The carrier to align first car is first to close circuit from positive of battery 272, rail 1204, shoe 1205 on the carrier to rail 1206, line 1208 to fingers 1210 and 1211 of ratchet stepper 1212, and from line 1208 coil of stepper 1212 to ground of battery 272, stepping ratchet fingers 1210 and 1211 once to first carrier loading position contact which connects power to finger of first stepper 1192 already stepped to contact to open gate at number of minimum container lengths from end of conveyor 1103 which can be loaded subject to limit switches 1048 and 1049 which can be bypassed with hand switches to load empty containers or containers with faulty or open doors. Arm 1126 or 1127 at rear of carrier swings down at opened gate to engage tab 1128 ahead at rear of container only (the tab at front of the container is on oppoiste side). Thus if only a short container can be taken by the car and a long container is first in line to be loaded, arm 1126 or 1127 swings down beyond tab of the container too long to be loaded and will only take a length of containers equal to or less than the space on the car available.

The steppers 1192 all reset when last car clears track circuit block TCB along approach to the station ending just past the station, for lifting the track circuit relay TCR to complete circuit to reset steppers for next train.

CONTAINER CAR WITH CENTER AISLE

The container car can be wide enough for two rows of containers one on each side of an aisle down the middle so passengers can leave the container for a seat on the train and use train facilities.

Accordingly car 14D, FIGS. 118–120, has an enclosed aisle 524D down the middle between enclosed ends on a wide frame bed 94D. The aisle is enclosed by a partition 522D along each side and a roof 1250 sloped to guide containers 16P into berths along each side of the aisle. Doors 580 in partitions 522D to each berth align doors 558 of container 16P when in the berth. The carrier 28D for loading and unloading containers 16P has a wide frame 42D to align hooks 70P with bails 560 on containers when on car 14D. Cars 14D and carriers 28D are similar in details to any of the container cars and carriers described and stations provided accordingly. The containers car include desk or table and seats which make up into a bed 1252 for overnight as a private office roomett which can be removed from the train by carrier 28D unloaded and reloaded at a station as FIG. 3, 103 or 108 and moved on conveyors 1258 and transfer table 1259 into a hotel-office-storage building 1260, FIGS. 121–124.

CONTAINER HOTEL-OFFICE-STORAGE BUILDING

Referring to FIGS. 121–124, container building 1260 has a steel frame 1262 of several stories with vertical columns 1264 and horizontal H or I beams 1266 lengthwise a hall 1268 at each story level and horizontal cross beams 1270 intersecting with beams 1266 at each end of a modual comprising a container berth each side of a container elevator 1272 along each side of hall 1268 between walls 1274 with sliding door 1275 behind each room door 1276.

Each container berth has a container rack 1278 which runs on outboad flanged wheels 1279 on axle 1280 between beams 1266. Rack 1278 has a frame of two upturned channels 1281 with longer outer legs flaired out connected by high end members 1282 to guide and held a container in position thereon. Channels 1281 for a pocket under each side of the centainer for pins 828. The outer leg of the inner channel has a central elongated hole through which a wedge plate 1284 secured on rod of air cylinder 1285 at each berth in inserted by spring within the cylinder to lock the rack in the berth and to wedge pins 828 up to release doors 5581 to open and is retracted by air. Frame 1278 is rolled from the berth out under a container lifted on the elevator 1272 from conveyor 1258 below. The elevator shaft is enclosed with the hatchway doors, therefore on floor is needed on the elevator.

Each elevator 1272 has a hook frame 1286 supported on the usual roping and slow speed drive and guided by long shoes 1287 on four guide rails 1288 each out from a corner of frame 1286. Shoes 1287 are held vertical by spring on each side and flaired out to span the gap in rails 1288 at beams 1266 which are the rack's track. Cam opened hooks 70E are pivotally mounted on frame 1286 to latch on bails 560 on containers and opened by lowering after setting the container down on a rack 1278 or on conveyor 1258 through bottom of the elevator shafts. This swings the hooks 70E wide open where they latch open until raised above hooking position using the mechanism as in FIGS. 22–26 of U.S. Pat. No. 3,237,142. Elevator operators watch car movement through hallway-to-hatch windows and control elevator by up and down push buttons. A double acting air cylinder 1290 connected between beam 1270 at head end and front cross member 1282 below rack at end of rod parallel the rack track is controlled by hand valve 1291 to extend and retract the rack and pressure cylinder 1285 simultaneously to release wedge 1284 for the rack to move. The insertion of the container in the berth pushes open sliding door 1275 behind the usual locked room door 1276 facing the hall. Door 1275 has a tab 1292 which engages end of container to push open and is mounted on a tilted track and weighted to close as a fire door so as to be opened only by a container in the berth and closed when berth is empty. The building is sheathed with panels 1294 with recessed widows 1295 at container berths to align windows in containers. The containers have end recepticals which are engaged by plug 1296 in far end of each berth to furnish power to charge battery 822 and heat and light in the container.

Referring again to FIGS. 65–85, if the shuttle shields are omitted as with the operation where the containers are moved forward between the shields of the carrier, the floor of each open-side container is preferably extended out beyond the top and ends to extend under shields on the carrier and has a groove or upstanding tabs along each side edge on the floor of the container to hold the bottom on the shield against the container so the floor can move under the shield to close opening between floor and shield and prevent shield from being sprung out and to reduce the gap between the floor of the container and the platforms or aisles along which it is docked.

Having thus described a few embodiments of my invention, it is understood that the invention is not limited to the embodiments disclosed, since it may receive a variety of embodiments which can become apparent to those skilled in the art by study hereof. Therefore it is desired to cover all variations within the true spirit and scope of this invention as defined by the following claims.

I claim as my invention:

1. A container transfer system having containers, a railway track, a train on said track, at least one car in said train having an open container area for at least one of said containers, a suspended station track parallel over said railway track for a transfer run at least one carrier on said track having a frame and outboard support wheel means on each end of said frame for suspending said carrier to move along said station track, vertical depending coupling means extending down from said carrier, vertical coupling means on said car extensible to engage said depending coupling means for coupling said carrier when aligned thereabove to telescope therein, means on said frame and on said containers for engaging and suspending any one or more of said containers thereto, and dip and return slopes one for each said wheel means for lowering and lifting said frame substantially level over said car so coupled and moving along said run.

2. A system as in claim 1, said frame being loaded with a container on one end, and a second container in opposite end of car out from under said container on said frame, and means for releasing the container set in and for engaging said second container to said frame, and means for moving the container set car to spot where container is removed.

3. In a system as in claim 1, said area being in two rows each along a side of said car add, said frame covering said area, and means for selectively controlling removal of each container when said frame is lowered over said area to latch containers thereto for removal when said frame is lifted.

4. In a system as in claim 3 an enclosed aisle between said rows, doors in said aisle for aligning doors on said containers on said car.

5. In a system as claim 1, said support wheel means comprising a vertical swivel column extending up from on at each end of said frame and a truck pivotally secured to each said column to tilt down and up endward the carrier and spaced for operating on a double-dip along said transfer run.

6. A system as in claim 1, said carrier having vertical depending coupling off center similarly to opposite sides at each end, said cars having vertical coupling for engaging said depending coupling therebetween for aligning said carrier with said car for transfer of at least one said container.

7. In a system as in claim 1, said depending coupling means being two columns extending down from said carrier off center equally and oppositely one at each end of said frame, said vertical coupling means being similarly aligned off center on said car so as to engage to telescope along opposite ends of said coupling columns to couple said carrier to said car only when aligned for transfer over said car.

8. A system as in claim 7, said vertical coupling means on said car being an upstanding member at each end of container area resiliently mounted to swing endward out of way of said columns when hit at more than coupling speed difference.

9. A system as claim 1, said container area being a plurality of container lengths, said car having conveying means along said area for moving the containers to an end of said area to clear opposite end to receive containers from said carrier.

10. A system in claim 9, said frame being substantially a whole number of containes lengths, more than two, said containers having at least one open side, said frame having depending shielding extending down to cover open sides of said containers when in end position of said frame, said engaging and suspending means being only at ends of said frame to transfer containers only when behind shielding for transfer of said containers.

11. In a system as in claim 10, said containers each having bottom and ends and substantially open sides for fast entrance and exit of load for transfer behind shielding to and from trains.

12. A system as in claim 1, said car being enclosed and having upper and lower floors, a roof having opening for setting said containers on upper floor over lower level for passengers under said upper floor and means connecting the upper and lower floors for use of passengers entering and leaving the train by the containers.

13. In a system as in claim 1, said dip track of wide gage for said wheel means having outboard wheels fore and aft to maintain the carrier substantially level on inclines, a stretch of two rails at said gage having two similar dips down and back up along said transfer run and adjacently aligned along each said rail, rails at said gage connecting the top of each end of the dips together and sections connecting the bottoms of the dips together, a top switch where the outer ends of the dips and horizontal rail meet for closing the outer ends of the dips until the fore wheels of the carrier pass and means for opening said switch for the aft wheels to enter the dip, lower switches for swinging down to run fore wheels to the lower horizontal rail and for directing the aft wheels to the inclines up.

14. A system as in claim 13 and safety track over dip so carrier can pass the dip if not right for transfer, entry switches to the forward dip rails and means for opening all entrance switches to the dip only when carrier is vertically aligned with car and loading positioned for transfer.

15. In a system as in claim 14, controls for the top switches at entry to the dip including a photoelectric trackway receiver, a mirror on said carrier, a lamp on said car directing light to said mirror when said car and carrier are aligned for tranfer, said mirror being positioned to reflect that light to said receiver when along where the carrier is when the entrance switches are to be opened after the forward truck passes first switch, and means controlled by said receiver to open said switches to said dip when the light shines on said receiver until after the carrier enters the dip.

16. A system as in claim 13, wherein said station track has portions wide gage and I-beam monorail, said carriers each having wide gage truck for suspending each end thereof from the wide gage track, a monorail trolley side fixed on top of each side of each truck for suspending from said I-beam monorail.

17. A container transfer system having at least one container, a stretch of railway track, a train thereon having at least one car having a container area for at least one said container, overhead station track including a transfer run along over said railway track, supporting means for supporting each end of said container for moving said container on said station track, said transfer run having lengthwise displaced double dip means therealong for said supporting means to run up and down on the two dips simultaneously to transfer said container substantially level between said car and the station, said dip means being two successive inclined tracks down followed by two successive inclined tracks up each two substantially identical in profile as viewed from side, the undermost (ie. inner most) inclined tranks down and up being two rails at wide gage for container to pass between when passing down or up said inclines on said supporting means, the outermost (over) inclines serving to support said support means so container thereon is maintailed substantially as level along the inclines as along horizontal portions of the station track.

18. A system as claimed in claim 17, said car having container space arranged in two rows one along each side, said container being one of many individual private containers therefore of uniform size having lift means at top, hook and hook control means therefore and for holding container in place on car, said carrier having a frame with suspending means for container to be engaged in vacant space on car when the carrier is coupled and inserted on car.

19. A system as in claim 18, said private container having doors in both sides, pins and pin lifters to substantially prevent said doors from being opened except when safe, ticket and ticket reader for controlling said hook control means to determine station for which container is hooked to carrier to be lifted off the train.

20. A system as in claim 18, and a building for housing passenger containers carried on said system, said building including at least one container elevator and shaft therefore, a frame having berths for the container along two opposite sides of the elevator shaft, each berth having a track extending out to straddle elevator and a rack on said last mentioned track for moving into berth and out under the elevator to receive or deposit a container, said elevator having hooks for engaging a container to lift and set on the rack when run out under the container after being lifted above the rack, said hooks on said elevator releasing only when the container is set down.

21. A system as claimed in claim 17, said supporting means including plural wheel means having a centers distance along said station track equal to spacing between the successive dips.

22. A system as in claim 17, said car having a bed frame with two latch rails along each side to latch the container onto to prevent tipping over, a conveyor along each side of the car between the latch rails to move containers on each side to one end of the car, said carrier having a frame with two suspending rails along each side, there being a plurality of the container each having hooking means on top at uniform height and gage to engage along the suspending rails on said carrier, a station having conveyor means parallel along under said station track to relieve carriers of containers so carrier and containers can move independently therealong, means for determining and signaling length of empty space on each conveyor on car when approaching station and means at station and on carrier thereat to engage a whole number of containers of length on end of each side which will fit within empty length on the car which signaled to be coupled to that carrier for transfer of these containers onto empty end of the car, the containers having means for engaging said rails on said carrier and releasing from the rails on the car for transfer off to station to which container is intended, said conveyors moving the remaining containers forward after said carrier lifts off to clear space at end of the conveyors for receiving containers of various lengths on the car.

23. A system as in claim 17, said container being a private passenger container, a hotel-office-apartment building having berths eanh having walls and door means for housing the passenger container therebehind as at least part of the occupants room space, and conveying means secured to the building to move the container to a vacant said berth.

24. A container transfer system including open side passenger containers of uniform length and width, a railway track, a station track having a double-dip transfer run supported along over said railway track, at least one container carrier on said station track, said carrier having wide gaged outboard wheels, at each end for running said transfer run dips separately, said run being wide gage two rail having a central length substantially horizontally straight along the dips, switches in each said rail to inner slopes of dips, means for opening said switches for rear wheels to enter dip after forward wheels have passed switches to inner dips, and means for the said wheels fore and aft to cross paths within the dips all to dip the carrier substantially level when running the transfer run said carrier having depending end coupling members and length between for three said containers and shielding along each side one third distance from ends to enclose open sides of containers when at ends, container hook means for engaging the containers on ends of said carrier behicd the shielding with room for container between, a train on said railway track having at least one passenger car having container berth area of length for three said containers and for the coupling means on the carrier to insert at each end, an aisle past said berth area, partition covering coupling area and end berths with opening between end berths for entrance and exit of passengers to containers, a conveyor along bottom of berth area in said car to move containers from behind shielding past opening and behind shielding at opposite end, and means for releasing container from end of carrier when set in by the dip and for engaging container on opposite end of carrier in position before carrier is lifted out of car, the shielding on said carrier fitting within behind said partition on said car when the carrier is inserted in the car.

25. A system as in claim 24, and shuttle shielding on said car behind said partition and behind said shielding at end where containers are removed from the car, and means for moving the shuttle shielding to opposite end of the berth area when the car is reverse direction.

26. A system as in claim 24 for a subway, said system having a plurality of stations, the dip bottom extending between stations.

27. A load carrier for a double dip transfer run, said carrier having a generally rectangular frame, a swivel column extending up at right angles to the frame and secured to rotate thereon near each end of the frame, a truck mounted to tilt fore and aft on top of each said swivel column, outboard wheels on said trucks beyond sides of said frame, load engaging-disengaging means extending down from said frame for engaging to suspend and hold a load with respect to the frame, and a structural member depending from each end of frame for vertically coupling with a vehicle below for a double dip transfer run for substantially level dip transfer of the load.

* * * * *